(12) United States Patent
Morishima et al.

(10) Patent No.: US 8,865,275 B2
(45) Date of Patent: Oct. 21, 2014

(54) LIGHT ABSORPTION ANISOTROPIC FILM, POLARIZING FILM, PROCESS FOR PRODUCING THE POLARIZING FILM AND DISPLAY DEVICE USING THE POLARIZING FILM

(75) Inventors: Shinichi Morishima, Ashigarakami-gun (JP); Nobutaka Iwahashi, Ashigarakami-gun (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 0 days.

(21) Appl. No.: 13/638,432

(22) PCT Filed: Mar. 28, 2011

(86) PCT No.: PCT/JP2011/057693
§ 371 (c)(1),
(2), (4) Date: Dec. 12, 2012

(87) PCT Pub. No.: WO2011/125622
PCT Pub. Date: Oct. 13, 2011

(65) Prior Publication Data
US 2013/0107195 A1    May 2, 2013

(30) Foreign Application Priority Data
Mar. 31, 2010  (JP) ................................. 2010-082743

(51) Int. Cl.
| | | |
|---|---|---|
| *C09K 19/00* | (2006.01) | |
| *G02B 5/30* | (2006.01) | |
| *C09K 19/60* | (2006.01) | |
| *G02B 5/18* | (2006.01) | |
| *G02F 1/1335* | (2006.01) | |

(52) U.S. Cl.
CPC ............ *G02B 5/3016* (2013.01); *C09K 19/601* (2013.01); *G02F 1/133528* (2013.01); *G02B 5/1833* (2013.01); *Y10S 428/91* (2013.01)
USPC ............. 428/1.31; 428/1.1; 428/910; 349/96; 349/97; 349/99; 349/193; 349/201; 106/31.48; 106/31.5; 106/31.52; 359/487.02; 534/744; 427/162; 427/163.1; 427/558

(58) Field of Classification Search
CPC .... G02B 5/3016; G02B 5/3025; G02B 5/305; G02B 5/3083; G02B 5/223; G02B 5/23; C09K 19/601; G02F 1/133528; G02F 1/133533; C09B 31/16; C09B 31/30; C09B 31/28; C09B 56/00; C09B 67/0083
USPC .......... 428/1.1, 411.1, 910, 1.3, 1.31; 349/96, 349/97, 99, 123, 193, 201; 252/299.1; 106/31.48, 31.5, 31.52; 359/885, 359/487.02, 487.04, 487.06; 534/744
See application file for complete search history.

(56) References Cited

U.S. PATENT DOCUMENTS

| | | | |
|---|---|---|---|
| 5,166,124 A | 11/1992 | Weber | |
| 6,563,640 B1 | 5/2003 | Ignatov et al. | |
| 6,686,980 B1 | 2/2004 | Ichihashi | |
| 7,527,862 B2 | 5/2009 | Yoneyama et al. | |
| 2005/0139123 A1 | 6/2005 | Fujiwara | |
| 2006/0182902 A1 | 8/2006 | Yoneyama et al. | |
| 2009/0273741 A1 | 11/2009 | Amimori et al. | |
| 2009/0274853 A1* | 11/2009 | Morishima | 428/1.31 |
| 2010/0134726 A1* | 6/2010 | Morishima et al. | 349/97 |

FOREIGN PATENT DOCUMENTS

| | | |
|---|---|---|
| GB | 2 315 903 A | 2/1998 |
| JP | 5-173016 A | 7/1993 |
| JP | 8-278409 A | 10/1996 |
| JP | 11-101964 A | 4/1999 |
| JP | 2001-133630 A | 5/2001 |
| JP | 2005-187786 A | 7/2005 |
| JP | 3667637 B2 | 7/2005 |
| JP | 2005-281329 A | 10/2005 |
| JP | 2006-079030 A | 3/2006 |
| JP | 2008-090317 A | 4/2008 |
| JP | 2009-244679 A | 10/2009 |
| JP | 2009-263649 A | 11/2009 |
| JP | 4404606 B2 | 1/2010 |

OTHER PUBLICATIONS

International Search Report (PCT/ISA/210) issued on Jun. 28, 2011, by the Japanese Patent Office as the International Searching Authority for International Application No. PCT/JP2011/057693.
International Preliminary Report on Patentability (PCT/IB/373) issued on Nov. 13, 2012, by the Japanese Patent Office as the International Searching Authority for International Application No. PCT/JP2011/057693.
Japanese Office Action dated Jun. 12, 2013, issued in corresponding Japanese Patent Application No. 2010-082743 and English Language Excerption of Japanese Office Action (5 pgs.).
Chinese Office Action (Notification of the First Office Action) dated Mar. 3, 2014, issued by the State Intellectual Property Office of the People's Republic of China in corresponding Chinese Patent Application No. 201180017398.4, and English language translation of Office Action. (11 pages).

* cited by examiner

*Primary Examiner* — Gwendolyn Blackwell
*Assistant Examiner* — Ruiyun Zhang
(74) *Attorney, Agent, or Firm* — Buchanan Ingersoll & Rooney PC

(57) ABSTRACT

A light absorption anisotropic film, wherein content of a liquid crystalline non-colorable low molecular weight compound is 30% by mass or less; and which is obtained by fixing the alignment of a dichroic dye composition comprising at least one type of azo-based dichroic dye having nematic liquid crystallinity; and shows a diffraction peak derived from a periodic structure in a direction parallel to the alignment axis on measurement of X-ray diffraction. The light absorption anisotropic film is high in dichroism.

16 Claims, 1 Drawing Sheet

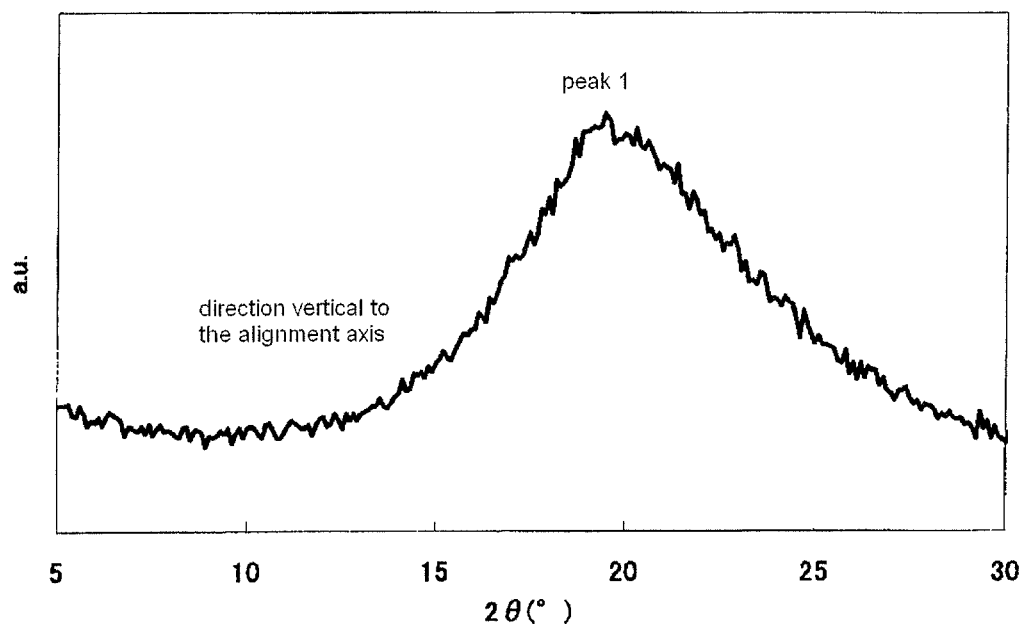

LIGHT ABSORPTION ANISOTROPIC FILM, POLARIZING FILM, PROCESS FOR PRODUCING THE POLARIZING FILM AND DISPLAY DEVICE USING THE POLARIZING FILM

TECHNICAL FIELD

The present invention relates to a light absorption anisotropic film, a polarizing film using the light absorption anisotropic film, a process for producing the polarizing film and a display device using the polarizing film, and in particular relates to a light absorption anisotropic film and a polarizing film decreased in depolarization, a process for producing the polarizing film and a display device using the polarizing film.

When an attenuation function, a polarization function, a scattering function, a light shielding function and the like of irradiating lights including a laser beam and natural light are required, there are conventionally used apparatuses operating according to theories varying depending on respective functions. Hence, also articles corresponding to these functions are produced by production steps varying depending on respective functions. For example, for LCD (liquid crystal device), a linear polarizing plate and a circular polarizing plate are used to control optical rotation and birefringence in a display. Also in OLED (organic electroluminescence device), a circular polarizing plate is used for prevention of reflection of alight from the outside. Conventionally, iodine is widely used as a dichroic dye in these polarizing plates (polarizing device). An iodine polarizer is prepared by dissolving or adsorbing iodine in or on a polymer material such as polyvinyl alcohol, and stretching its film in the form of a film toward one direction to align a polyiodine complex. When used in a polarizing device, however, the heat resistance and the light resistance of iodine are not sufficient because of a significant sublimation property of iodine.

For this reason, a polarizing device using organic dyes as a dichroic dye has been considered. These organic dyes, however, have a problem that only a polarizing device having fairly poor dichroism is obtained as compared with iodine. This method also has problems such as troublesome processes of a stretching treatment and the like.

Therefore, other methods have attracted attention recently. For example, there is a wet film-forming method in which a dichroic dye is aligned on a substrate made of glass, a transparent film and the like by utilizing intermolecular interaction of organic dye molecules. However, as compared with an iodine polarizer, an organic dye is inferior in dichroism and cannot be used in a liquid crystal display device. As a method of enhancing the dichroic ratio of an aligned dichroic dye, a dichroic dye is aligned in a phase having high orientation order in Patent Document 1. Further, Patent Documents 2 and 3 disclose a polarizing device containing a crystalline structure. However, these polarizing devices have a problem that a grain boundary tends to be formed with a domain, thereby causing scattering and depolarization since a high order structure of low symmetry is contained in all of these polarizing devices. An azo dye having a substituent imparting water-solubility such as a sulfo group, a carboxyl group and the like described in patent Document 2 is difficult to subject to a uniform alignment treatment by heat aging like in the case of a thermotropic liquid crystal, and it is hard to form a coated film having a smooth surface with the azo dye, generating causes for scattering and depolarization, since the azo dye is a lyotropic liquid crystal.

Recently, there has been advancement in application development of new polarizing devices aiming at improvement in display performance and the like. Patent Document 4 proposes to suppress depolarization (a so-called depolarization index) of a color filter by providing a polarizing layer (a so-called in-cell polarizing layer) between a color filter layer and a liquid crystal material layer. However, a polarizing layer disposed in a liquid crystal cell is required to attain a desired degree of polarization at a smaller film thickness, and a higher dichroism is necessary for this layer.

PRIOR ART DOCUMENT

Patent Document

Patent Document 1: JP No. 4404606
Patent Document 2: JP-A2006-79030
Patent Document 3: JP No. 3667637
Patent Document 4: JP-A2008-90317

SUMMARY OF THE INVENTION

Problem to be Solved by the Invention

According to an investigation by the present inventors, when a polarizing layer is formed using a hexatic phase or a crystal phase described in Patent Document 1, a grain boundary (a so-called crystal grain boundary) is generated due to low symmetry thereof. It is found that depolarization occurs by a scattering light generated due to this grain boundary, lowering contrast.

The present invention has been made in view of the above-described background art and has an object described below.

The object of the present invention is to provide a high-contrast light absorption anisotropic film which is high in dichroism and decreased in depolarization by scattering light, a polarizing film having the light absorption anisotropic film and a display device. The object is also to provide a process for producing the polarizing film.

SUMMARY OF THE INVENTION

The method for solving the above-mentioned problem is as follows.

<1> A light absorption anisotropic film, wherein content of a liquid crystalline non-colorable low molecular weight compound is 30% by mass or less; and which is obtained by fixing the alignment of a dichroic dye composition comprising at least one type of azo-based dichroic dye having nematic liquid crystallinity; and shows a diffraction peak derived from a periodic structure in a direction parallel to the alignment axis on measurement of X-ray diffraction.

<2> The light absorption anisotropic film according to <1>, wherein a period shown by at least one of the diffraction peaks is 3.0 to 50.0 Å.

<3> The light absorption anisotropic film according to <1> or <2>, wherein at least one half-value width of the diffraction peaks is 10.0 Å or less.

<4> The light absorption anisotropic film according to any one of <1> to <3> which shows diffraction peaks derived from a periodic structure in a direction vertical to the alignment axis and in which the period shown by at least one of the diffraction peaks is 3.0 to 15.0 Å.

<5> The light absorption anisotropic film according to <4>, wherein at least one of diffraction peaks derived from the periodic structure in the direction vertical to the alignment axis is a diffraction peak derived from a periodic structure in an in-plane direction.

<6> The light absorption anisotropic film according to <4> or <5>, wherein there is one diffraction peak derived from the periodic structure in the direction vertical to the alignment axis.

<7> The light absorption anisotropic film according to any one of <4> to <6>, wherein the intensity of the diffraction peak derived from the periodic structure in the direction vertical to the alignment axis does not show a maximum value in a range of ±70° of layer normal line direction in a plane vertical to the alignment axis.

<8> The light absorption anisotropic film according to any one of <4> to <7>, wherein at least one of half-value widths in the diffraction peak derived from the periodic structure in the direction vertical to the alignment axis is 2.0 Å or less.

<9> The light absorption anisotropic film according to any one of <1> to <8>, wherein the dichroic dye composition comprises at least two types of dichroic dyes.

<10> The light absorption anisotropic film according to any one of <1> to <9>, wherein at least one type of the dichroic dye is a compound expressed by the formula (I), formula (II), formula (III) or formula (IV) shown below;

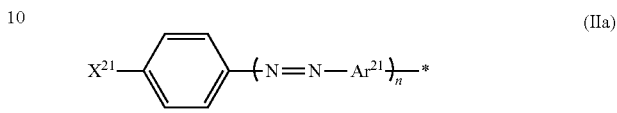

Formula (I)

wherein, $R^{11}$ to $R^{14}$ each represent independently a hydrogen atom or a substituent; $R^{15}$ and $R^{16}$ each represent independently a hydrogen atom or an alkyl group optionally having a substituent; $L^{11}$ represents —N=N—, —CH=N—, —N=CH—, —C(=O)O—, —OC(=O)— or —CH=CH—; $A^{11}$ represents a phenyl group optionally having a substituent, a naphthyl group optionally having a substituent or an aromatic heterocyclic group optionally having a substituent; $B^{11}$ represents a divalent aromatic hydrocarbon group optionally having a substituent or divalent aromatic heterocyclic group optionally having a substituent; n represents an integer of 1 to 5, when n is 2 or more, a plurality of $B^{11}$s may be mutually the same or different;

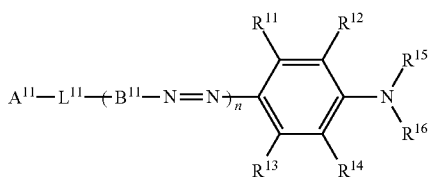

Formula (II)

wherein, $R^{21}$ and $R^{22}$ each represent a hydrogen atom, an alkyl group, an alkoxy group or a substituent represented by -$L^{22}$-Y, provided that, at least one of them represents a group other than a hydrogen atom; $L^{22}$ represents an alkylene group, and one $CH_2$ group or non-adjacent two or more $CH_2$ groups present in the alkylene group may each be substituted with —O—, —COO—, —OCO, —OCOO—, —NRCOO—, —OCONR—, —CO—, —S—, —SO_2—, —NR—, —NRSO_2— or —SO_2NR— (R represents a hydrogen atom or an alkyl group having 1 to 4 carbons); Y represents a hydrogen atom, a hydroxy group, an alkoxy group, a carboxyl group, a halogen atom or a polymerizable group; $L^{21}$s each represent a linking group selected from the group consisting of an azo group (—N=N—), a carbonyloxy group (—C(=O)O—), an oxycarbonyl group (—O—C(=O)—), an imino group (—N=CH—) and a vinylene group (—C=C—); Dyes each represent an azo dye residue represented by the following formula (IIa);

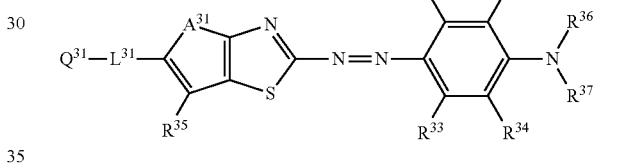

(IIa)

in the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring group optionally having a substituent or aromatic heterocyclic group optionally having a substituent; n represents an integer of 1 to 3, and when n is 2 or more, two $Ar^{21}$s may be mutually the same or different;

Formula (III)

wherein, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group optionally having a substituent, aromatic heterocyclic group optionally having a substituent or cyclohexane ring group optionally having a substituent; $L^{31}$ represents a divalent linking group; $A^{31}$ represents an oxygen atom or a sulfur atom;

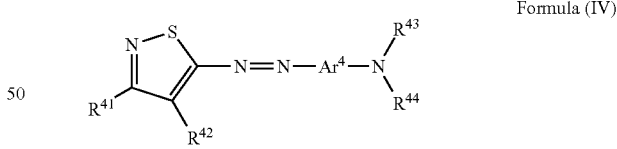

Formula (IV)

wherein, $R^{41}$ and $R^{42}$ each represent a hydrogen atom or a substituent, and may be mutually linked to form a ring; $Ar^4$ represents an optionally substituted divalent aromatic hydrocarbon group optionally having a substituent or aromatic heterocyclic group optionally having a substituent; $R^{43}$ and $R^{44}$ each represent a hydrogen atom or an optionally substituted alkyl group, and may be mutually linked to form a hetero ring.

<11> A polarizing film having a substrate and the light absorption anisotropic film described in any one of <1> to <10> on the substrate.

<12> The polarizing film according to <11> having an alignment film between the substrate and the light absorption anisotropic film.

<13> A display device having the polarizing film according to <11> or <12>.

<14> A process for producing the polarizing film according to <11> or <12> comprising at least the following [1] to [3] in this order;

[1] rubbing or irradiating light directly on a substrate or an alignment film formed on the substrate,

[2] coating a dichroic dye composition dissolved in an organic solvent on the substrate or the alignment film, and

[3] heating a coated film of the dichroic dye composition at temperatures of 50° C. or more and 250° C. or less and aligning to form a light absorption anisotropic film.

Effects of the Invention

The present invention is able to provide a high contrast light absorption anisotropic film which is high in dichroism and decreased in depolarization by scattering light, a polarizing film and a display device using the polarizing film.

BRIEF DESCRIPTION OF THE DRAWINGS

FIG. 1 is an X-ray diffraction pattern of Comparative Example 1.

MODE FOR CARRYING OUT THE INVENTION

The present invention will be described in detail below. In the present specification, "to" is used to mean that numerical values described in the vicinity thereof indicate the lower limit and the upper limit.

1. Light Absorption Anisotropic Film

The present invention relates to a light absorption anisotropic film characterized in that content of a liquid crystalline non-colorable low molecular weight compound is 30% by mass or less, and the light absorption anisotropic film is obtained by fixing the alignment of a dichroic dye composition comprising at least one type of azo-based dichroic dye having nematic liquid crystallinity and the film shows a diffraction peak derived from a periodic structure in a direction parallel to the alignment axis on measurement of X-ray diffraction.

The light absorption anisotropic film used in the present invention is a dye film having anisotropy in electromagnetic properties in any two directions selected from three directions in total in a steric coordinate system composed of a thickness direction of the dye film and any crossing inplane two directions. Electromagnetic properties include optical properties such as absorption, refraction and the like, electric properties such as resistance, capacity, and the like. Examples of films having optical anisotropy of absorption, refraction and the like include a linear polarizing film, a circular polarizing film, a retardation film, a resistivity anisotropic film and the like. That is, the light absorption anisotropic film of the present invention can be used as a polarizing film, a retardation film or a resistivity anisotropic film. The light absorption anisotropic film of the present invention is particularly useful as a polarizing film since it shows high absorbance over the whole visible light region.

The light absorption anisotropic film of the present invention is characterized by showing a diffraction peak derived from a period in the direction parallel to the alignment axis on measurement of X-ray diffraction. It is in particular preferable that molecules adjacent to each other in a direction vertical to the alignment axis form layers and that these layers are laminated in the direction parallel to the alignment axis. Such an aggregate state is similar to that of a smectic phase which is more highly ordered than a nematic phase, thereby providing a high dichroic ratio. The period includes, for example, a case corresponding to the molecular length or two times the length. The range is 3.0 to 50.0 Å, preferably 10.0 to 45.0 Å, more preferably 15.0 to 40.0 Å and still more preferably 25.0 to 35.0 Å.

In this case, the alignment axis means a direction at which the light absorption anisotropic film shows the greatest absorbance with respect to linear polarized light and usually coincides with the direction of alignment treatment. For example, in a film with the horizontal alignment of a dichroic dye composition fixed, the alignment axis is an axis in the film plane and coincides with the direction of alignment treatment (for example, on an alignment film to which rubbing treatment is given, usually a rubbing direction in the case where the dichroic dye composition is horizontally aligned, and usually a direction at which birefringence developed by irradiation of light to a photo alignment film is the greatest in the case where the photo alignment film is used to horizontally align the dichroic dye composition).

In general, an azo dichroic dye forming a light absorption anisotropic film is a rod-shaped molecule having a large aspect ratio (=molecular long axis length/molecular short axis length), and transition moment absorbing visible light is present in a direction approximately corresponding to the molecular long axis direction (Non-Patent Document, Dichroic Dyes for Liquid Crystal Displays). Therefore, if the angle made by the molecular long axis and the alignment axis of a dichroic dye is smaller on average and variation thereof is smaller, then, a light absorption anisotropic film shows a higher dichroic ratio.

It is preferable that a diffraction peak derived from the period in the direction parallel to the alignment axis shown by the light absorption anisotropic film of the present invention is 10.0 Å or lower in half-value width.

Here, the half value width is a value which is obtained by the procedures in which in one diffraction peak shown on measurement of X-ray diffraction, the intensity of the peak apex with respect to the base line is determined to identify two points, one each on both sides of the peak apex showing a half value of the intensity, thereby calculating a difference between the respective periods of the two points.

A light absorption anisotropic film which shows a diffraction peak derived from a period in a direction parallel to the alignment axis on measurement of X-ray diffraction and has a half-value width of 10.0 Å or less is predicted to show a higher dichroic ratio due to the following reasons.

The period in the direction parallel to the alignment axis is generated by an order of center of gravity of molecules adjacent in a direction vertical to the alignment axis. And, for example, if the center of gravity is in the same plane, a layer structure is formed. If a direction normal to the layer structure or a direction normal to a periodic structure according thereto fluctuates from the alignment axis, an angle between the molecular long axis and the alignment axis of a dichroic dye which constitutes the periodic structure becomes greater, thus resulting in a decrease in dichroic ratio. Further, a diffraction peak becomes broad, thereby showing a large half-value width.

In contrast, a sharp diffraction peak having a half-value width which is a certain value or less means that fluctuation of the periodic structure is small and an angle formed by the molecular long axis and the alignment axis of a dichroic dye is small, that is, molecules are aligned in high order. The sharp peak is estimated to develop a high dichroic ratio.

As described above, the half-value width of the diffraction peak is at least 10.0 Å or less, preferably 8.0 Å or less, more preferably 7.0 Å or less, still more preferably 6.0 Å or less, and preferably 0.1 Å or more. When the half-value width is in excess of an upper limit, the periodic structure is increased in fluctuation, thereby inhibiting the high-order alignment. This is not preferable. Further, when the half-value width is less than a lower limit, alignment deformation takes place easily to develop a grain boundary with a domain. This may cause haze generation, irregular alignment for each domain and depolarization, and is not preferable.

It is preferable that the light absorption anisotropic film of the present invention shows a diffraction peak derived from a period in the direction vertical to the alignment axis. The period corresponds to, for example, an intermolecular distance of a dichroic dye in the molecular short axis direction in which the molecular long axis is aligned so as to give the direction of alignment. The range is 3.0 to 15.0 Å, preferably 3.0 to 10.0 Å, more preferably 3.0 to 6.0 Å and still more preferably 3.3 to 5.5 Å.

The light absorption anisotropic film of the present invention does not show the maximum value when distribution of the intensity of the above-described diffraction peak is measured in the range of ±70° of the film normal line direction in a plane vertical to the alignment axis. A case showing the maximum value of the intensity of the diffraction peak in this measurement indicates the presence of anisotropy in packing along the vertical direction to the alignment axis, that is, along the molecular short axis direction. This aggregate state includes specifically a crystal, a hexatic phase, a crystal phase and the like (Refer to Liquid Crystal Handbook). When packing has anisotropy, a grain boundary with a domain is generated by discontinuous packing, possibly inviting haze generation, irregular alignment of each domain, and depolarization. Thus, anisotropy in packing is not preferable. Since the light absorption anisotropic film of the present invention has no anisotropy in packing along the vertical direction to the alignment axis, a grain boundary with a domain is not generated and a uniform film is formed. This aggregate state specifically includes, but is not limited to, a nematic phase, a smectic phase A, supercooled conditions of these phases, and the like. An embodiment in which a plurality of aggregate states are mixed and present, showing the above-described diffraction peak feature in its entirety, may also be used.

The presence or absence of the maximum value when distribution of the intensity is measured in the range of ±70° of the film normal line direction in a plane vertical to the alignment axis can be confirmed by measurement using a usual X-ray diffractometer, and for example, can be confirmed by measurement according to methods described in "X-Ray Diffraction Main Summary" (CULLITY, B. D, published by Agne Gijutsu Center, 1961), "Thin Film Analysis by X-Ray Scattering: Thin Film Analysis by X-Ray Scattering" (Birkholz, Mario, Wiley, 2006), "X-Ray Crystal Structure Analysis" (Yuji Ohashi, published by Shokabo, 2005/09/25), "X-Ray Analysis Introduction (Second Edition)" (Masao Sumido, Yoshio Sasada, (authors), published by Tokyo Kagaku Dojin Co., Ltd, 1973) and the like.

In general, since a light absorption anisotropic film is used against a light entering at an angle vertical to a film or approximately vertical to a film, it is preferable for the film to have a high dichroic ratio along the inplane direction. Accordingly, it is preferable that the light absorption anisotropic film has a periodic structure along the inplane direction, and shows diffraction peaks derived from the periodic structure.

The diffraction peak derived from the period in the direction vertical to the alignment axis which is shown by the light absorption anisotropic film of the present invention is preferably 2.0 Å or less in half-value width and more preferably 1.0 Å or less.

In this case, a sharp diffraction peak having a half-value width which is a certain value or less means that there is a small variation in intermolecular distance and an angle formed by the molecular long axis and the alignment axis of the dichroic dye is small on average, that is, molecules are aligned in high order. Thus, the peak is estimated to develop a high dichroic ratio As described above, the half-value width of the diffraction peak is 2.0 Å or less, preferably 1.0 Å or less, more preferably 0.90 Å or less, still more preferably 0.70 Å or less, still further more preferably 0.50 Å or less, and in particular preferably 0.05 Å or more. When the half-value width is in excess of an upper limit, the dye is increased in variation in intermolecular distance, thereby inhibiting a high-order alignment. This is not preferable. Further, where the half-value is less than a lower limit, alignment deformation will easily be caused, thereby developing a grain boundary with a domain. This may cause haze generation, irregular alignment for each domain and depolarization, which is therefore not preferable.

The period of the diffraction peak and the half-value width of the light absorption anisotropic film are obtained from X-ray profiles measured by an X-ray diffractometer for thin film evaluation (made by Rigaku Corporation, trade name: "ATX-G" in-plane optical system) or equivalent devices.

Measurement of X-ray diffraction of the light absorption anisotropic film in the present invention is carried out, for example, by the following procedures.

First, the light absorption anisotropic film is subjected to in-plane measurement in all directions at every 15°. So-called φ scanning at which measurement is made by rotating a sample in a plane parallel to a substrate, with an angle at which the peak is observed fixed, is conducted to determine an orientation in a substrate plane which is large in peak intensity. Next, the period and the half-value width can be obtained by using peaks at the obtained orientation by in-plane measurement.

The light absorption anisotropic film of the present invention obtained by fixing the alignment of a dichroic dye and having the above-described features in the period of a diffraction peak and the half-value width thereof shows a high dichroic ratio and is useful as a polarizing film.

Materials utilizable for fabrication of the light absorption anisotropic film satisfying the above-described properties in X-ray diffraction measurement and the like will be described in detail below.

1-(1) Dichroic Dye Composition

In the present invention, the light absorption anisotropic film is obtained by fixing the alignment of a dichroic dye composition having a liquid crystalline non-colorable low molecular weight compound content of 30% by mass or less and containing at least one nematic liquid crystalline azo dichroic dye.

In the dichroic dye composition used in the present invention, the content of a liquid crystalline non-colorable low molecular weight compound is 30% by mass or less, preferably 20% by mass or less, more preferably 10% by mass or less, further more preferably 5% by mass or less. That is, it is preferable that, in the dichroic dye composition used in the present invention, the dichroic dye molecule is aligned by its own aligning ability or by combination with another dye and its condition is fixed, thus, the composition functions as a light absorption anisotropic film such as a polarizing film and the like. For example, a so-called guest-host (GH) type composition can be prepared by using a composition containing a non-colorable liquid crystal compound as the main component together with a dichroic dye, and aligning the molecule of the dichroic dye along the alignment of the molecule of the liquid crystal compound, thereby attaining a predetermined dichroic ratio, however, the above-described embodiment is capable of attaining a higher dichroic ratio and more preferable than the GH embodiment. The dichroic dye composition to be used in the present invention is capable of obtaining a high dye concentration owing to low content of a liquid crystalline non-colorable low molecular weight compound or no content thereof, thus, the light absorption anisotropic film can be made thinner by using this composition.

Here, the non-colorable liquid crystal compound means a compound showing no absorption in the spectral region of visible light, that is, in the spectral region of 400 to 700 nm and realizing a nematic liquid crystal phase or a smectic liquid crystal phase, and examples thereof include liquid crystal compounds described in "Liquid Crystal Device Handbook" Japan Society for the Promotion of Science 142nd Committee ed., The Nikkan Kogyo Shinbun, Ltd., 1989), pp. 154 to 192 and pp. 715 to 722.

In the present invention, a dichroic dye composition containing at least one nematic liquid crystalline azo dichroic dye is used. In the present invention, "dichroic dye" means a dye showing absorbance varying depending on a direction. "Dichroism" and "dichroic ratio" are calculated as the ratio of the absorbance of polarization along the absorption axis direction to the absorbance of polarization along the polarizing axis direction, when a dichroic dye composition is processed into a light absorption anisotropic film.

It is particularly preferable that the dichroic dye composition in the present invention contains at least one of the azo dyes represented by the following formulae (I), (II), (III) or (IV). It is preferable that the dichroic dye represented by the following formulae (I) to (IV) has nematic liquid crystallinity.

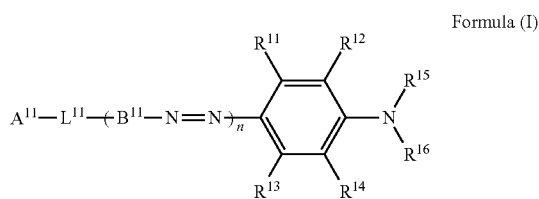

Formula (I)

In the formula, $R^{11}$ to $R^{14}$ each represent independently a hydrogen atom or a substituent; $R^{15}$ and $R^{16}$ each represent independently a hydrogen atom or an alkyl group optionally having a substituent; $L^{11}$ represents —N=N—, —CH=N—, —N=CH—, —C(=O)O—, —OC(=O)— or —CH=CH—; $A^{11}$ represents a phenyl group optionally having a substituent, a naphthyl group optionally having a substituent or an aromatic heterocyclic group optionally having a substituent; $B^{11}$ represents a divalent aromatic hydrocarbon group optionally having a substituent or divalent aromatic heterocyclic group optionally having a substituent; n represents an integer of 1 to 5, and when n is 2 or more, a plurality of $B^{11}$s may be mutually the same or different.

The substituents represented by $R^{11}$ to $R^{14}$ in the above-described formula (I) include groups listed below.

Alkyl groups (alkyl groups preferably having 1 to 20 carbons, more preferably having 1 to 12 carbons and particularly preferably having 1 to 8 carbons, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), alkenyl groups (alkenyl groups preferably having 2 to 20 carbons, more preferably having 2 to 12 carbons and particularly preferably having 2 to 8 carbons, and examples thereof include a vinyl group, an aryl group, a 2-butenyl group, a 3-pentenyl group and the like), alkynyl groups (alkynyl groups preferably having 2 to 20 carbons, more preferably having 2 to 12 carbons and particularly preferably having 2 to 8 carbons, and examples thereof include a propargyl group, a 3-pentynyl group and the like), aryl groups (aryl groups preferably having 6 to 30 carbons, more preferably having 6 to 20 carbons and particularly preferably having 6 to 12 carbons, and examples thereof include a phenyl group, a 2,6-diethylphenyl group, a 3,5-ditrifluoromethylphenyl group, a naphthyl group, a biphenyl group and the like), substituted or un-substituted amino groups (amino groups preferably having 0 to 20 carbons, more preferably having 0 to 10 carbons and particularly preferably having 0 to 6 carbons, and examples thereof include an un-substituted amino group, a methylamino group, a dimethylamino group, a diethylamino group, an anilino group and the like), alkoxy groups (preferably having 1 to 20 carbons, more preferably having 1 to 10 carbons and particularly preferably having 1 to 6 carbons, and examples thereof include a methoxy group, an ethoxy group, a butoxy group and the like), oxycarbonyl groups (preferably having 2 to 20 carbons, more preferably having 2 to 15 carbons and particularly preferably having 2 to 10 carbons, and examples thereof include a methoxycarbonyl group, an ethoxycarbonyl group, a phenoxycarbonyl group and the like), acyloxy groups (preferably having 2 to 20 carbons, more preferably having 2 to 10 carbons and particularly preferably having 2 to 6 carbons, and examples thereof include an acetoxy group, a benzoyloxy group and the like), acylamino groups (preferably having 2 to 20 carbons, more preferably having 2 to 10 carbons and particularly preferably having 2 to 6 carbons, and examples thereof include an acetylamino group, a benzoylamino group and the like), alkoxycarbonylamino groups (preferably having 2 to 20 carbons, more preferably having 2 to 10 carbons and particularly preferably having 2 to 6 carbons, and examples thereof include a methoxycarbonylamino group and the like), aryloxycarbonylamino groups (preferably having 7 to carbons, more preferably having 7 to 16 carbons and particularly preferably having 7 to 12 carbons, and examples thereof include a phenyloxycarbonylamino group and the like), sulfonylamino groups (preferably having 1 to 20 carbons, more preferably having 1 to 10 carbons and particularly preferably having 1 to 6 carbons, and examples thereof include a methanesulfonylamino group, a benzenesulfonylamino group and the like), sulfamoyl groups (preferably having 0 to 20 carbons, more preferably having 0 to 10 carbons and particularly preferably having 0 to 6 carbons, and examples thereof include a sulfamoyl group, a methylsulfamoyl group, a dimethylsulfamoyl group, a phenylsulfamoyl group and the like), carbamoyl groups (preferably having 1 to 20 carbons, more preferably having 1 to 10 carbons and particularly preferably having 1 to 6 carbons, and examples thereof include an un-substituted carbamoyl group, a methylcarbamoyl group, a diethylcarbamoyl group, a phenylcarbamoyl group and the like), alkylthio groups (preferably having 1 to 20 carbons, more preferably having 1 to 10 carbons and particularly preferably having 1 to 6 carbons, and examples thereof include a methylthio group, an ethylthio group and the like), arylthio groups (preferably having 6 to 20 carbons, more preferably having 6 to 16 carbons and particularly preferably having 6 to 12 carbons, and examples thereof include a phenylthio group and the like), sulfonyl groups (preferably having 1 to 20 carbons, more preferably having 1 to 10 carbons and particularly preferably having 1 to 6 carbons, and examples thereof include a mesyl group, a tosyl group and the like), sulfinyl groups (preferably having 1 to 20 carbons, more preferably having 1 to 10 carbons and particularly preferably having 1 to 6 carbons, and examples thereof include a methanesulfinyl group, a benzenesulfinyl group and the like), ureide groups (preferably having 1 to 20 carbons, more preferably having 1 to 10 carbons and particularly preferably having 1 to 6 carbons, and examples thereof include an un-substituted ureide group, a methylureide group, a phenylureide group and the like), phosphoric amide groups (preferably having 1 to 20 carbons, more preferably having 1 to 10 carbons and particularly preferably having 1 to 6 carbons, and examples thereof include a diethylphosphoric amide group, a phenylphosphoric amide group and the like), a hydroxy group, mercapto groups, halogen atoms (for example, a fluorine atom, a chlorine atom, a bromine atom, an iodine atom), a cyano group, a nitro group, a hydroxamic acid group, a sulfino group, a hydrazino group, an imino group (—CH=N— or —N=CH—), an azo group, hetero ring groups (hetero ring groups preferably having 1 to 30 carbons and more preferably having 1 to 12 carbons, for example, hetero ring groups having a hetero atom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), silyl groups (silyl groups preferably having 3 to 40 carbons, more preferably having 3 to 30 carbons and particularly preferably having 3 to 24 carbons, and examples thereof include a trimethylsilyl group, a triphenylsilyl group and the like).

These substituents may be further substituted with these substituents. When two or more substituents are carried, these may be the same or different. If possible, these may be mutually linked to form a ring.

The group represented by $R^{11}$ to $R^{14}$ is preferably a hydrogen atom, an alkyl group, an alkoxy group or a halogen atom, more preferably a hydrogen atom, an alkyl group or an alkoxy group, further preferably a hydrogen atom or a methyl group.

The alkyl groups optionally having a substituent represented by $R^{15}$ and $R^{16}$ are alkyl groups preferably having 1 to 20 carbons, more preferably having 1 to 12 carbons and particularly preferably having 1 to 8 carbons, and examples thereof include a methyl group, an ethyl group, an n-octyl group and the like. The substituents of the alkyl groups represented by $R^{15}$ and $R^{16}$ are the same as the substituents represented by $R^{11}$ to $R^{14}$ described above. When $R^{15}$ or $R^{16}$ represents an alkyl group, it may be linked with $R^{12}$ or $R^{14}$ to form a cyclic structure. $R^{15}$ and $R^{16}$ are preferably a hydrogen atom or an alkyl group, more preferably a hydrogen atom, a methyl group or an ethyl group.

$A^{11}$ represents a phenyl group optionally having a substituent, a naphthyl group optionally having a substituent or an aromatic heterocyclic group optionally having a substituent.

The substituent optionally carried on the phenyl group or the naphthyl group is preferably a group introduced to enhance solubility or nematic liquid crystallinity of an azo compound, a group having an electron donative property or an electron withdrawing property introduced to adjust the color tone as a dye or a group having a polymerizable group introduced to fix alignment, and specifically, is the same as the substituent represented by $R^{11}$ to $R^{14}$ described above. Preferable are an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, and particularly preferable are an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of the above-mentioned substituents having a carbon atom is the same as the preferable range of the number of carbon atoms for the substituents represented by $R^{11}$ to $R^{14}$.

The phenyl group or the naphthyl group may have 1 to 5 of these substituents, preferably has one substituent. It is more preferable for the phenyl group that one substituent is carried at a para-position with respect to $L^1$.

As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, a thiophenyl group, a thiazolyl group, a benzothiazolyl group, a thiadiazolyl group, a quinolonyl group, a naphthalimidyl group, a thienothiazolyl group and the like.

The aromatic heterocyclic group is preferably a pyridyl group, a quinolyl group, a thiazolyl group, a benzothiazolyl group, a thiadiazolyl group or a thienothiazolyl group, more preferably a pyridyl group, a benzothiazolyl group, a thiadiazolyl group or a thienothiazolyl group, further preferably a pyridyl group, a benzothiazolyl group or a thienothiazolyl group.

$A^{11}$ represents particularly preferably a phenyl group optionally having a substituent, a pyridyl group, a benzothiazolyl group or a thienothiazolyl group.

$B^{11}$ represents a divalent aromatic hydrocarbon group or divalent aromatic heterocyclic group optionally having a substituent. n represents 1 to 4, when n is 2 or more, a plurality of $B^{11}$s may be mutually the same or different.

The aromatic hydrocarbon group is preferably a phenyl group or a naphthyl group. The substituent optionally carried on the aromatic hydrocarbon group includes an alkyl group optionally having a substituent, an alkoxy group optionally having a substituent, a hydroxy group, a nitro group, a halogen atom, an amino group optionally having a substituent, an acylamino group optionally having a substituent and a cyano group. As the substituent optionally carried on the aromatic hydrocarbon group, an alkyl group optionally having a substituent, an alkoxy group optionally having a substituent, a hydroxy group and a halogen atom are preferable, an alkyl group optionally having a substituent, an alkoxy group optionally having a substituent and a halogen atom are more preferable, and a methyl group or a halogen atom is further preferable.

As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, an isoquinolyl group, a benzothiadiazole group, a phthalimide group, a thienothiazole group and the like. Among them, a thienothiazole group is particularly preferable.

The substituent optionally carried on the aromatic heterocyclic group includes alkyl groups such as a methyl group, an ethyl group and the like; alkoxy groups such as a methoxy group, an ethoxy group and the like; an unsubstituted amino group or amino groups such as a methylamino group and the like; an acetylamino group, an acylamino group, a nitro group, a hydroxy group, a cyano group, a halogen atom and the like. The preferable range of the number of carbon atoms of the above-mentioned substituents having a carbon atom is the same as the preferable range of the number of carbon atoms for the substituents represented by $R^{11}$ to $R^{14}$.

Preferable examples of the azo dye represented by the above-described formula (I) include azo dyes represented by any of the following formulae (Ia) and (Ib).

Formula (Ia)

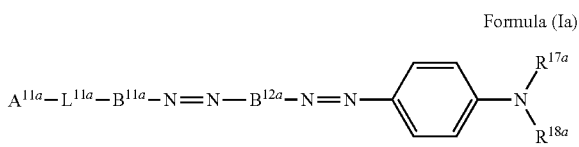

In the formula, $R^{17a}$ and $R^{19a}$ each represent independently a hydrogen atom, a methyl group or an ethyl group; $L^{11a}$ represents —N=N—, —N=CH—, —O(C=O)— or —CH=CH—; $A^{11a}$ represents a group represented by the following formula (Ia-I) or (Ia-III); $B^{11a}$ and $B^{12a}$ each represent independently a group represented by the following formula (Ia-IV), (Ia-V) or (Ia-VI);

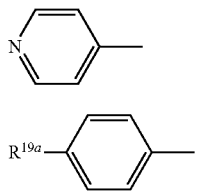

In the formula, $R^{19a}$ represents an alkyl group optionally having a substituent, an aryl group optionally having a substituent, an alkoxy group optionally having a substituent, an oxycarbonyl group optionally having a substituent or an acyloxy group optionally having a substituent.

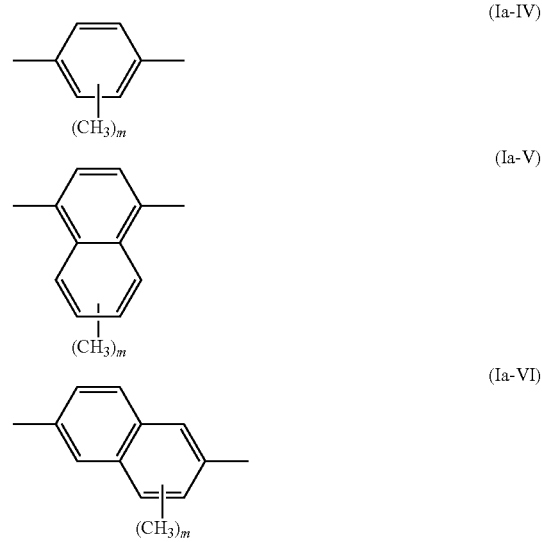

In the formula, m represents an integer of 0 to 2.

Formula (Ib)

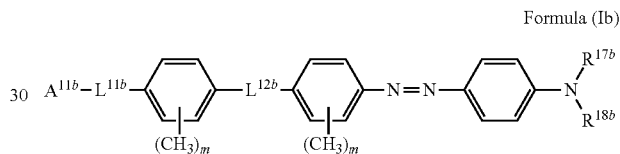

In the formula, $R^{17b}$ and $R^{18b}$ each represent independently a hydrogen atom, a methyl group or an ethyl group; $L^{11b}$ represents —N=N— or —(C=O)O—; $L^{12b}$ represents —N=CH—, —(C=O) O— or —O(C=O)—; $A^{11b}$ represents a group represented by the following formula (Ib-II) or (Ib-III); m represents an integer of 0 to 2;

In the formula, $R^{19b}$ represents an alkyl group optionally having a substituent, an aryl group optionally having a substituent, an alkoxy group optionally having a substituent, an oxycarbonyl group optionally having a substituent or an acyloxy group optionally having a substituent.

Examples of the substituent carried on each group in the above-described formulae (Ia) and (Ib) are the same as the examples of the substituent represented by $R^{11}$ to $R^{14}$ in the formula (I). The preferable range of the number of carbon atoms of the alkyl groups and the like having a carbon atom is the same as the preferable range of the number of carbon atoms for the substituents represented by $R^{11}$ to $R^{14}$.

The compound represented by the above-described formulae (I), (Ia) and (Ib) may have a polymerizable group as a substituent. It is preferable to have a polymerizable group since a film curing property is improved. Examples of the polymerizable group include unsaturated polymerizable groups, an epoxy group and an aziridinyl group, and unsaturated polymerizable groups are preferable and an ethylenically unsaturated polymerizable group is particularly preferable. Examples of the ethylenically unsaturated polymerizable group include an acryloyl group and a methacryloyl group.

It is preferable that the polymerizable group is situated at the molecular end, that is, it is preferable that, in the formula (I), the polymerizable group is present as a substituent of $R^{15}$ and/or $R^{16}$ and as a substituent of $Ar^{11}$.

Specific examples of the azo dye represented by the formula (I) include, but are not limited to, the following specific examples.

| No. | $X^1$ | $X^2$ | $R^{21}$ | $R^{22}$ | $R^{23}$ | $R^{24}$ | $R^{25}$ | $Y^1$ |
|---|---|---|---|---|---|---|---|---|
| A-1 | —$C_2H_5$ | —$C_2H_5$ | —H | —$CH_3$ | —H | —H | —H | —$C_4H_9$ |
| A-2 | —$C_2H_5$ | —$C_2H_5$ | —H | —$CH_3$ | —$CH_3$ | —$CH_3$ | —H | —$C_4H_9$ |
| A-3 | —$CH_3$ | —$CH_3$ | —H | —$CH_3$ | —H | —H | —H | —$C_4H_9$ |

| No. | $X^1$ | $X^2$ | $Y^1$ |
|---|---|---|---|
| A-4 | —$C_2H_5$ | —$C_2H_5$ | —O-C(O)-C$_6$H$_4$-O(CH$_2$)$_4$OCOCH=CH$_2$ |
| A-5 | —$C_2H_5$ | —$C_2H_5$ | —O-C(O)-C$_6$H$_4$-O(CH$_2$)$_{11}$OCOCH=CH$_2$ |

| No. | $X^1$ | $X^2$ | $R^{21}$ | $R^{22}$ | $R^{23}$ | $R^{24}$ | $Y^1$ |
|---|---|---|---|---|---|---|---|
| A-9 | —$C_2H_5$ | —$C_2H_5$ | —H | —$CH_3$ | —H | —H | —$C_4H_9$ |
| A-10 | —$C_2H_5$ | —$C_2H_5$ | —$CH_3$ | —$CH_3$ | —H | —H | —$C_4H_9$ |
| A-11 | —$C_2H_5$ | —$C_2H_5$ | —H | —$CH_3$ | —$CH_3$ | —$CH_3$ | —$C_4H_9$ |
| A-15 | —$C_2H_5$ | —$C_2H_5$ | —H | —$CH_3$ | —$CH_3$ | —$CH_3$ | —O-C(O)-C$_6$H$_4$-O(CH$_2$)$_4$OCOCH$_2$=CH |

| No. | $X^1$ | $X^2$ | $R^{21}$ | $R^{22}$ | $R^{23}$ | $Y^1$ |
|---|---|---|---|---|---|---|
| A-16 | —$C_2H_5$ | —$C_2H_5$ | —H | —$CH_3$ | —H | —$C_4H_9$ |
| A-17 | —$C_2H_5$ | —$C_2H_5$ | —H | —$CH_3$ | —$CH_3$ | —$C_4H_9$ |

-continued
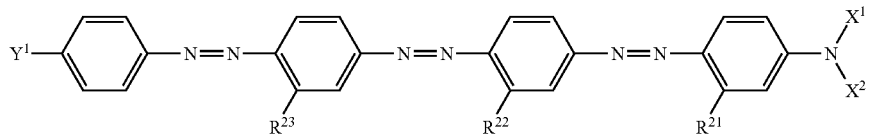
| No. | X¹ | X² | R²¹ | R²² | R²³ | Y¹ |
|---|---|---|---|---|---|---|
| A-18 | —C₂H₅ | —C₂H₅ | —H | —CH₃ | —H | —O—C(O)—C₆H₄—O(CH₂)₄OCOCH=CH₂ |
| A-19 | —C₂H₅ | —C₂H₅ | —H | —CH₃ | —H | —O—C(O)—C₆H₄—O(CH₂)₁₁OCOCH=CH₂ |
| A-24 | —C₂H₅ | —C₂H₅ | —OCH₃ | —CH₃ | —H | —C₄H₉ |
| A-25 | —C₂H₅ | —C₂H₅ | —H | —CH₃ | —CH₃ | —O—C(O)—C₆H₄—O(CH₂)₄OCOCH=CH₂ |
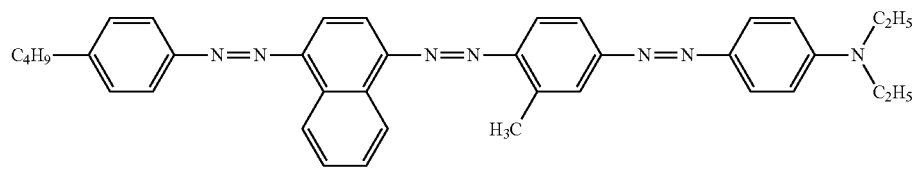
A-27
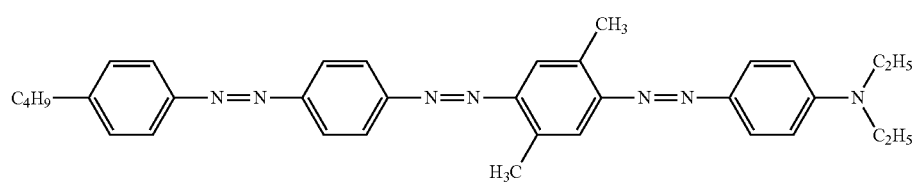
A-28
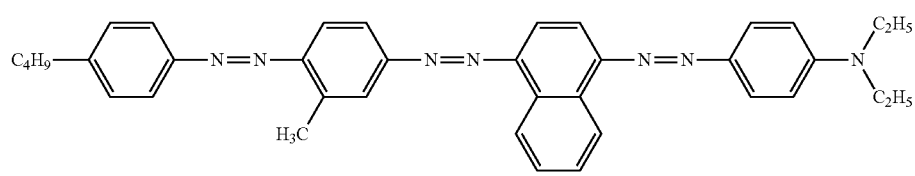
A-29
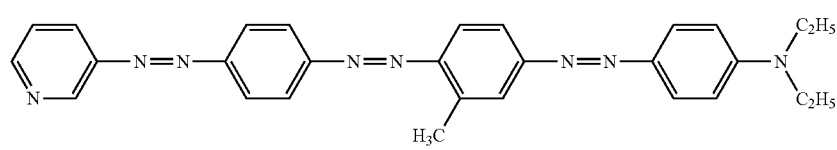
A-30
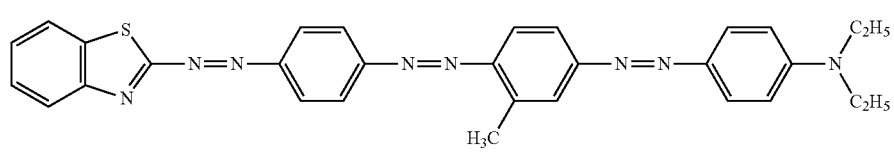
A-31

-continued
A-32
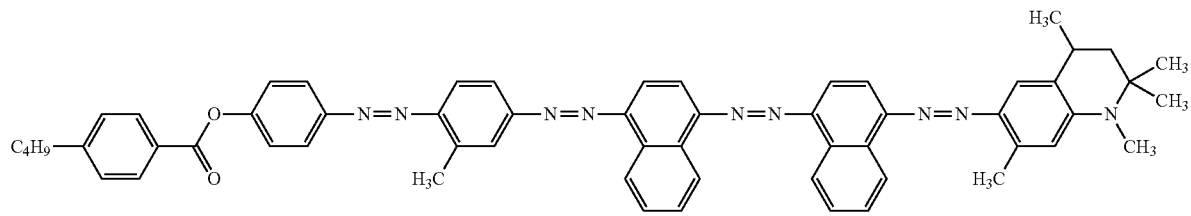
A-33
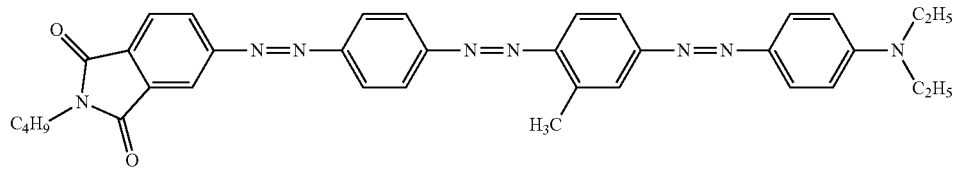
A-34
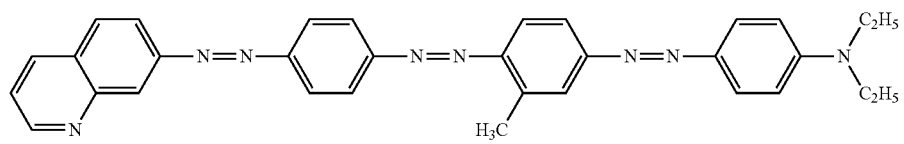
A-35
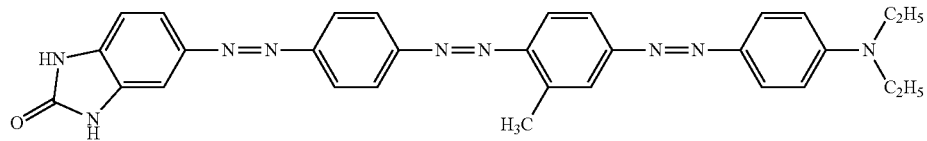
A-36
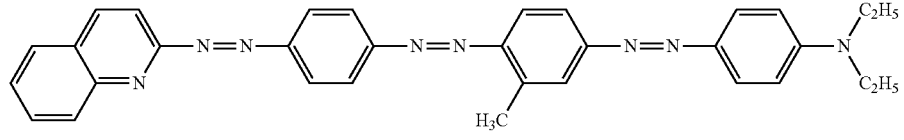
A-37
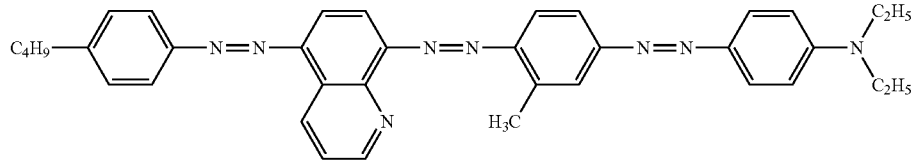
A-38
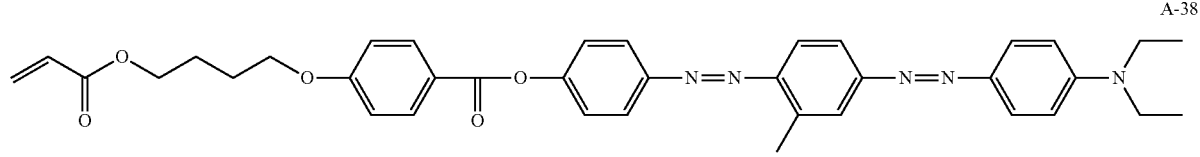
A-40
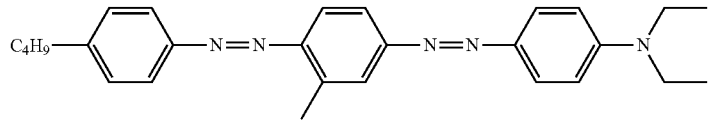
A-41
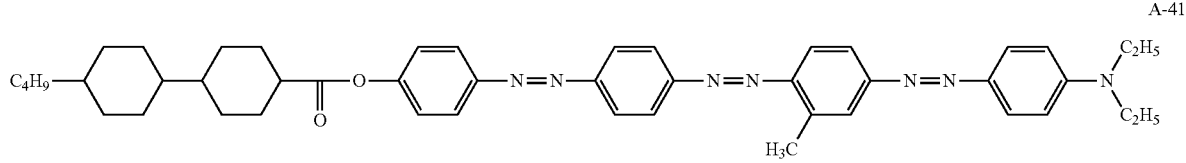
A-42
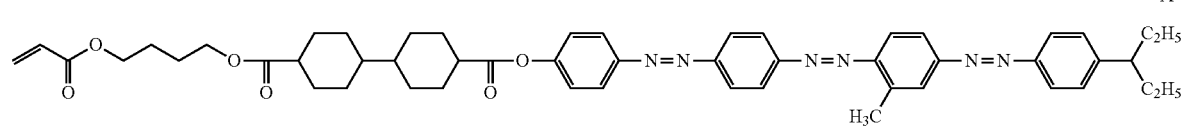

-continued
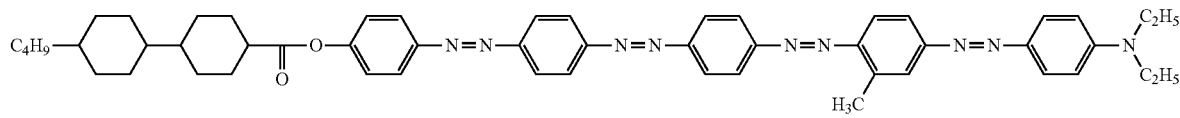
A-45
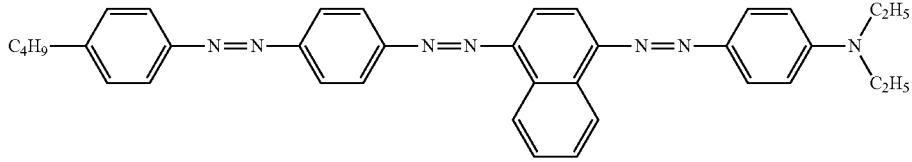
A-46
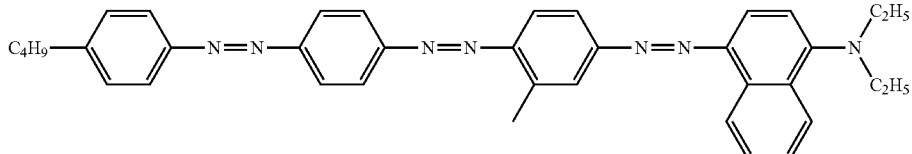
A-47
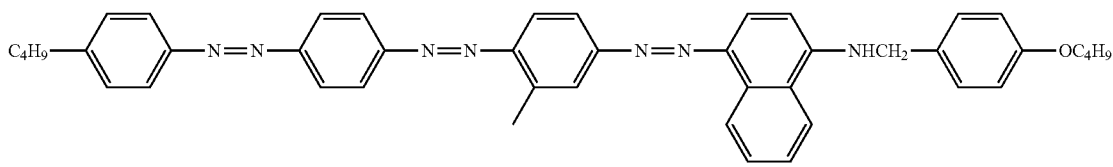
A-48
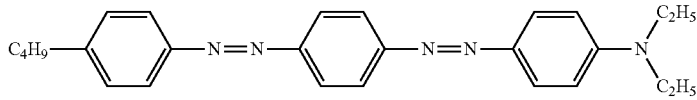
A-50
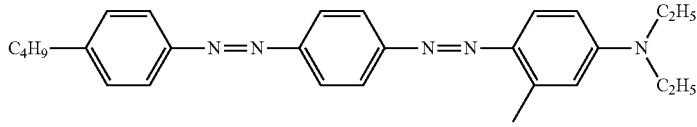
A-51
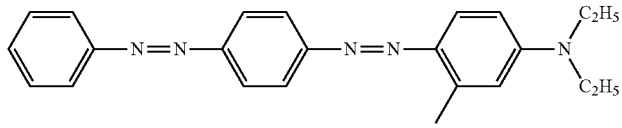
A-52
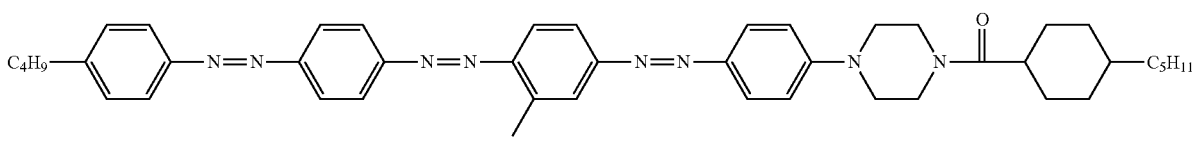
A-53
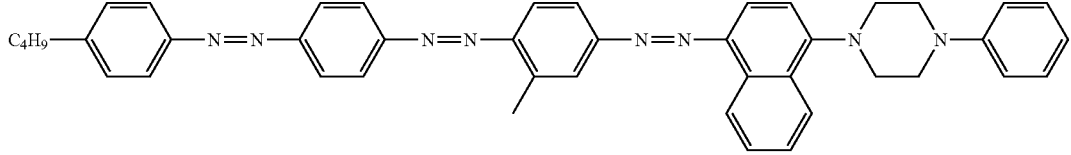
A-54
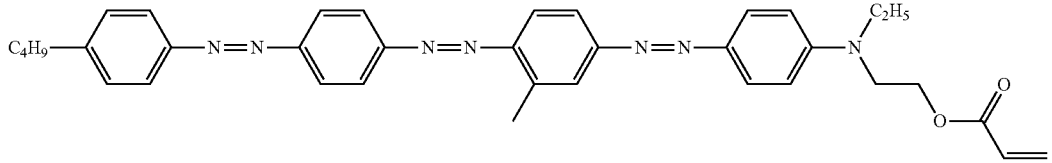
A-55

-continued
A-56
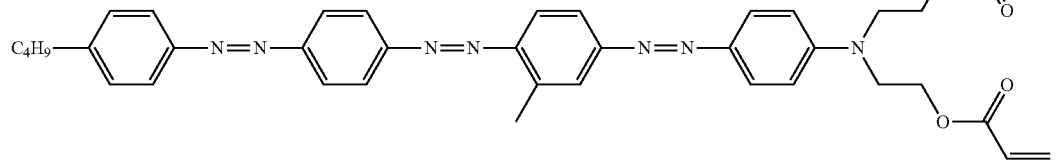
A-57
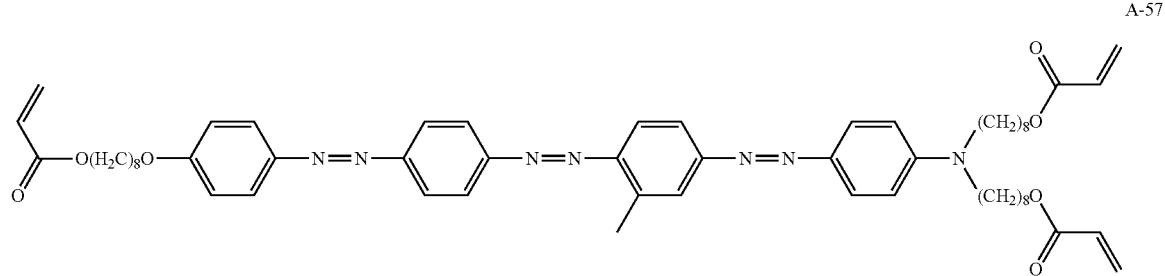
A-58
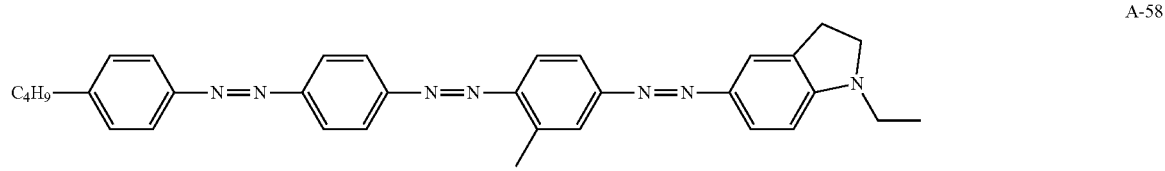
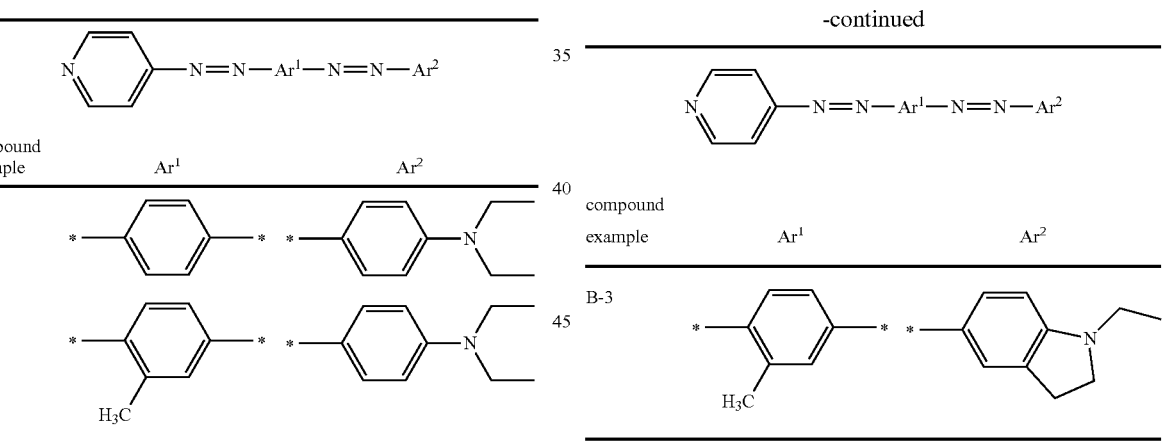
-continued
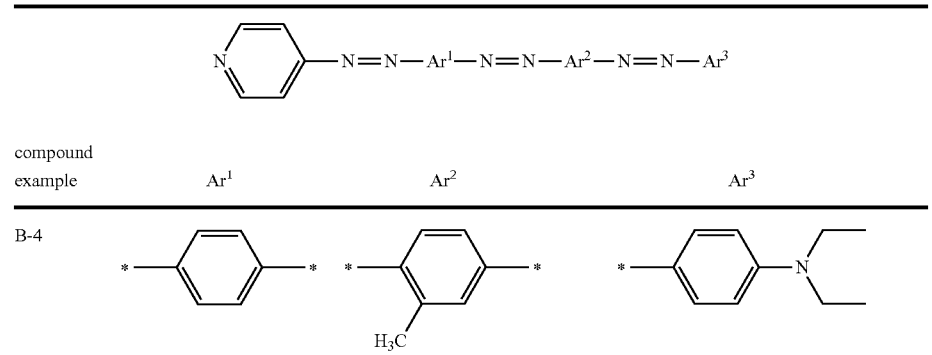

-continued

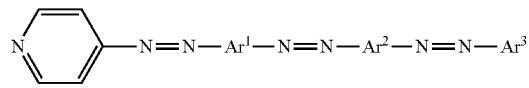

| compound example | Ar¹ | Ar² | Ar³ |
|---|---|---|---|
| B-5 | phenyl with 3-CH₃ | phenyl with 3-CH₃ | *-C₆H₄-N(Et)₂ |
| B-6 | phenyl | phenyl with 3-CH₃ | *-C₆H₄-N(butyl)₂ |
| B-7 | phenyl | phenyl with 3-CH₃ | *-C₆H₄-N(Et)(CH₂CH₂OH) |
| B-8 | phenyl | phenyl with 3-CH₃ | *-(N-ethyl indoline) |
| B-9 | phenyl | phenyl with 3-CH₃ | *-(indoline-N-(CH₂)₃CO₂H) |

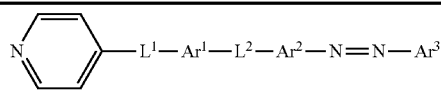

| compound example | L¹ | Ar¹ | L² | Ar² | Ar³ |
|---|---|---|---|---|---|
| B-10 | *-N=N-* | phenyl with 3-CH₃ | *-O-C(=O)-* | phenyl | *-C₆H₄-N(CH₃)(CH₂CH₂OMe) |
| B-11 | *-N=N-* | phenyl with 3-CH₃ | *-N=CH-* | phenyl | *-C₆H₄-N(Et)₂ |
| B-12 | *-CH=CH-* | phenyl | *-O-C(=O)-* | phenyl with 3-CH₃ | *-C₆H₄-N(Et)₂ |

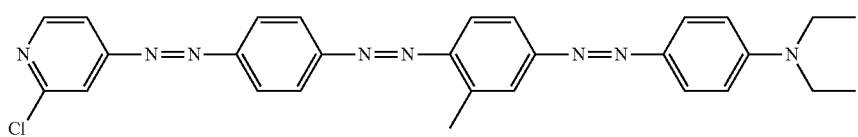
B-13
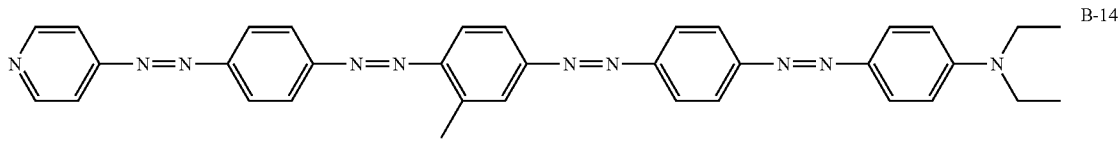
B-14
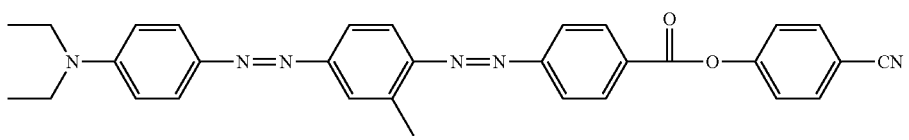
C-1
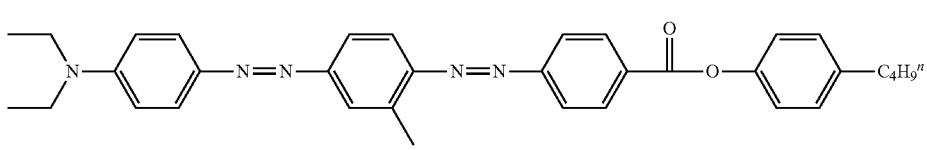
C-2
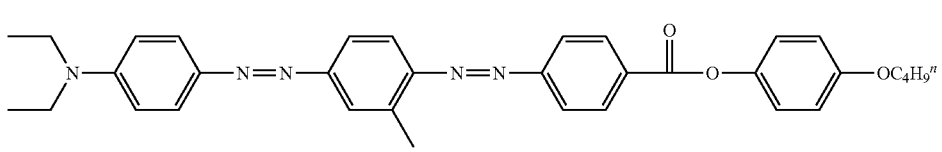
C-3
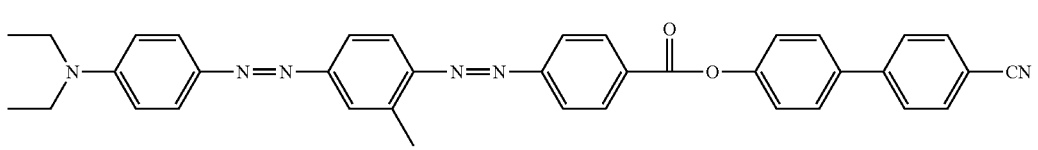
C-4
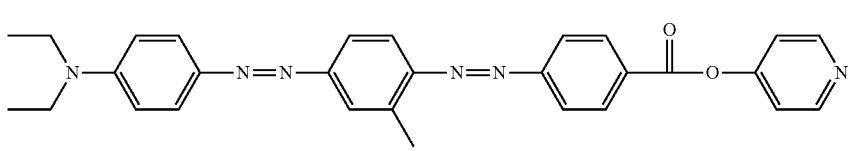
C-5
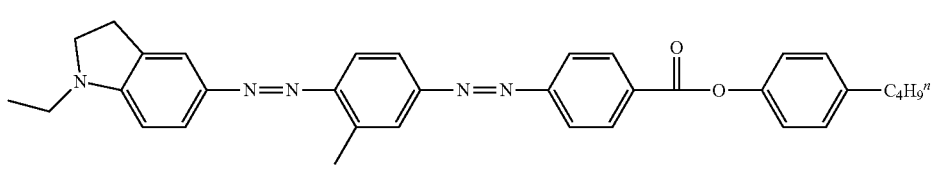
C-6
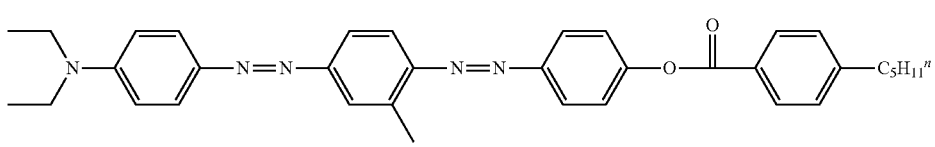
C-7
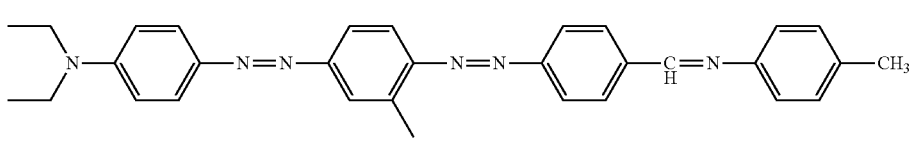
C-8
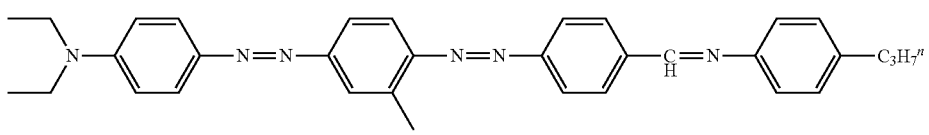
C-9

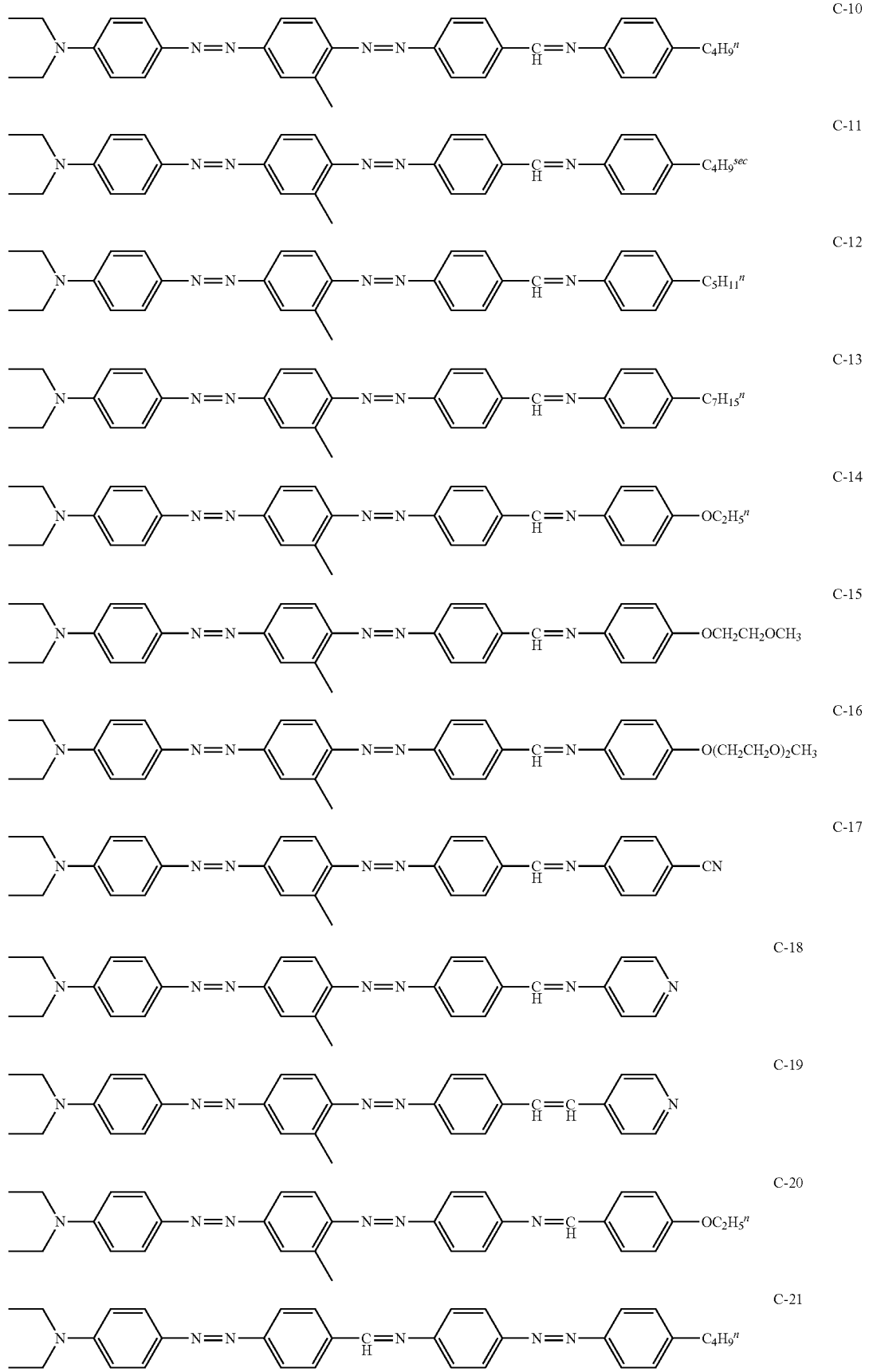

-continued
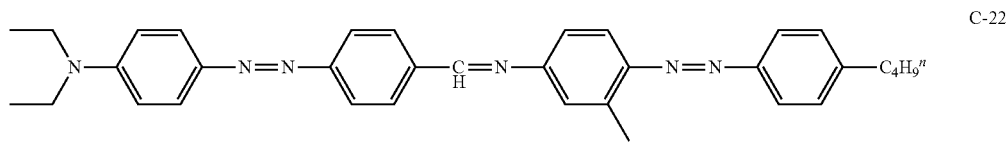
C-22
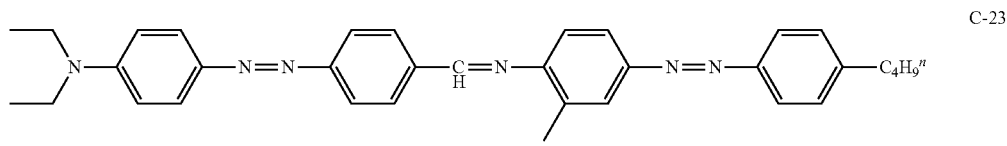
C-23
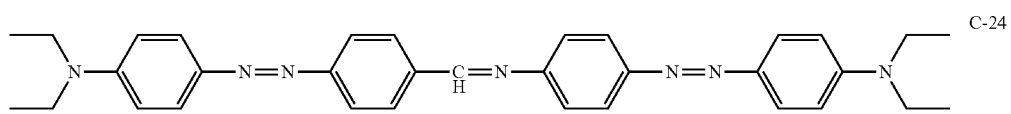
C-24
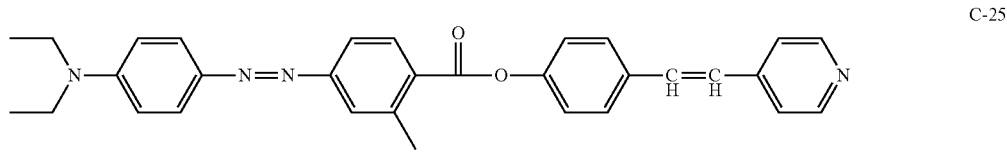
C-25
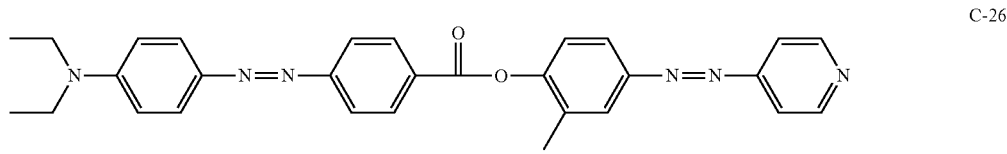
C-26
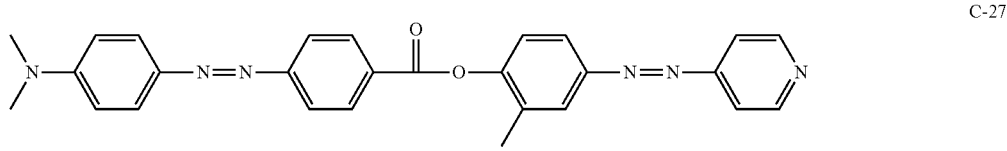
C-27
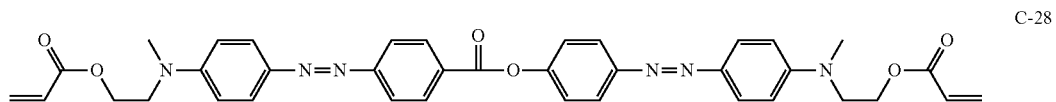
C-28
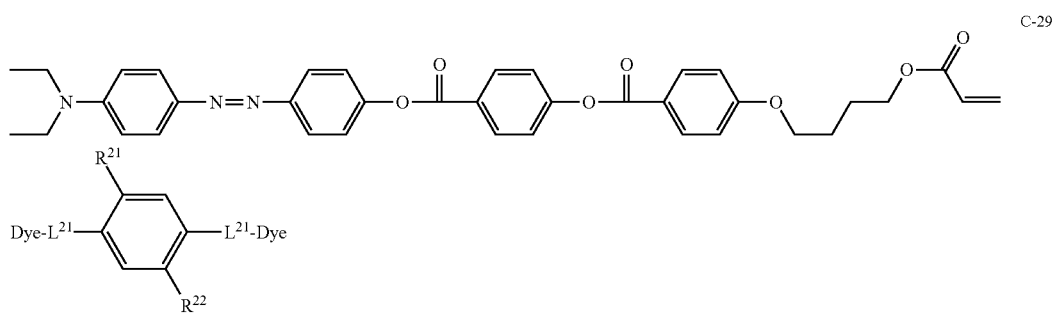
C-29

In the formula, $R^{21}$ and $R^{22}$ each represent a hydrogen atom, an alkyl group, an alkoxy group or a substituent represented by -$L^{22}$-Y, provided that at least one of them represents a group other than a hydrogen atom. $L^{22}$ represents an alkylene group, and one $CH_2$ group or non-adjacent two or more $CH_2$ groups present in the alkylene group may each be substituted with —O—, —COO—, —OCO—, —OCOO—, —NRCOO—, —OCONR—, —CO—, —S—, —SO$_2$—, —NR—, —NRSO$_2$— or —SO$_2$NR— (R represents a hydrogen atom or an alkyl group having 1 to 4 carbons). Y represents a hydrogen atom, a hydroxy group, an alkoxy group, a carboxyl group, a halogen atom or a polymerizable group.

Particularly, it is preferable that one of $R^{21}$ and $R^{22}$ is a hydrogen atom or an approximately $C_1$ to $C_4$ short chain substituent and the other of $R^{21}$ and $R^{22}$ is an approximately $C_5$ to $C_{30}$ long chain substituent, since solubility is further improved in this case. In general, it is well known that the molecular shape and anisotropy of polarizability and the like significantly affect realization of liquid crystallinity, and details thereof are described in the Liquid Crystal Handbook (2000, Maruzen) and the like. A typical skeleton of a rod-shaped liquid crystal molecule is composed of a rigid mesogen and flexible end chains along the molecular long axis direction, and in general, side substituents along the molecular short axis direction corresponding to $R^{21}$ and $R^{22}$ in the formula (II) are small substituents not disrupting rotation of the molecule, or substituents are not present. As examples characterized in side substituents, examples of stabilization of a smectic phase by introducing a hydrophilic (for example, ionic) side substituent are known, however, there are scarcely known examples realizing a stable nematic phase. Particularly, examples in which solubility is improved without lowering the orientational order parameter, by introducing a long chain substituent into a specific substitution position of a rod-shaped liquid crystalline molecule realizing a nematic phase are not known at all.

The alkyl group each represented by $R^{21}$ and $R^{22}$ includes $C_1$ to $C_{30}$ alkyl groups. As examples of the above-described short chain alkyl group, $C_1$ to $C_9$ groups are preferable and $C_1$ to $C_4$ groups are more preferable. On the other hand, as the above-described long chain alkyl group, $C_5$ to $C_{30}$ groups are preferable, $C_{10}$ to $C_{30}$ groups are more preferable and $C_{10}$ to $C_{20}$ groups are further preferable.

The alkoxy group each represented by $R^{21}$ and $R^{22}$ includes $C_1$ to $C_{30}$ alkoxy groups. As examples of the above-described short chain alkoxy group, $C_1$ to $C_8$ groups are preferable and $C_1$ to $C_3$ groups are more preferable. On the other hand, as the above-described long chain alkoxy group, $C_5$ to $C_{30}$ groups are preferable, $C_{10}$ to $C_{30}$ groups are more preferable and $C_{10}$ to $C_{20}$ groups are further preferable.

As the alkylene group represented by $L^{22}$ in the substituent represented by -$L^{22}$-Y each represented by $R^{21}$ and $R^{22}$, $C_5$ to $C_{30}$ groups are preferable, $C_{10}$ to $C_{30}$ groups are more preferable and $C_{10}$ to $C_{20}$ groups are further preferable. One $CH_2$ group or non-adjacent two or more $CH_2$ groups present in the above-described alkylene group may each be substituted with at least one selected from the group of divalent groups consisting of —O—, —COO—, —COO—, —OCOO—, —NRCOO—, —OCONR—, —CO—, —S—, —SO$_2$—, —NR—, —NRSO$_2$— and —SO$_2$NR— (R represents a hydrogen atom or an alkyl group having 1 to 4 carbons). Of course, one $CH_2$ group or non-adjacent two or more $CH_2$ groups may also be substituted with two or more groups selected from the group of the above-described divalent groups. $CH_2$ situated at the end of $L^{22}$ and linking to Y may be substituted with any of the above-described divalent groups. Further, $CH_2$ situated at the end of $L^{22}$ and linking to a phenyl group may be substituted with any of the above-described divalent groups.

Particularly, it is preferable that $L^{22}$ is an alkyleneoxy group or contains an alkyleneoxy group, and it is further preferable that $L^{22}$ is a polyethyleneoxy group represented by —$(OCH_2CH_2)_p$— (here, p represents a number of 3 or more, preferably 3 to 10, more preferably 3 to 6) or contains a polyethyleneoxy group, from the standpoint of improvement in solubility.

Examples of -$L^{22}$- include, but are not limited to, the following examples. In the following formulae, q is a number of 1 or more, preferably 1 to 10, more preferably 2 to 6. r is 5 to 30, preferably 10 to 30, more preferably 10 to 20.

—$(OCH_2CH_2)_p$—

—$(OCH_2CH_2)_p$—O—$(CH_2)_q$—

—$(OCH_2CH_2)_p$—OC(=O)—$(CH_2)_q$—

—$(OCH_2CH_2)_p$—OC(=O)NH—$(CH_2)_q$—

—O$(CH_2)_r$—

—$(CH_2)_r$—

Y in the substituent represented by -$L^{22}$-Y each represented by $R^{21}$ and $R^{22}$ represents a hydrogen atom, a hydroxy group, an alkoxy group (preferably a $C_1$ to $C_{10}$ alkoxy group, more preferably a $C_1$ to $C_5$ alkoxy group), a carboxyl group, a halogen atom or a polymerizable group.

By combining $L^{22}$ with Y, the end of -$L^{22}$-Y can be, for example, a substituent reinforcing the intermolecular interaction such as a carboxyl group, an amino group, an ammonium group and the like, and can be a leaving group such as a sulfonyloxy group, a halogen atom and the like.

The end of -$L^{22}$-Y may be a substituent forming a covalent bond to another molecule, such as a crosslinkable group, a polymerizable group and the like, and may also be a polymerizable group such as, for example, —O—C(=O)CH=CH$_2$, —O—C(=O)C(CH$_3$)=CH$_2$ and the like.

When used as a material for a curing film, Y is preferably a polymerizable group (however, here, even if the compound of the above-described formula (II) has no polymerizable group, when a compound to be used together is polymerizable, the alignment of the compound of the formula (II) can be fixed by promoting the polymerization reaction of the other compound). The polymerization reaction is preferably an addition polymerization (including ring-opening polymerization) or a condensation polymerization. That is, it is preferable that the polymerizable group is a functional group capable of performing an addition polymerization reaction or a condensation polymerization reaction. Examples of the polymerizable group represented by the above-described formula include an acrylate group represented by the following formula (M-1) and a methacrylate group represented by the following formula (M-2).

(M-1)

-continued

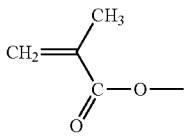
(M-2)

Also, ring-opening polymerizable groups are preferable, and for example, cyclic ether groups are preferable, an epoxy group or an oxetanyl group is more preferable and an epoxy group is particularly preferable.

$L^{12}$s in the above-described formula (II) each represent a linking group selected from the group consisting of an azo group (—N=N—), a carbonyloxy group (—C(=O)O—), an oxycarbonyl group (—O—C(=O)—), an imino group (—N=CH—) and a vinylene group (—C=C—). Among them, a vinylene group is preferable.

Dyes in the above-described formula (II) each represent an azo dye residue represented by the following formula (IIa).

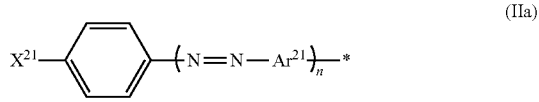
(IIa)

In the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring optionally having a substituent or aromatic hetero ring optionally having a substituent; n represents an integer of 1 to 3, and when n is 2 or more, a plurality of $Ar^{21}$s may be mutually the same or different.

The alkyl group represented by $X^{21}$ is preferably a $C_1$ to $C_{12}$ alkyl group and more preferably a $C_1$ to $C_6$ alkyl group. Specifically, a methyl group, an ethyl group, a propyl group, a butyl group and the like are mentioned. The alkyl group may have a substituent, and examples of the substituent include a hydroxy group, a carboxyl group and a polymerizable group. Preferable examples of the polymerizable group are the same as the preferable examples of the polymerizable group represented by Y described above.

The alkoxy group represented by $X^{21}$ is preferably a $C_1$ to $C_{20}$ alkoxy group, more preferably a $C_1$ to $C_{10}$ alkoxy group and further preferably a $C_1$ to $C_6$ alkoxy group. Specifically, a methoxy group, an ethoxy group, a propyloxy group, a butoxy group, a pentaoxy group, a hexaoxy group, a heptaoxy group, an octaoxy group and the like are mentioned. The alkoxy group may have a substituent, and examples of the substituent include a hydroxy group, a carboxyl group and a polymerizable group. Preferable examples of the polymerizable group are the same as the preferable examples of the polymerizable group represented by Y described above.

The substituted or un-substituted amino group represented by $X^{21}$ is preferably a $C_0$ to $C_{20}$ amino group, more preferably a $C_0$ to $C_{10}$ amino group and further preferably a $C_0$ to $C_6$ amino group. Specifically, an un-substituted amino group, a methylamino group, a dimethylamino group, a diethylamino group, a methyl.hexylamino group, an anilino group and the like are mentioned.

Among them, $X^{21}$ is preferably an alkoxy group.

In the above-described formula (II), $Ar^{21}$ represents an aromatic hydrocarbon ring group optionally having a substituent or aromatic heterocyclic group optionally having a substituent. Examples of the aromatic hydrocarbon ring group and the aromatic heterocyclic group include a 1,4-phenylene group, a 1,4-naphthylene group, a pyridine ring group, a pyrimidine ring group, a pyrazine ring group, a quinoline ring group, a thiophene ring group, a thiazole ring group, a thiadiazole ring group, a thienothiazole ring group and the like. Among them, a 1,4-phenylene group, a 1,4-naphthylene group and a thienothiazole ring group are preferable and a 1,4-phenylene group is most preferable.

The substituent optionally carried on $Ar^{21}$ includes preferably an alkyl group having 1 to 10 carbons, a hydroxy group, an alkoxy group having 1 to 10 carbons, a cyano group and the like, more preferably an alkyl group having 1 to 2 carbons and an alkoxy group having 1 to 2 carbons.

n is preferably 1 or 2 and more preferably 1.

Examples of the compound represented by the above-described formula (II) include compounds represented by the following formula (IIb). The meaning of each symbol in the formula is the same as those in the formula (II), and also the preferable range thereof is the same as for the formula (II).

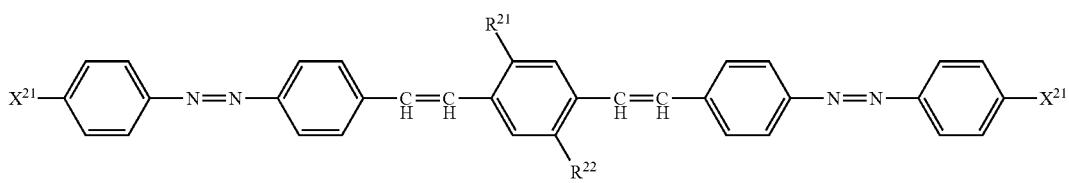
(IIb)

In the formula, it is preferable that $X^{21}$s are mutually the same or different and represent a $C_{1-12}$ alkoxy group; it is preferable that $R^{21}$ and $R^{22}$ are mutually different, and it is preferable that one of $R^{21}$ and $R^{22}$ is a hydrogen atom or a $C_1$ to $C_4$ short chain substituent (an alkyl group, an alkoxy group or a substituent represented by -$L^{22}$-Y) and the other of $R^{21}$ and $R^{22}$ is a $C_5$ to $C_{30}$ long chain substituent (an alkyl group, an alkoxy group or a substituent represented by -$L^{22}$-Y). Alternatively, it is also preferable that $R^{21}$ and $R^{22}$ each represent a substituent represented by -$L^{22}$-Y and $L^{22}$ is an alkyleneoxy group or contains an alkyleneoxy group.

Specific examples of the compound represented by the above-described formula (II) include, but are not limited to, the following compound examples.

| | A | R | R' |
|---|---|---|---|
| A2-1 | n-C$_2$H$_5$O—〈C$_6$H$_4$〉—N=N—〈C$_6$H$_4$〉—CH=CH— | MeO | —(OCH$_2$CH$_2$)$_3$—OMe |
| A2-2 | n-C$_4$H$_9$O—〈C$_6$H$_4$〉—N=N—〈C$_6$H$_4$〉—CH=CH— | MeO | —(OCH$_2$CH$_2$)$_3$—OMe |
| A2-3 | n-C$_6$H$_{13}$O—〈C$_6$H$_4$〉—N=N—〈C$_6$H$_4$〉—CH=CH— | MeO | —(OCH$_2$CH$_2$)$_3$—OMe |
| A2-4 | n-C$_6$H$_{13}$O—〈C$_6$H$_4$〉—N=N—〈C$_6$H$_4$〉—CH=CH— | MeO | —(OCH$_2$CH$_2$)$_3$—OH |
| A2-5 | n-C$_6$H$_{13}$O—〈C$_6$H$_4$〉—N=N—〈C$_6$H$_4$〉—CH=CH— | MeO | —(OCH$_2$CH$_2$)$_6$—OH |
| A2-6 | n-C$_6$H$_{13}$O—〈C$_6$H$_4$〉—N=N—〈C$_6$H$_4$〉—CH=CH— | MeO | —(OCH$_2$CH$_2$)$_3$—O—C(=O)—CH=CH$_2$ |
| A2-7 | n-C$_6$H$_{13}$O—〈C$_6$H$_4$〉—N=N—〈C$_6$H$_4$〉—CH=CH— | MeO | —(OCH$_2$CH$_3$)$_3$—O—C(=O)—CH$_2$CH$_2$—CO$_2$H |
| A2-8 | n-C$_6$H$_{13}$O—〈C$_6$H$_4$〉—N=N—〈C$_6$H$_4$〉—CH=CH— | MeO | —(OCH$_2$CH$_2$)$_3$—O—C(=O)—NH—CH$_2$CH$_2$—O—C(=O)—C(CH$_3$)=CH$_2$ |
| A2-9 | n-C$_6$H$_{13}$O—〈C$_6$H$_4$〉—N=N—〈C$_6$H$_4$〉—CH=CH— | MeO | —OC$_{18}$H$_{37}$-n |
| A2-10 | n-C$_6$H$_{13}$O—〈C$_6$H$_4$〉—N=N—〈C$_6$H$_4$〉—CH=CH— | —(OCH$_2$CH$_2$)$_3$—OMe | —(OCH$_2$CH$_2$)$_3$—OMe |
| A2-11 | n-C$_{12}$H$_{25}$O—〈C$_6$H$_4$〉—N=N—〈C$_6$H$_4$〉—CH=CH— | MeO | —(OCH$_2$CH$_2$)$_3$—OMe |
| A2-12 | HO—(CH$_2$)$_3$—〈C$_6$H$_4$〉—N=N—〈C$_6$H$_4$〉—CH=CH— | MeO | —(OCH$_2$CH$_2$)$_3$—OH |
| A2-13 | CH$_2$=CH—C(=O)—O—(CH$_2$)$_3$—〈C$_6$H$_4$〉—N=N—〈C$_6$H$_4$〉—CH=CH— | MeO | —(OCH$_2$CH$_2$)$_3$—O—C(=O)—CH=CH$_2$ |
| A2-14 | CH$_2$=CH—C(=O)—O—(CH$_2$)$_3$—〈C$_6$H$_4$〉—N=N—〈C$_6$H$_4$〉—CH=CH— | MeO | —(OCH$_2$CH$_2$)$_3$—OMe |

| | A | R | R' |
|---|---|---|---|
| A2-15 | Et₂N-C₆H₄-N=N-C₆H₄-CH=CH- | MeO | —(OCH₂CH₂)₃—OH |
| A2-16 | Et₂N-C₆H₄-N=N-C₆H₄-CH=CH- | MeO | —OC₁₈H₃₇-n |
| A2-17 | (Me)(n-C₆H₁₃)N-C₆H₄-N=N-C₆H₄-CH=CH- | MeO | —(OCH₂CH₂)₃—OH |
| A2-18 | Et₂N-C₆H₄-N=N-(naphthyl)-CH=CH- | MeO | —(OCH₂CH₂)₃—OH |
| A2-19 | Et₂N-C₆H₄-N=N-(4-methylthiazol-2,5-diyl)-CH=CH- | MeO | —(OCH₂CH₂)₃—OH |
| A2-20 | Et₂N-C₆H₄-N=N-(thieno[3,2-d]thiazol-2,5-diyl)-CH=CH- | MeO | —(OCH₂CH₂)₃—OH |
| A2-21 | Et₂N-C₆H₄-N=N-(2-methyl-1,4-phenylene)-N=N-C₆H₄-CH=CH- | MeO | —(OCH₂CH₂)₃—OH |
| A2-22 | Et₂N-C₆H₄-N=N-(naphthalene-1,4-diyl)-N=N-C₆H₄-CH=CH- | MeO | —(OCH₂CH₂)₃—OH |
| A2-23 | Et₂N-C₆H₄-N=N-(thieno[3,2-d]thiazole-2,5-diyl)-N=N-C₆H₄-CH=CH- | MeO | —(OCH₂CH₂)₃—OH |

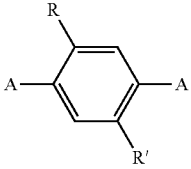

| A | | R | R' |
|---|---|---|---|
| A2-24 | n-C₆H₁₃O—⟨⟩—N=N—⟨⟩—N=CH—* | MeO | *—(OCH₂CH₂)₃—OH |
| A2-25 | n-C₆H₁₃O—⟨⟩—N=N—⟨⟩—N=CH—* | MeO | *—OC₁₂H₂₅-n |
| A2-26 | Et₂N—⟨⟩—N=N—⟨⟩—N=CH—* | MeO | *—(OCH₂CH₂)₃—OH |
| A2-27 | n-C₄H₉O—⟨⟩—N=N—⟨⟩—C(O)O—* | MeO | *—(OCH₂CH₂)₆—OH |
| A2-28 | n-C₄H₉O—⟨⟩—N=N—⟨⟩—C(O)O—* | H | *—OC₁₈H₃₇-n |
| A2-29 | (Me)(n-C₆H₁₃)N—⟨⟩—N=N—⟨⟩—C(O)O—* | MeO | *—(OCH₂CH₂)₃—OMe |
| A2-30 | Et₂N—⟨⟩—N=N—[thienothiazole]—C(O)O—* | MeO | *—(OCH₂CH₂)₃—OH |
| A2-31 | n-C₆H₁₃O—⟨⟩—N=N—⟨⟩—N=N—* | MeO | *—(OCH₂CH₂)₃—OH |
| A2-32 | n-C₆H₁₃O—⟨⟩—N=N—⟨⟩—N=N—* | MeO | *—(OCH₂CH₂CH₂)₃—OH |
| A2-33 | Et₂N—⟨⟩—N=N—⟨⟩—N=N—* | MeO | *—(OCH₂CH₂)₃—OMe |
| A2-34 | n-C₆H₁₃O—⟨⟩—N=N—⟨⟩—CH=CH—* | MeO | MeO |

Formula (III)

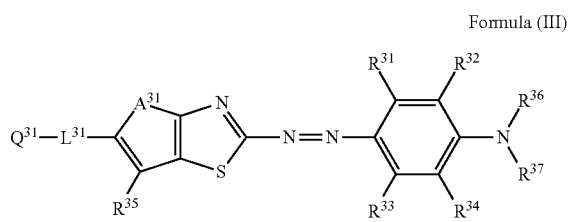

In the formula, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group optionally having a substituent, an aromatic heterocyclic group or a cyclohexane ring group; $L^{31}$ represents a divalent linking group; $A^{31}$ represents an oxygen atom or a sulfur atom.

Examples of the substituent represented by $R^{31}$ to $R^{35}$ are the same as the examples of the substituent each represented by $R^{11}$ to $R^{14}$ in the above-described formula (I). The examples thereof include preferably a hydrogen atom, an alkyl group, an alkoxy group and a halogen atom, particularly preferably a hydrogen atom, an alkyl group and an alkoxy group and most preferably a hydrogen atom or methyl group.

The alkyl group optionally having a substituent represented by $R^{36}$ and $R^{37}$ in the above-described formula (III) is an alkyl group preferably having 1 to 20 carbons, more preferably having 1 to 12 carbons and particularly preferably having 1 to 8 carbons, and examples thereof include a methyl group, an ethyl group, an n-octyl group and the like. The substituent on the alkyl group represented by $R^{36}$ and $R^{37}$ is the same as the substituent represented by $R^{31}$ to $R^{35}$ described above. When $R^{36}$ and $R^{37}$ represent an alkyl group, they may be mutually linked to form a cyclic structure. When $R^{36}$ or $R^{37}$ represents an alkyl group, each of them may be linked to $R^{32}$ or $R^{34}$ to form a cyclic structure.

The group represented by $R^{36}$ and $R^{37}$ is particularly preferably a hydrogen atom or an alkyl group and further preferably a hydrogen atom, a methyl group or an ethyl group.

In the above-described formula (III), $Q^{31}$ represents an aromatic hydrocarbon group optionally having a substituent (preferably having 1 to 20 carbons and more preferably having 1 to 10 carbons, and examples thereof include a phenyl group, a naphthyl group and the like), an aromatic heterocyclic group optionally having a substituent or a cyclohexane ring group optionally having a substituent.

The substituent optionally carried on the group represented by $Q^{31}$ is preferably a group introduced to enhance solubility or nematic liquid crystallinity of an azo compound, a group having an electron donative property or an electron withdrawing property introduced to adjust the color tone as a dye or a group having a polymerizable group introduced to fix alignment, and specifically, is the same as the substituent represented by $R^{31}$ to $R^{35}$ described above. Preferable are an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, and particularly preferable are an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of the above-mentioned substituents having a carbon atom is the same as the preferable range of the number of carbon atoms for the substituents represented by $R^{31}$ to $R^{35}$.

The aromatic hydrocarbon group, the aromatic heterocyclic group or the cyclohexane ring group may have 1 to 5 of these substituents, and preferably, has one substituent. When $Q^{31}$ is a phenyl group, it is preferable that one substituent is carried at a para-position with respect to $L^{31}$, and when $Q^{31}$ is a cyclohexane ring group, it is preferable that one substituent is carried in trans configuration at a 4-position with respect to $L^{31}$.

As the aromatic heterocyclic group represented by $Q^{31}$, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, a thiophenyl group, a thiazolyl group, a benzothiazolyl group, a thiadiazolyl group, a quinolonyl group, a naphthalimidyl group, a thienothiazolyl group and the like.

The aromatic heterocyclic group is preferably a pyridyl group, a quinolyl group, a thiazolyl group, a benzothiazolyl group, a thiadiazolyl group or a thienothiazolyl group, particularly preferably a pyridyl group, a benzothiazolyl group, a thiadiazolyl group or a thienothiazolyl group, most preferably a pyridyl group, a benzothiazolyl group or a thienothiazolyl group.

The group represented by $Q^{31}$ is particularly preferably a phenyl group optionally having a substituent, a naphthyl group optionally having a substituent, a pyridyl group optionally having a substituent, a benzothiazolyl group optionally having a substituent, a thienothiazolyl group optionally having a substituent or a cyclohexane ring group, more preferably a phenyl group, a pyridyl group, a benzothiazolyl group or a cyclohexane ring group.

The linking group represented by $L^{31}$ in the above-described formula (III) includes a single bond, alkylene groups (preferably having 1 to 20 carbons, more preferably having 1 to 10 carbons and particularly preferably having 1 to 6 carbons, and examples thereof include a methylene group, an ethylene group, a propylene group, a butylene group, a pentylene group, a cyclohexane-1,4-diyl group and the like), alkenylene groups (preferably having 2 to 20 carbons, more preferably having 2 to 10 carbons and particularly preferably having 2 to 6 carbons, and examples thereof include an ethenylene group and the like), alkynylene groups (preferably having 2 to 20 carbons, more preferably having 2 to 10 carbons and particularly preferably having 2 to 6 carbons, and examples thereof include an ethynylene group and the like), alkyleneoxy groups (preferably having 1 to 20 carbons, more preferably having 1 to 10 carbons and particularly preferably having 1 to 6 carbons, and examples thereof include a methyleneoxy group and the like), an amide group, an ether group, an acyloxy group (—C(=O)O—), an oxycarbonyl group (—OC(=O)—), an imino group (—CH=N— or —N=CH—), a sulfoamide group, a sulfonate group, a ureide group, a sulfonyl group, a sulfinyl group, a thioether group, a carbonyl group, an —NR— group (here, R represents a hydrogen atom, an alkyl group or an aryl group), an azo group, an azoxy group, or divalent linking groups having 0 to 60 carbons constituted by combining two or more of them.

The group represented by $L^{31}$ is particularly preferably a single bond, an amide group, an acyloxy group, an oxycarbonyl group, an imino group, an azo group or an azoxy group, more further preferably an azo group, an acyloxy group, an oxycarbonyl group or an imino group.

In the above-described formula (III), $A^{31}$ represents an oxygen atom or a sulfur atom, preferably a sulfur atom.

The compound represented by the above-described formula (III) may have a polymerizable group as a substituent. It is preferable to have a polymerizable group since a film curing property is improved. Examples of the polymerizable group include unsaturated polymerizable groups, an epoxy group and an aziridinyl group, and unsaturated polymerizable groups are preferable and an ethylenically unsaturated polymerizable group is particularly preferable. Examples of the ethylenically unsaturated polymerizable group include an acryloyl group and a methacryloyl group.

It is preferable that the polymerizable group is situated at the molecular end, that is, it is preferable that, in the formula (III), the polymerizable group is present as a substituent of $R^{36}$ and/or $R^{37}$ and as a substituent of $Q^1$.

Among compounds represented by the above-described formula (III), particularly preferable are compounds represented by the following formula (IIIa).

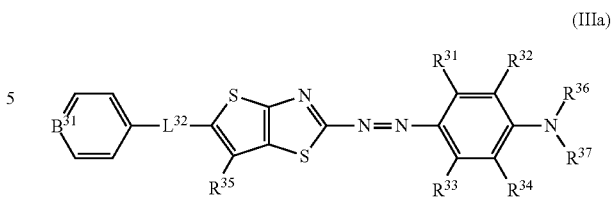

In the formula, $R^{31}$ to $R^{35}$ are the same as those in the above-described formula (III), and also the preferable range thereof is the same as for the formula (III). $B^{31}$ represents a nitrogen atom or a carbon atom optionally having a substituent; $L^{32}$ represents an azo group, an acyloxy group (—C(=O)O—), an oxycarbonyl group (—OC(=O)—) or an imino group.

In the above-described formula (IIIa), $R^{35}$ represents preferably a hydrogen atom or a methyl group and more preferably a hydrogen atom.

The substituent optionally carried when $B^{31}$ is a carbon atom in the above-described formula (IIIa) is the same as the substituent optionally carried on $Q^{31}$ in the above-described formula (III), and also the preferable range thereof is the same as for the formula (III).

In the above-described formula (IIIa), $L^{32}$ represents an azo group, an acyloxy group, an oxycarbonyl group or an imino group, preferably an azo group, an acyloxy group or an oxycarbonyl group and more preferably an azo group.

Specific examples of the compound represented by the formula (III) include, but are not limited to, the following specific examples.

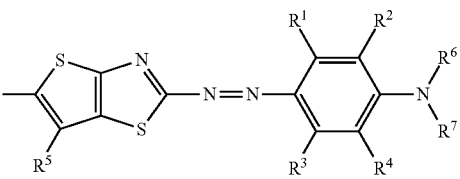

| No. | $R^1$ | $R^2$ | $R^3$ | $R^4$ | $R^5$ | $R^6$ | $R^7$ | R |
|---|---|---|---|---|---|---|---|---|
| A3-1 | —H | —H | —H | —H | —H | —$C_2H_5$ | —$C_2H_5$ | —$C_4H_9$ |
| A3-2 | —H | —H | —H | —H | —H | —$C_2H_5$ | —$C_2H_5$ | —$C_6H_{13}$ |
| A3-3 | —H | —H | —H | —H | —H | —$C_2H_5$ | —$C_2H_5$ | —$C_7H_{15}$ |
| A3-4 | —H | —H | —H | —H | —H | —$C_2H_5$ | —$C_2H_5$ | —$OC_4H_9$ |
| A3-5 | —H | —H | —H | —H | —H | —$C_2H_5$ | —$C_2H_5$ | —$CF_3$ |
| A3-6 | —H | —H | —H | —H | —H | —$C_2H_5$ | —$C_2H_5$ | —OH |
| A3-7 | —H | —H | —H | —H | —H | —$C_2H_5$ | —$C_2H_5$ | —CN |
| A3-8 | —H | —H | —H | —H | —H | —$C_2H_5$ | —$C_2H_5$ | —$NO_2$ |
| A3-9 | —H | —H | —H | —H | —H | —$C_2H_5$ | —$C_2H_5$ | —F |
| A3-10 | —H | —H | —H | —H | —H | —$C_2H_5$ | —$C_2H_5$ | —Br |
| A3-11 | —H | —H | —H | —H | —H | —$C_2H_5$ | —$C_2H_5$ | —I |
| A3-12 | —H | —H | —H | —H | —H | —$CH_3$ | —H | —$C_4H_9$ |
| A3-13 | —H | —H | —H | —H | —H | —$CH_3$ | —$CH_3$ | —$C_4H_9$ |
| A3-14 | —H | —H | —H | —H | —H | —$CH_3$ | —$C_6H_{13}$ | —$C_4H_9$ |
| A3-15 | —H | —H | —H | —H | —H | —$CH_3$ | —$CH_2CH_2OH$ | —$C_4H_9$ |
| A3-16 | —H | —H | —H | —H | —H | —$CH_3$ | —$CH_2CH_2OCH_3$ | —$C_4H_9$ |
| A3-17 | —H | —H | —H | —H | —H | —$CH_3$ | —$CH_2CH_2OCOCH=CH_2$ | —$C_4H_9$ |
| A3-18 | —H | —H | —H | —H | —H | —$CH_3$ | —$CH_2CH_2CN$ | —$C_4H_9$ |
| A3-19 | —H | —H | —H | —H | —H | —$CH_2CH_2OCOCH=CH_2$ | —$CH_2CH_2OCOCH=CH_2$ | —$C_4H_9$ |
| A3-20 | —$CH_3$ | —H | —H | —H | —H | —$C_2H_5$ | —$C_2H_5$ | —$C_4H_9$ |
| A3-21 | —F | —H | —H | —H | —H | —$C_2H_5$ | —$C_2H_5$ | —$C_4H_9$ |
| A3-22 | —Cl | —H | —H | —H | —H | —$C_2H_5$ | —$C_2H_5$ | —$C_4H_9$ |
| A3-23 | —OH | —H | —H | —H | —H | —$C_2H_5$ | —$C_2H_5$ | —$C_4H_9$ |
| A3-24 | —$OCH_3$ | —H | —H | —H | —H | —$C_2H_5$ | —$C_2H_5$ | —$C_4H_9$ |
| A3-25 | —H | —$OCH_3$ | —$OCH_3$ | —H | —H | —$C_2H_5$ | —$C_2H_5$ | —$C_4H_9$ |
| A3-26 | —H | —H | —H | —H | —$CH_3$ | —$C_2H_5$ | —$C_2H_5$ | —$C_4H_9$ |

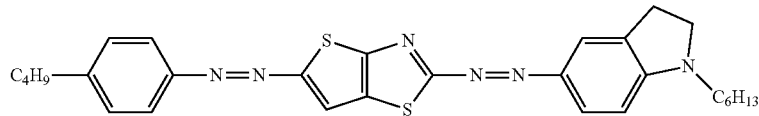
(A3-27)
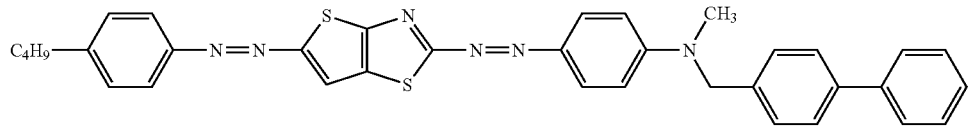
(A3-28)
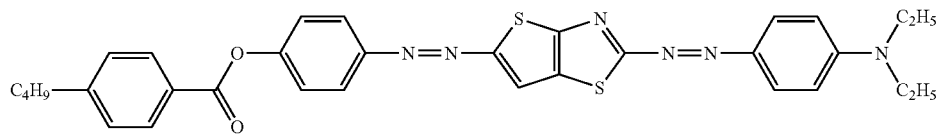
(A3-29)
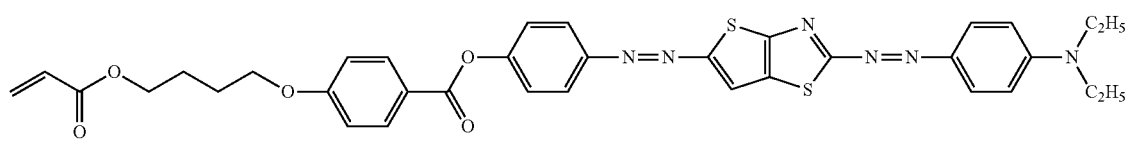
(A3-30)
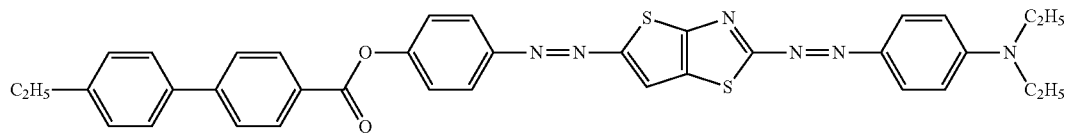
(A3-31)
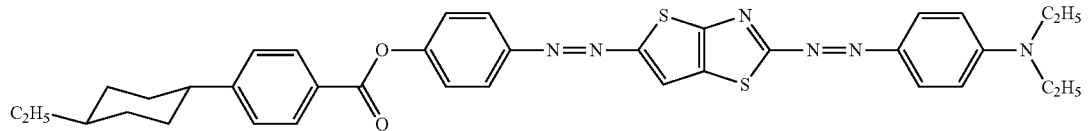
(A3-32)
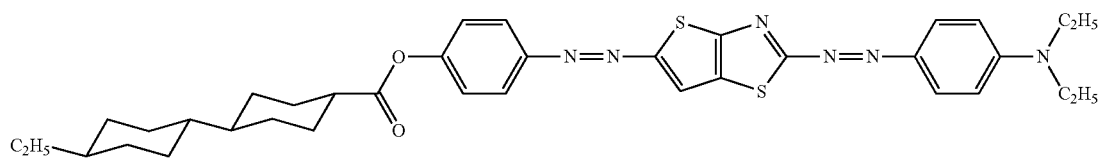
(A3-33)
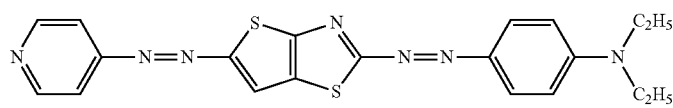
(A3-34)
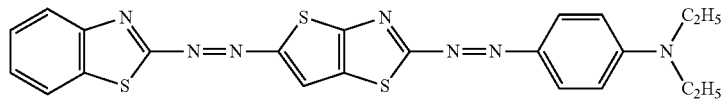
(A3-35)
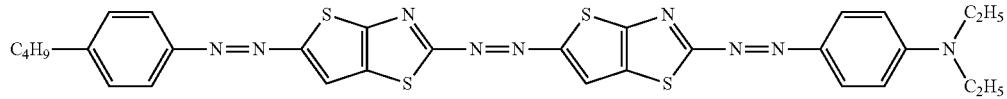
(A3-36)

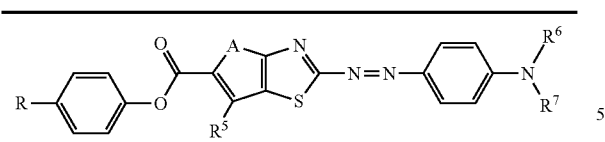
| No.   | A | R⁵   | R⁶    | R⁷    | R      |
|-------|---|------|-------|-------|--------|
| A3-37 | S | —H   | —C₂H₅ | —C₂H₅ | —C₄H₉  |
| A3-38 | S | —H   | —C₂H₅ | —C₂H₅ | —C₇H₁₅ |
| A3-39 | S | —H   | —C₂H₅ | —C₂H₅ | —CN    |
| A3-40 | S | —H   | —C₂H₅ | —C₂H₅ | —Br    |
| A3-41 | S | —CH₃ | —C₂H₅ | —C₂H₅ | —C₄H₉  |
| A3-42 | S | —H   | —CH₃  | —CH₃  | —C₄H₉  |
| A3-43 | O | —H   | —C₂H₅ | —C₂H₅ | —C₄H₉  |
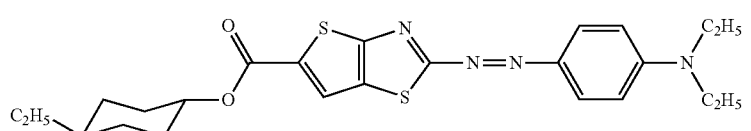
(A3-44)
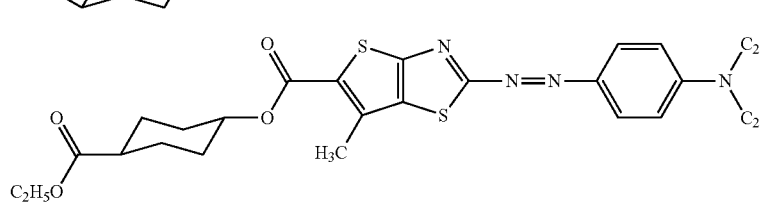
(A3-45)
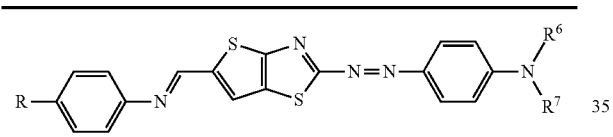
| No.   | R⁶    | R⁷    | R      |
|-------|-------|-------|--------|
| A3-46 | —C₂H₅ | —C₂H₅ | —C₄H₉  |
| A3-47 | —C₂H₅ | —C₂H₅ | —OC₄H₉ |
| A3-48 | —C₂H₅ | —C₂H₅ | —CF₃   |
| A3-49 | —C₂H₅ | —C₂H₅ | —F     |
| A3-50 | —CH₃  | —CH₃  | —C₄H₉  |
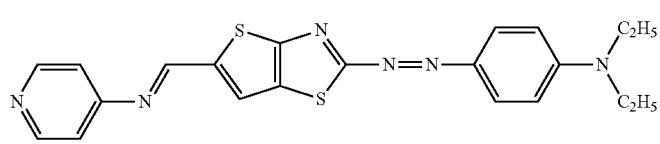
(A3-51)
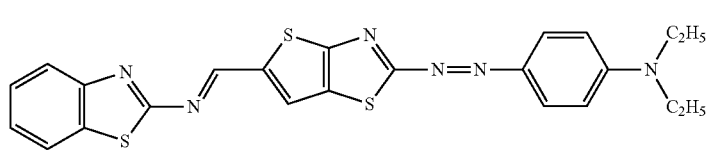
(A3-52)
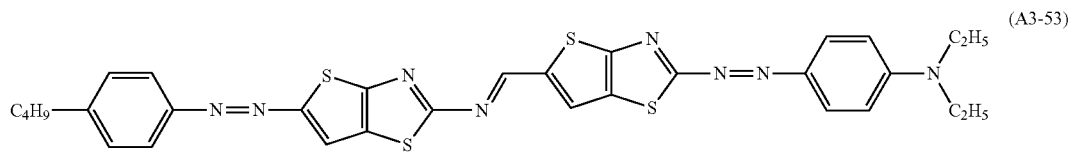
(A3-53)

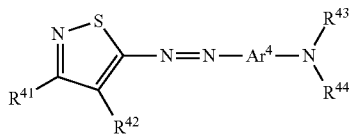

In the formula, $R^{41}$ and $R^{42}$ each represent a hydrogen atom or a substituent, and may be mutually linked to form a ring; $Ar^4$ represents an optionally substituted divalent aromatic hydrocarbon group or aromatic heterocyclic group; $R^{43}$ and $R^{44}$ each represent a hydrogen atom or an optionally substituted alkyl group, and may be mutually linked to form a hetero ring.

Examples of the substituent each represented by $R^{41}$ and $R^{42}$ in the formula (IV) are the same as examples of the substituent each represented by $R^{11}$ to $R^{14}$ in the above-described formula (I). $R^{41}$ and $R^{42}$ include preferably a hydrogen atom, an alkyl group, an alkoxy group, a halogen atom, a cyano group, a nitro group and a sulfo group, more preferably a hydrogen atom, an alkyl group, a halogen atom, a cyano group and a nitro group, further preferably a hydrogen atom, an alkyl group and a cyano group and more further preferably a hydrogen atom, a methyl group and a cyano group.

It is also preferable that $R^{41}$ and $R^{42}$ are mutually linked to form a ring. Particularly, it is preferable to form an aromatic hydrocarbon group or an aromatic heterocyclic group. As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The cyclic group formed by mutually linking $R^{41}$ and $R^{42}$ is preferably a benzene ring, a naphthalene ring, a pyridine ring, a pyrazine ring, a pyrimidine ring or a pyridazine ring, more preferably a benzene ring or a pyridine ring and most preferably a pyridine ring.

The cyclic group formed by mutually linking $R^{41}$ and $R^{42}$ may have a substituent, and the range thereof is the same as the range of the group represented by $R^1$ and $R^2$, and also the preferable range thereof is the same as for the group represented by $R^1$ and $R^2$.

Examples of the compound represented by the above-described formula (IV) include compounds represented by the following formula (IV').

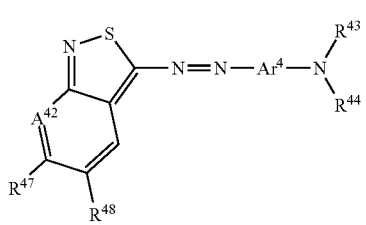

Formula (IV')

In the formula, the same symbols as in the formula (IV) have the same meanings, and also the preferable range thereof is the same. $A^{42}$ represents N or CH, and $R^{47}$ and $R^{48}$ each represent a hydrogen atom or a substituent. It is preferable that one of $R^{47}$ and $R^{48}$ is a substituent, and it is also preferable that $R^{47}$ and $R^{48}$ both represent a substituent. Preferable examples of the substituent are the same as examples of the substituent represented by $R^{41}$ and $R^{42}$, that is, preferable are an alkyl group, an alkoxy group, a halogen atom, a cyano group, a nitro group and a sulfo group, more preferable are an alkyl group, a halogen atom, a cyano group and a nitro group, further preferable are an alkyl group and a cyano group and most preferable are a methyl group and a cyano group. For example, compounds in which one of $R^{47}$ and $R^{48}$ is an alkyl group having the number of carbon atoms of 1 to 4 and the other is a cyano group are also preferable.

As the aromatic heterocyclic group represented by $Ar^4$ in the formula (IV'), groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The group represented by $Ar^4$ is preferably a benzene ring, a naphthalene ring, a pyridine ring, a pyrazine ring, a pyrimidine ring, a pyridazine ring, a quinoline ring or a thiophene ring, more preferably a benzene ring, a naphthalene ring, a pyridine ring or a thiophene ring and most preferably a benzene ring.

$Ar^4$ may have a substituent, and the range thereof is the same as for the group represented by $R^{41}$ and $R^{42}$ described above.

The substituent optionally carried on $Ar^4$ is preferably an alkyl group, an alkoxy group or a halogen atom, more preferably a hydrogen atom, an alkyl group or an alkoxy group, more further preferably a methyl group. It is also preferable that $Ar^4$ has no substituent.

It is preferable that a linkage of $Ar^4$ and an amino group is parallel to a linkage of $Ar^4$ and an azo group, since linearity of a molecule is enhanced and a larger molecular length and larger aspect ratio are obtained in this condition. For example, when $Ar^4$ contains a 6-membered ring linked to an azo group and amino group, it is preferable that an amino group is linked to 4-position with respect to an azo group, and when $Ar^4$ contains a 5-membered ring linked to an azo group and amino group, it is preferable that an amino group is linked to 3- or 4-position with respect to an azo group.

The range of the alkyl group represented by $R^{43}$ and $R^{44}$ in the formula (IV') is the same as for the alkyl group represented by $R^{41}$ and $R^{42}$ described above. The alkyl group may have a substituent, and examples of the substituent are the same as examples of the substituent represented by $R^{41}$ and $R^{42}$. When $R^{43}$ and $R^{44}$ represent an optionally substituted alkyl group, these may be mutually linked to form a hetero ring. If possible, these may be linked to the substituent carried on $Ar^4$ to form a ring.

It is preferable that $R^{43}$ and $R^{44}$ are mutually linked to form a ring. A 6-membered ring or a 5-membered ring is preferable and a 6-membered ring is more preferable. The cyclic group may have an atom other than carbon as the constituent atom, together with carbon. The constituent atom other than carbon includes a nitrogen atom, a sulfur atom and an oxygen atom. When the cyclic group has two or more ring constituent atoms other than carbon, these may be the same or different.

The cyclic group composed of $R^{43}$ and $R^{44}$ includes, specifically, a 3-pyrroline ring, a pyrrolidine ring, a 3-imidazoline ring, an imidazolidine ring, a 4-oxazoline ring, an oxazolidine ring, a 4-thiazoline ring, a thiazolidine ring, a piperidine ring, a piperazine ring, a morpholine ring, a thiomorpholine ring, an azepan ring, an azocan ring and the like.

The cyclic group composed of $R^{43}$ and $R^{44}$ is preferably a pyrrolidine ring, a piperidine ring, a piperazine ring or a morpholine ring, more preferably a piperidine ring or a piperazine ring and most preferably a piperazine ring.

The cyclic group composed of $R^{43}$ and $R^{44}$ may have a substituent, and the range thereof is the same as for the group represented by $R^{41}$ and $R^{42}$. It is preferable that the cyclic group has one rigid linear substituent and a linkage of the cyclic group and the substituent is parallel to a linkage of the cyclic group and $Ar^4$, since linearity of a molecule is enhanced and a larger molecular length and larger aspect ratio are obtained in this condition.

Among dichroic dyes represented by the formula (IV), particularly preferable are dichroic dyes represented by the following formula (IVa).

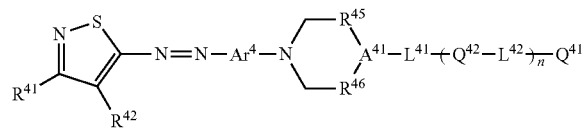

(Iva)

In the formula, $R^{41}$ and $R^{42}$ each represent a hydrogen atom or a substituent, and may be mutually linked to form a ring; $Ar^4$ represents an optionally substituted divalent aromatic hydrocarbon group or aromatic heterocyclic group; $A^{41}$ represents a carbon atom or a nitrogen atom; $L^{41}$, $L^{42}$, $R^{45}$ and $R^{46}$ represent a single bond or a divalent linking group; $Q^{41}$ represents an optionally substituted cyclic hydrocarbon group or heterocyclic group; $Q^{42}$ represents an optionally substituted divalent cyclic hydrocarbon group or heterocyclic group; n represents an integer of 0 to 3, and when n is 2 or more, a plurality of $L^{42}$s and a plurality of $Q^{42}$s may each be mutually the same or different.

The range of the group represented by $R^{41}$ and $R^{42}$ in the formula (IVa) is the same as for $R^{41}$ and $R^{42}$ in the formula (IVa), and also the preferable range thereof is the same as in the formula (IVa).

The range of the divalent aromatic hydrocarbon group or the aromatic heterocyclic group represented by $Ar^4$ in the formula (IVa) is the same as for $Ar^4$ in the formula (IV), and also the preferable range thereof is the same as in the formula (IV).

In the formula (IVa), $A^{41}$ is preferably a nitrogen atom.

The linking group represented by $L^{41}$, $L^{42}$, $R^{45}$ and $R^{46}$ in the formula (IVa) includes alkylene groups (preferably having 1 to 20 carbons, more preferably having 1 to 10 carbons and particularly preferably having 1 to 6 carbons, and examples thereof include a methylene group, an ethylene group, a propylene group, a butylene group, a pentylene group, a cyclohexane-1,4-diyl group and the like), alkenylene groups (preferably having 2 to 20 carbons, more preferably having 2 to 10 carbons and particularly preferably having 2 to 6 carbons, and examples thereof include an ethenylene group and the like), alkynylene groups (preferably having 2 to 20 carbons, more preferably having 2 to 10 carbons and particularly preferably having 2 to 6 carbons, and examples thereof include an ethynylene group and the like), alkyleneoxy groups (preferably having 1 to 20 carbons, more preferably having 1 to 10 carbons and particularly preferably having 1 to 6 carbons, and examples thereof include a methyleneoxy group and the like), an amide group, an ether group, an acyloxy group (—C(=O)O—), an oxycarbonyl group (—OC(=O)—), an imino group (—CH=N— or —N=CH—), a sulfoamide group, a sulfonate group, a ureide group, a sulfonyl group, a sulfinyl group, a thioether group, a carbonyl group, an —NR— group (here, R represents a hydrogen atom, an alkyl group or an aryl group), an azo group, an azoxy group, or divalent linking groups having 0 to 60 carbons constituted of two or more of them in combination.

The linking group represented by $L^{41}$ includes preferably a single bond, an alkylene group, an alkenylene group, an alkyleneoxy group, an oxycarbonyl group, an acyl group and a carbamoyl group, more preferably a single bond and an alkylene group and further preferably a single bond and an ethylene group.

The linking group represented by $L^{42}$ includes preferably a single bond, an alkylene group, an alkenylene group, an oxycarbonyl group, an acyl group, an acyloxy group, a carbamoyl group, an imino group, an azo group and an azoxy group, more preferably a single bond, an oxycarbonyl group, an acyloxy group, an imino group, an azo group and an azoxy group and further preferably a single bond, an oxycarbonyl group and an acyloxy group.

The linking group represented by $R^{45}$ and $R^{46}$ includes preferably a single bond, an alkylene group, an alkenylene group, an alkyleneoxy group and an acyl group, more preferably a single bond and an alkylene group and further preferably a single bond and a methylene group.

The number of constituent atoms of the ring formed of a nitrogen atom, a methylene group, $R^{45}$, $R^{46}$ and $A^{41}$ in the formula (IVa) is determined by $R^{45}$ and $R^{46}$, and for example, when $R^{45}$ and $R^{46}$ both represent a single bond, the ring can be a 4-membered ring; when one of them is a single bond and the other is a methylene group, it can be a 5-membered ring; and further, when $R^{45}$ and $R^{46}$ both represent a methylene group, it can be a 6-membered ring.

In the formula (IVa), the ring formed of a nitrogen atom, a methylene group, $R^{45}$, $R^{46}$ and $A^{41}$ is preferably a 6-membered ring or a 5-membered ring and more preferably a 6-membered ring.

The group represented by $Q^{41}$ in the formula (IVa) includes preferably an aromatic hydrocarbon group (preferably having 1 to 20 carbons and more preferably having 1 to 10 carbons, and examples thereof include a phenyl group, a naphthyl group and the like), an aromatic heterocyclic group and a cyclohexane ring group.

The aromatic heterocyclic group represented by $Q^{41}$ is preferably a group derived from a monocyclic or bicyclic hetero ring. The atom other than carbon constituting the aromatic heterocyclic group includes a nitrogen atom, a sulfur atom and an oxygen atom. When the aromatic heterocyclic group has two or more ring constituent atoms other than carbon, these may be the same or different. The aromatic heterocyclic group includes specifically a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The group represented by $Q^{41}$ includes preferably a benzene ring, a naphthalene ring, a pyridine ring, a pyrazine ring, a pyrimidine ring, a pyridazine ring, a thiazole ring, a benzothiazole ring, a thiadiazole ring, a quinoline ring, a thienothiazole ring and a cyclohexane ring, more preferably a benzene ring, a naphthalene ring, a pyridine ring, a thiazole ring, a benzothiazole ring, a thiadiazole ring and a cyclohexane ring and most preferably a benzene ring, a pyridine ring and a cyclohexane ring.

$Q^{41}$ may have a substituent, and the range thereof is the same as the range of the group represented by $R^{41}$ and $R^{42}$ described above.

The substituent optionally carried on $Q^{41}$ includes preferably an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, more preferably an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of one having carbon atoms among the above-described substituents is the same as the preferable range of the number of carbon atoms of the group represented by $R^{41}$ and $R^{42}$ described above.

It is preferable that $Q^{41}$ has one substituent and a linkage of $Q^{41}$ and the substituent is parallel to a linkage of $Q^{41}$ and $L^{41}$ or $L^{42}$, since linearity of a molecule is enhanced and a larger molecular length and larger aspect ratio are obtained under this condition. Particularly when n=0, it is preferable that $Q^{41}$ has a substituent at the above-described position.

In the formula (IVa), $Q^{42}$ represents an optionally substituted divalent cyclic hydrocarbon group or heterocyclic group.

The divalent cyclic hydrocarbon group represented by $Q^{43}$ may be aromatic or non-aromatic. Preferable examples of the divalent cyclic hydrocarbon group include aromatic hydrocarbon groups (preferably having 1 to 20 carbons and more preferably having 1 to 10 carbons, and examples thereof include a phenyl group, a naphthyl group and the like) and a cyclohexane ring group.

The divalent cyclic heterocyclic group represented by $Q^{42}$ may also be aromatic or non-aromatic. The heterocyclic group is preferably a group derived from a monocyclic or bicyclic hetero ring. The atom other than carbon constituting the heterocyclic group includes a nitrogen atom, a sulfur atom and an oxygen atom. When the heterocyclic group has two or more ring constituent atoms other than carbon, these may be the same or different. The heterocyclic group includes specifically a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring, a 3-pyrroline ring, a pyrrolidine ring, a 3-imidazoline ring, an imidazolidine ring, a 4-oxazoline ring, oxazolidine ring, a 4-thiazoline ring, a thiazolidine ring, a piperidine ring, a piperazine ring, a morpholine ring, a thiomorpholine ring, an azepan ring, an azocan ring and the like.

The group represented by $Q^{42}$ is preferably a benzene ring, a naphthalene ring, a pyridine ring, a pyrazine ring, a pyrimidine ring, a pyridazine ring, a piperidine ring, a piperazine ring, a quinoline ring, a thiophene ring, a thiazole ring, a benzothiazole ring, a thiadiazole ring, a quinolone ring, a naphthalimide ring, a thienothiazole ring or a cyclohexane ring, more preferably a benzene ring, a naphthalene ring, a pyridine ring, a piperidine ring, a piperazine ring, a thiazole ring, a thiadiazole ring or a cyclohexane ring and more further preferably a benzene ring, a cyclohexane ring or a piperazine ring.

$Q^{42}$ may have substituent, and the range thereof is the same as for the group represented by $R^{41}$ and $R^{42}$ described above.

The range of the substituent optionally carried on $Q^{42}$ is the same as for the substituent optionally carried on $Ar^4$ described above, and also the preferable range thereof is the same as for the substituent optionally carried on $Ar^4$.

It is preferable that linkages of $Q^{42}$ and $L^{44}$ and $L^{42}$ or two $L^{42}$s are parallel, since linearity of a molecule is enhanced and a larger molecular length and larger aspect ratio are obtained under this condition.

In the formula (IVa), n represents an integer of 0 to 3, preferably 0 to 2, more preferably 0 or 1 and most preferably 1.

Among dichroic dyes represented by the formula (IVa), dichroic dyes represented by the following formula (IVb) are particularly preferable.

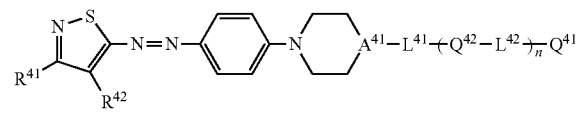

(IVb)

In the formula, $R^{41}$ and $R^{42}$ each represent a hydrogen atom or a substituent; $A^{41}$ represents a carbon atom or a nitrogen atom; $L^{41}$ and $L^{42}$ each represent a single bond or a divalent linking group; $Q^{41}$ represents an optionally substituted cyclic hydrocarbon group or optionally substituted heterocyclic group; $Q^{42}$ represents an optionally substituted divalent cyclic hydrocarbon group or heterocyclic group; n represents an integer of 0 to 3, and when n is 2 or more, a plurality of $L^{42}$S and a plurality of $Q^{42}$s may each be mutually the same or different.

The range of the group represented by $R^{41}$, $R^{42}$, $L^{41}$, $L^{42}$, $Q^{41}$ and $Q^{42}$ in the formula (IVb) is the same as for $R^{41}$, $R^{42}$, $L^{41}$, $L^{42}$, $Q^{41}$ and $Q^{42}$ in the formula (IV), and also the preferable range thereof is the same as in the formula (IV).

In the formula (IVb), $A^{41}$ is preferably a nitrogen atom.

Specific examples of the compound represented by the formula (IV) include, but are not limited to, the following specific examples.

Structure (A4-1 to A4-17):

3-methyl-4-cyano-isothiazol-5-yl—N=N—Ar—NR³R⁴

| No. | Ar | R³ | R⁴ |
|---|---|---|---|
| A4-1 | *-C₆H₄-* (1,4-phenylene) | —CH₃ | —CH₂Ph |
| A4-2 | ↑ | ↑ | —C₁₂H₂₅ |
| A4-3 | ↑ | ↑ | —(CH₂CH₂O)₃CH₃ |
| A4-4 | ↑ | ↑ | —CH₂CH₂OCH₂Ph |
| A4-5 | ↑ | —H | —CH₂Ph |
| A4-6 | ↑ | C₂H₅ | ↑ |
| A4-7 | ↑ | \*—N(pyrrolidine) | |
| A4-8 | ↑ | \*—N(morpholine) | |
| A4-9 | 2-methyl-1,4-phenylene | —CH₃ | —CH₂Ph |
| A4-10 | 2-chloro-1,4-phenylene | ↑ | ↑ |
| A4-11 | 4-OCH₃, 5-AcHN-1,2-phenylene | ↑ | ↑ |
| A4-12 | 1,4-naphthylene | ↑ | ↑ |
| A4-13 | indoline-5-yl (N-R⁴) | | ↑ |
| A4-14 | pyridine-2,5-diyl | —CH₃ | ↑ |
| A4-15 | thiophene-2,5-diyl | ↑ | —CH₂CH₂OCH₂Ph |
| A4-16 | ↑ | \*—N(pyrrolidine) | |
| A4-17 | 3-cyano-thiophene-2,5-diyl | ↑ | |

Structure (A4-18 to A4-25):

6-methyl-5-cyano-isothiazolo[pyrido]—N=N—Ar—NR³R⁴

| No. | Ar | R³ | R⁴ |
|---|---|---|---|
| A4-18 | 1,4-phenylene | —CH₃ | —CH₂Ph |
| A4-19 | ↑ | \*—N(pyrrolidine) | |
| A4-20 | ↑ | \*—N(morpholine) | |
| A4-21 | 2-methyl-1,4-phenylene | —C₂H₅ | —C₂H₅ |
| A4-22 | 1,4-naphthylene | ↑ | ↑ |
| A4-23 | indoline-5-yl (N-R⁴) | | —CH₂Ph |
| A4-24 | pyridine-2,5-diyl | —CH₃ | ↑ |
| A4-25 | thiophene-2,5-diyl | \*—N(pyrrolidine) | |

| No. | R$^9$ |
|---|---|
| A4-26 | —C$_5$H$_{11}$ |
| A4-27 | —C$_{12}$H$_{25}$ |
| A4-28 | —CH$_2$CH(C$_2$H$_5$)C$_4$H$_9$ |
| A4-29 | —(CH$_2$CH$_2$O)$_3$CH$_3$ |
| A4-30 | —COOC$_8$H$_{17}$ |
| A4-31 | —C(=O)C$_{11}$H$_{23}$ |
| A4-32 | CONHC$_8$H$_{17}$ |

| No. | R$^9$ |
|---|---|
| A4-33 | —C$_5$H$_{11}$ |
| A4-34 | —C$_{12}$H$_{25}$ |
| A4-35 | —CH$_2$CH(C$_2$H$_5$)C$_4$H$_9$ |
| A4-36 | —(CH$_2$CH$_2$O)$_3$CH$_3$ |
| A4-37 | —COOC$_8$H$_{17}$ |
| A4-38 | —C(=O)C$_{12}$H$_{25}$ |
| A4-39 | CONHC$_8$H$_{17}$ |

| No. | A$^1$ | L$^1$ | Q$^1$ |
|---|---|---|---|
| A4-40 | >CH— | — | —Ph |
| A4-41 | >N— | ↑ | ↑ |
| A4-42 | ↑ | ↑ | *-C$_6$H$_4$-C$_4$H$_9$ |
| A4-43 | ↑ | ↑ | *-C$_6$H$_4$-OH |
| A4-44 | ↑ | ↑ | *-cyclohexyl-C$_2$H$_5$ |
| A4-45 | ↑ | —COO— | *-C$_6$H$_4$-C$_{12}$H$_{25}$ |
| A4-46 | ↑ | —COOCH$_2$— | —Ph |
| A4-47 | ↑ | —CONH— | *-(4-methylthiazol-2-yl) |
| A4-48 | ↑ | ↑ | *-(benzothiazol-2-yl) |
| A4-49 | ↑ | —CO— | *-(pyridin-4-yl) |
| A4-50 | ↑ | ↑ | *-(pyridin-2-yl) |
| A4-51 | ↑ | —CH$_2$CH$_2$— | —Ph |
| A4-52 | ↑ | —CH$_2$CH$_2$O— | *-C$_6$H$_4$-C$_{12}$H$_{25}$ |
| A4-53 | ↑ | —CH$_2$CH$_2$OCO— | *-(pyridin-4-yl) |
| A4-54 | ↑ | ↑ | *-(naphthalen-1-yl) |
| A4-55 | ↑ | ↑ | *-cyclohexyl-OC$_5$H$_{11}$ |

| No. | A$^1$ | L$^1$ | Q$^1$ |
|---|---|---|---|
| A4-56 | >CH— | — | —Ph |
| A4-57 | >N— | ↑ | ↑ |
| A4-58 | ↑ | ↑ | *-C$_6$H$_4$-C$_4$H$_9$ |

-continued
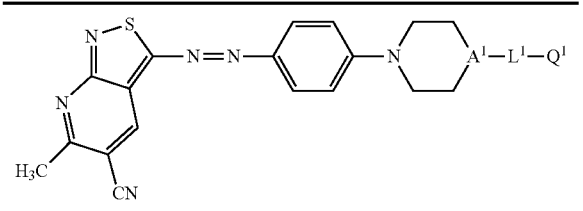
| No. | A¹ | L¹ | Q¹ |
|---|---|---|---|
| A4-59 | ↑ | ↑ | *—⌬—OH |
| A4-60 | ↑ | ↑ | *—⌬—C₂H₅ |
| A4-61 | ↑ | —COO— | *—⌬—C₁₂H₂₅ |
| A4-62 | ↑ | —COOCH₂— | —Ph |
| A4-63 | ↑ | —CONH— | *—⌬—OC₂H₅ |
| A4-64 | ↑ | ↑ | *—(thiazole-CH₃) |
| A4-65 | ↑ | ↑ | *—(benzothiazole) |
-continued
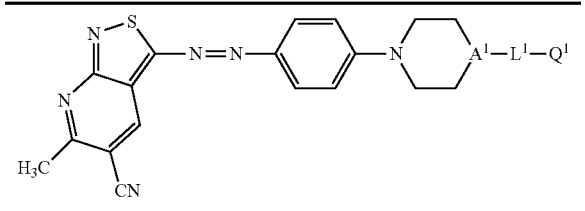
| No. | A¹ | L¹ | Q¹ |
|---|---|---|---|
| A4-66 | ↑ | —CO— | *—(4-pyridyl) |
| A4-67 | ↑ | ↑ | *—(2-pyridyl) |
| A4-68 | ↑ | —CH₂CH₂— | —Ph |
| A4-69 | ↑ | —CH₂CH₂O— | *—⌬—C₁₂H₂₅ |
| A4-70 | ↑ | —CH₂CH₂OCO— | *—(4-pyridyl) |
| A4-71 | ↑ | ↑ | *—(1-naphthyl) |
| A4-72 | ↑ | ↑ | *—⌬—OC₅H₁₁ |
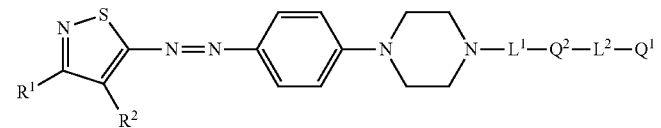
| No. | R¹ | R² | L¹ | Q² | L² | Q¹ |
|---|---|---|---|---|---|---|
| A4-73 | —CH₃ | —CN | — | *—⌬—* | — | —Ph |
| A4-74 | ↑ | ↑ | ↑ | ↑ | ↑ | *—⌬—OC₄H₉ |
| A4-75 | ↑ | ↑ | ↑ | ↑ | —COO— | *—⌬—CH₃ |
| A4-76 | ↑ | ↑ | ↑ | ↑ | ↑ | *—⌬—C₁₂H₂₅ |

-continued
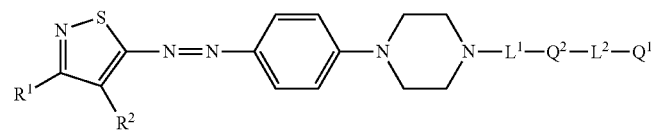
| No. | R¹ | R² | L¹ | Q² | L² | Q¹ |
|---|---|---|---|---|---|---|
| A4-77 | ↑ | ↑ | ↑ | ↑ | ↑ | *-C₆H₄-OCH₃ |
| A4-78 | ↑ | ↑ | ↑ | ↑ | —COOCH₂— | —Ph |
| A4-79 | ↑ | ↑ | ↑ | ↑ | —CONH— | *-C₆H₄-OC₂H₅ |
| A4-80 | ↑ | ↑ | ↑ | ↑ | ↑ | *-C₆H₄-NO₂ |
| A4-81 | ↑ | ↑ | ↑ | ↑ | ↑ | *-C₆H₄-SO₃H |
| A4-82 | ↑ | ↑ | ↑ | ↑ | —OCO— | *-C₆H₄-C₄H₉ |
| A4-83 | ↑ | ↑ | ↑ | ↑ | ↑ | *-4-pyridyl |
| A4-84 | ↑ | ↑ | ↑ | ↑ | —NHCO— | *-C₆H₄-C₄H₉ |
| A4-85 | ↑ | ↑ | ↑ | *-cyclohexyl-* | —OCO— | *-C₆H₄-C₄H₉ |
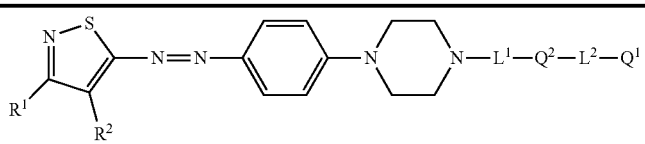
| No. | R¹ | R² | L¹ | Q² | L² | Q¹ |
|---|---|---|---|---|---|---|
| A4-86 | ↑ | ↑ | —COO— | *-cyclohexyl-* | —OCO— | *-C₆H₄-CH₃ |
| A4-87 | ↑ | ↑ | ↑ | ↑ | —COO— | *-C₆H₄-C₁₂H₂₅ |
| A4-88 | ↑ | ↑ | —CO— | *-C₆H₄-* | — | —Ph |

-continued

[Structure: isothiazole with R¹, R² substituents connected via N=N to phenyl-piperazine-N-L¹-Q²-L²-Q¹]

| No. | R¹ | R² | L¹ | Q² | L² | Q¹ |
|---|---|---|---|---|---|---|
| A4-89 | ↑ | ↑ | ↑ | *—N(piperazine)N—* | —COO— | *—C₆H₄—C₁₂H₂₅ |
| A4-90 | ↑ | ↑ | —CH₂CH₂— | *—C₆H₄—* | —OCO— | *—C₆H₄—C₄H₉ |
| A4-91 | ↑ | ↑ | ↑ | *—N(piperazine)N—* | — | —Ph |
| A4-92 | ↑ | ↑ | ↑ | ↑ | —COO— | *—C₆H₄—C₁₂H₂₅ |
| A4-93 | ↑ | ↑ | ↑ | ↑ | —CO— | *—C₆H₄—C₄H₉ |
| A4-94 | ↑ | ↑ | ↑ | *—N(piperidine)—* | — | —Ph |
| A4-95 | ↑ | ↑ | —CH₂CH₂O— | *—cyclohexyl—* | —OCO— | *—C₆H₄—CH₃ |
| A4-96 | ↑ | ↑ | —CH₂CH₂OCO— | *—N(piperazine)N—* | —COO— | *—C₆H₄—C₁₂H₂₅ |
| A4-97 | ↑ | —H | ↑ | *—N(piperazine)N—* | — | —Ph |
| A4-98 | —H | ↑ | ↑ | ↑ | ↑ | ↑ |
| A4-99 | ↑ | —Cl | ↑ | ↑ | ↑ | ↑ |
| A4-100 | ↑ | —SO₃H | ↑ | ↑ | ↑ | ↑ |
| A4-101 | ↑ | —NO₂ | ↑ | ↑ | ↑ | ↑ |

[Structure: benzisothiazole with A², R⁷, R⁸ substituents connected via N=N to phenyl-piperazine-N-L¹-Q²-L²-Q¹]

| No. | A² | R⁷ | R⁸ | L¹ | Q² | L² | Q¹ |
|---|---|---|---|---|---|---|---|
| A4-102 | —N= | —CH₃ | —CN | — | *—C₆H₄—* | — | —Ph |

-continued

| No. | A² | R⁷ | R⁸ | L¹ | Q² | L² | Q¹ |
|---|---|---|---|---|---|---|---|
| A4-103 | ↑ | ↑ | ↑ | ↑ | ↑ | ↑ | *—C₆H₄—OC₄H₉ |
| A4-104 | ↑ | ↑ | ↑ | ↑ | ↑ | —COO— | *—C₆H₄—CH₃ |
| A4-105 | ↑ | ↑ | ↑ | ↑ | ↑ | ↑ | *—C₆H₄—C₁₂H₂₅ |
| A4-106 | ↑ | ↑ | ↑ | ↑ | ↑ | ↑ | *—C₆H₄—OCH₃ |
| A4-107 | ↑ | ↑ | ↑ | ↑ | ↑ | —COOCH₂— | —Ph |
| A4-108 | ↑ | ↑ | ↑ | ↑ | ↑ | CONH | *—C₆H₄—OC₂H₅ |
| A4-109 | ↑ | ↑ | ↑ | ↑ | ↑ | ↑ | *—C₆H₄—NO₂ |
| A4-110 | ↑ | ↑ | ↑ | ↑ | ↑ | ↑ | *—C₆H₄—SO₃H |
| A4-111 | ↑ | ↑ | ↑ | ↑ | ↑ | —OCO— | *—C₆H₄—C₄H₉ |
| A4-112 | ↑ | ↑ | ↑ | ↑ | ↑ | ↑ | *-(4-pyridyl) |
| A4-113 | ↑ | ↑ | ↑ | ↑ | ↑ | —NHCO— | *—C₆H₄—C₄H₉ |
| A4-114 | ↑ | ↑ | ↑ | ↑ | *-cyclohexyl-* | —OCO— | *—C₆H₄—C₄H₉ |
| A4-115 | ↑ | ↑ | ↑ | —COO— | *-cyclohexyl-* | —OCO— | *—C₆H₄—CH₃ |
| A4-116 | ↑ | ↑ | ↑ | ↑ | ↑ | —COO— | *—C₆H₄—C₁₂H₂₅ |

-continued

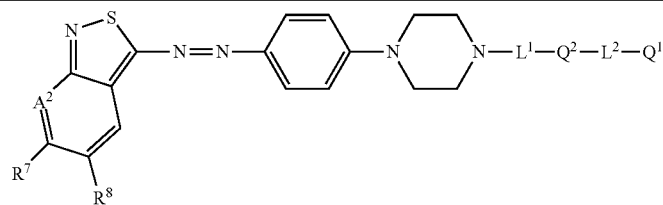

| No. | A² | R⁷ | R⁸ | L¹ | Q² | L² | Q¹ |
|---|---|---|---|---|---|---|---|
| A4-117 | ↑ | ↑ | ↑ | —CO— | *─⟨phenylene⟩─* | — | —Ph |
| A4-118 | ↑ | ↑ | ↑ | ↑ | *—N⟨piperazine⟩N—* | —COO— | *─⟨C₆H₄⟩─C₁₂H₂₅ |
| A4-119 | ↑ | ↑ | ↑ | —CH₂CH₂— | *─⟨phenylene⟩─* | —OCO— | *─⟨C₆H₄⟩─C₄H₉ |
| A4-120 | ↑ | ↑ | ↑ | ↑ | *—N⟨piperazine⟩N—* | — | —Ph |

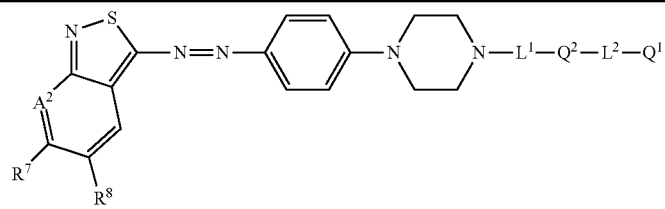

| No. | A² | R⁷ | R⁸ | L¹ | Q² | L² | Q¹ |
|---|---|---|---|---|---|---|---|
| A4-121 | ↑ | ↑ | ↑ | ↑ | ↑ | —COO— | *─⟨C₆H₄⟩─C₁₂H₂₅ |
| A4-122 | ↑ | ↑ | ↑ | ↑ | ↑ | —CO— | *─⟨C₆H₄⟩─C₄H₉ |
| A4-123 | ↑ | ↑ | ↑ | ↑ | *—N⟨piperidine⟩* | — | —Ph |
| A4-124 | ↑ | ↑ | ↑ | —CH₂CH₂O— | *─⟨cyclohexylene⟩─* | —OCO— | *─⟨C₆H₄⟩─CH₃ |
| A4-125 | ↑ | ↑ | ↑ | —CH₂CH₂OCO— | *—N⟨piperazine⟩N—* | —COO— | *─⟨C₆H₄⟩─C₁₂H₂₅ |
| A4-126 | ↑ | ↑ | —H | —CH₂CH₂— | *—N⟨piperazine⟩N—* | — | —Ph |

-continued

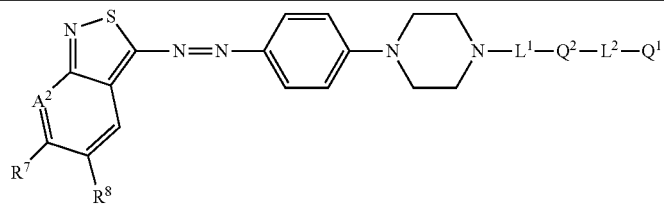

| No. | A² | R⁷ | R⁸ | L¹ | Q² | L² | Q¹ |
|---|---|---|---|---|---|---|---|
| A4-127 | ↑ | —H | ↑ | ↑ | ↑ | ↑ | ↑ |
| A4-128 | ↑ | ↑ | —Cl | ↑ | ↑ | ↑ | ↑ |
| A4-129 | ↑ | ↑ | —SO₃H | ↑ | ↑ | ↑ | ↑ |
| A4-130 | ↑ | ↑ | —NO₂ | ↑ | ↑ | ↑ | ↑ |
| A4-131 | —CH= | —CH₃ | —CN | ↑ | ↑ | ↑ | ↑ |
| A4-132 | ↑ | ↑ | —H | ↑ | ↑ | ↑ | ↑ |
| A4-133 | ↑ | —H | ↑ | ↑ | ↑ | ↑ | ↑ |
| A4-134 | ↑ | ↑ | —Cl | ↑ | ↑ | ↑ | ↑ |
| A4-135 | ↑ | ↑ | —SO₃H | ↑ | ↑ | ↑ | ↑ |
| A4-136 | ↑ | ↑ | —NO₂ | ↑ | ↑ | ↑ | ↑ |

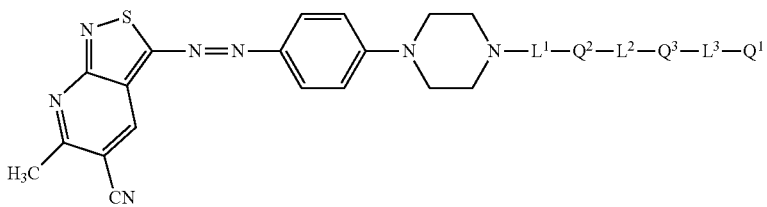

| No. | L¹ | Q² | L² | Q³ | L³ | Q¹ |
|---|---|---|---|---|---|---|
| A4-137 | — | *—⟨C₆H₄⟩—* | — | *—⟨C₆H₄⟩—* | —COO— | *—⟨C₆H₄⟩—C₁₂H₂₅ |
| A4-138 | ↑ | ↑ | —COO— | *—⟨cyclohexyl⟩—* | —OCO— | *—naphthyl |
| A4-139 | ↑ | ↑ | —OCO— | *—⟨C₆H₄⟩—* | —CONH— | *—⟨thiazole-CH₃⟩ |
| A4-140 | —CH₂CH₂— | *—N⟨piperazine⟩N—* | —COO— | *—⟨cyclohexyl⟩—* | —OCO— | *—⟨C₆H₄⟩—CH₃ |
| A4-141 | ↑ | ↑ | — | *—⟨C₆H₄⟩—* | —N=N— | *—⟨isothiazolopyridine-CH₃,CN⟩ |
| A4-142 | —COO— | *—⟨cyclohexyl⟩—* | —OCO— | *—⟨C₆H₄⟩—* | — | —Ph |

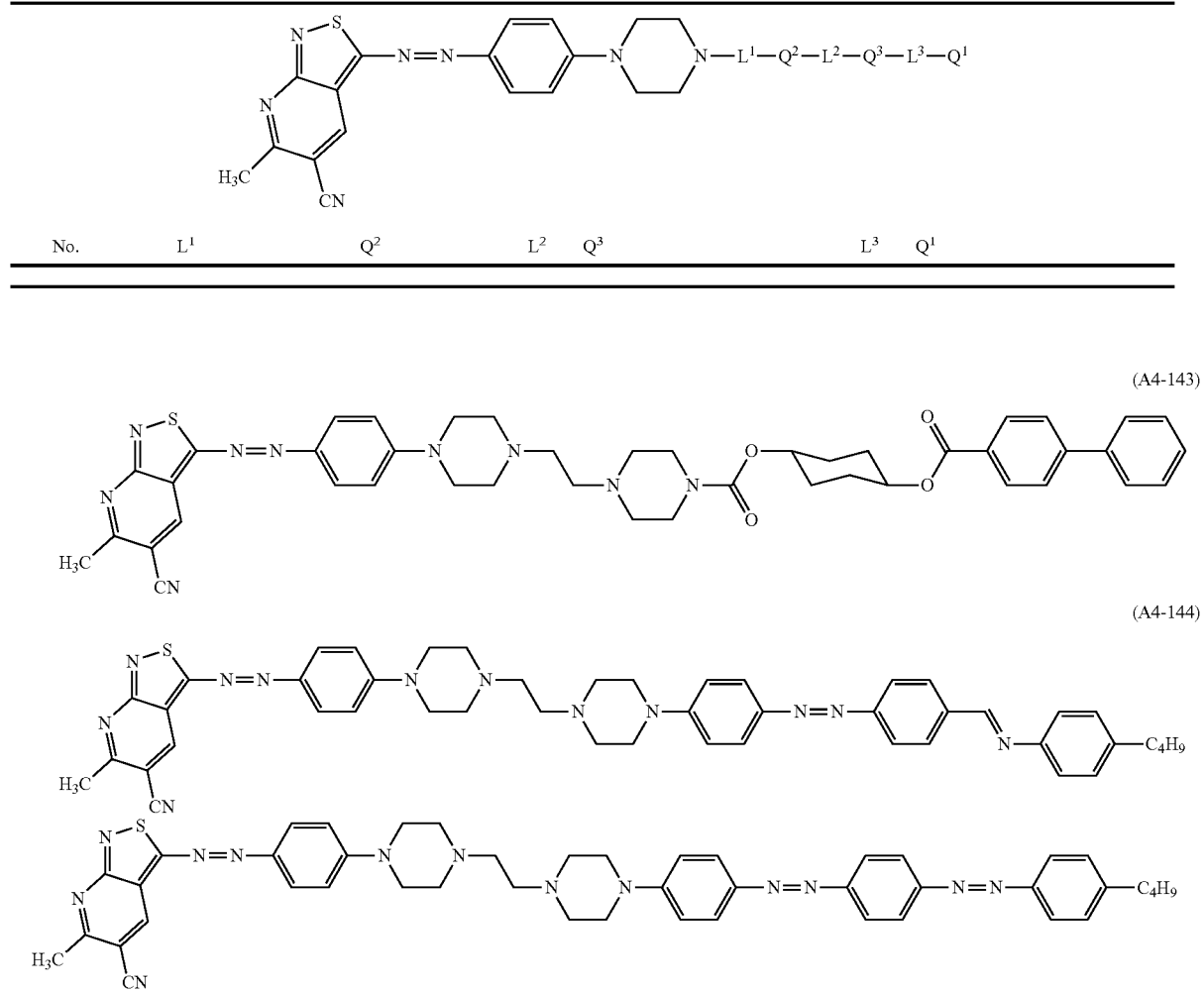

| No. | L¹ | Q² | L² | Q³ | L³ | Q¹ |
|-----|----|----|----|----|----|----|

Compounds (azo dyes) described by the above-described formula (I), (II), (III) or (IV) can be synthesized by reference to methods described in "Dichroic Dyes for Liquid Crystal Display" (A. V. Ivashchenko ed., CRC, 1994), "Review on Synthetic Dyes (Sosetsu Gosei Senryo)" (Hiroshi Horiguchi ed., Sankyo Publishing, 1968) and literature cited in them.

Azo dyes represented by the above-described formula (I), (II), (III) or (IV) in the present invention can be synthesized easily according to methods described in the Journal of Materials Chemistry (1999), 9(11), 2755-2763 and the like.

The azo dye represented by the above-described formula (I), (II), (III) or (IV) is characterized by having a nature of easily realizing by itself liquid crystallinity, particularly nematic liquid crystallinity since the molecular shape is flat and has good linearity, has a rigid core part and a flexible side chain part, and a polar amino group is present at the molecular long axis end of the azo dye, as apparent from its molecular structure.

As described above, the dichroic dye composition containing at least one dichroic dye represented by the above-described (I), (II), (III) or (IV) has liquid crystallinity, in the present invention.

Further, the azo dye represented by the above-described formula (I), (II), (III) or (IV) also has a nature of easily forming an associated state of molecules by the action of strong intermolecular interaction because of high flatness of the molecule.

The dichroic dye composition containing the azo dye represented by the above-described formula (I), (II), (III) or (IV) according to the present invention is capable of realizing a high order molecular alignment via a lamination process such as, for example, application onto the surface of a rubbed polyvinyl alcohol alignment film since high absorbance is realized in a visible wider wavelength region due to association formation, and additionally, because the composition containing this dye has specifically nematic liquid crystallinity. Therefore, if the dichroic dye composition containing the azo dye represented by the above-described formula (I), (II), (III) or (IV) according to the present invention is used as a light absorption anisotropic film, a polarizing device having a high polarization property can be fabricated.

In the dichroic dye composition of the present invention, the dichroic ratio (D) calculated according to a method described in examples described later can be raised to 15 or more, and (D) is preferably 18 or more.

Regarding liquid crystallinity of the azo dye represented by the above-described formula (I), (II), (III) or (IV), a nematic liquid crystal phase is shown preferably at 10 to 300° C. and more preferably at 100 to 250° C.

It is preferable that the dichroic dye composition in the present invention contains at least one azo dye represented by the formula (I), (II), (III) or (IV). Though the combination of the azo dye is not particularly restricted, two or more azo dyes are preferably mixed in a combination giving a black color, for the polarizer to be produced to attain a high degree of polarization.

The azo dye represented by the formula (Ia) of the present invention is a magenta azo dye, the azo dye represented by the formulae (Ib) and (II) is a yellow or magenta azo dye and the azo dye represented by the formulae (III) and (IV) is a cyan azo dye.

It is preferable that at least one of two or more dichroic dyes contained in the above-described dichroic dye composition is an azo dye represented by the formula (Ia), (Ib) or (II).

It is preferable that the above-described dichroic dye composition contains an azo dye represented by the formula (III) or (IV).

It is preferable that the above-described dichroic dye composition contains at least one azo dye represented by the formula (Ia), (Ib) or (II) and at least one azo dye represented by the formula (III) or (IV).

The above-described dichroic dye composition may further contain a coloring material which is a dye other than the azo dye represented by the formula (I), (II), (III) or (IV) or the like within a range not deteriorating the effect of the present invention. It is preferable that also the dye other than the azo dye represented by the formula (I), (II), (III) or (IV) is selected from compounds showing liquid crystallinity. Examples of the dye which can be used together include azo dyes, cyanine dyes, azo metal complexes, phthalocyanine dyes, pyrylium dyes, thiopyrylium dyes, azulenium dyes, squarylium dyes, quinone dyes, triphenylmethane dyes, triarylmethane dyes and the like. Azo dyes or squarylium dyes are preferable. Particularly, those described in the "Dichroic Dyes for Liquid Crystal Display" (A. V. Ivashchenko ed., CRC, 1994) can also be used.

In the dichroic dye to be used in the present invention, the angle made by the transition moment and the molecular long axis is preferably 0° or more and 20° or less, more preferably 0° or more and 15° or less, further preferably 0° or more and 10° or less, particularly preferably 0° or more and 5° or less. Here, the molecular long axis means an axis linking two atoms at which the interatomic distance is maximum in a compound. The direction of the transition moment can be determined by molecular orbital calculation, and the angle made by the molecular long axis can also be calculated therefrom.

It is preferable that the dichroic dye to be used in the present invention has a rigid linear structure. Specifically, the molecular length is preferably 17 Å or more, more preferably 20 Å or more and further preferably 25 Å or more. The aspect ratio is preferably 1.7 or more, more preferably 2 or more and further preferably 2.5 or more. By this constitution, good uniaxial alignment is attained, and a light absorption anisotropic film and a polarizer showing high polarization performance can be obtained.

Here, the molecular length is a value obtained by adding van der Waals' radii of two atoms at both ends to the maximum interatomic distance in a compound. The aspect ratio means molecular length/molecular width, and the molecular width is a value obtained by adding van der Waals' radii of two atoms at both ends to the maximum interatomic distance when respective atoms are projected to a plane vertical to the molecular long axis.

The above-described dichroic dye composition contains at least one azo dye represented by the above-described formula (I), (II), (III) or (IV) as the main component. Specifically, the content of the azo dye represented by the above-described formula (I), (II), (III) or (IV) is preferably 80% by mass or more and particularly preferably 90% by mass or more with respect to the total content of all dyes to be contained. The upper limit thereof is 100% by mass, that is, it may be of course permissible that all dyes to be contained are azo dyes represented by the formula (I), (II), (III) or (IV).

Further, the content of the dichroic dyes expressed by one or more of the formulae (I), (II), (III) and (IV) in the dichroic dye composition is preferably 20% by mass or more in a total solid content excluding a solvent, and in particular preferably 30% by mass or more. There is no particular restriction on an upper limit. However, in a mode which comprises other additives such as surface active agents shown below and others, in order to obtain individual effects, the content of the dichroic dyes expressed by one or more of the formulae (I), (II), (III) and (IV) in the dichroic dye composition is preferably 95% by mass or less in a total solid content excluding a solvent, and more preferably 90% by mass or less.

It is preferable that the dichroic dye composition in the present invention shows thermotropic liquid crystallinity, that is, the composition causes phase transition to liquid crystal by heat to show liquid crystallinity. A nematic liquid crystal phase is shown preferably at 10 to 300° C. and more preferably at 100 to 250° C. Particularly, it is preferable that a smectic liquid crystal phase A is shown in a lower temperature region than a nematic liquid crystal phase, and the preferable temperature range thereof is 10 to 200° C., more preferably 50 to 200° C.

The above-described dichroic dye composition may contain at least one additive, other than the above-described dichroic dye. The above-described dichroic dye composition may contain a non-liquid crystalline poly-functional monomer having a radical polymerizable group, a polymerization initiator, an agent for preventing unevenness by wind, a repelling inhibitor, an additive for controlling the tilt angle of an alignment film (the tilt angle of a liquid crystalline dye at the boundary of light absorption anisotropic film/alignment film), an additive for controlling the tilt angle of the air boundary (the tilt angle of a dye at the boundary of light absorption anisotropic film/air), sugars, a chemical having at least any of antifungal, antibacterial and bactericidal functions, and the like.

1-(2) Process for Producing Light Absorption Anisotropic Film

The following is an example which shows a process for producing the light absorption anisotropic film of the present invention.

The dichroic dye composition formulated as a coating solution is coated on the surface to form a coated film. A coating method includes any known conventional methods such as spin coating, gravure printing, flexographic printing, ink jet printing, die coating, slit die coating, cap coating and dipping. Usually, since a solution diluted with an organic solvent is coated, the solution is dried after coating to obtain a coated film.

A solute such as an organic solvent is allowed to evaporate from the coated film of the dichroic dye composition, thereby aligning the dichroic dye composition. It is preferable that the coated film is dried naturally at room temperature. It is also preferable that molecules of the azo dye formed by coating are not disrupted in alignment (to avoid thermal relaxation, etc). Further, it is preferable that a solvent is allowed to evaporate from the coated film and the coated film is dried at lower temperatures on treatment under reduced pressure.

Here, the decompression treatment means a procedure in which a substrate carrying a coated film is placed under pressure-reduced condition and a solvent is removed by evaporation. In this procedure, it is preferable that the substrate carrying a film is placed horizontally so that it does not flow from a higher position to the bottom position.

It is more desirable when the time until starting of the decompression treatment of the coated film after coating is shorter, and it is preferably 1 second or more and within 30 seconds.

As the method of the decompression treatment, it includes, for example, the following method. The coated film obtained by coating the coating solution is charged together with its substrate in a decompression treatment apparatus and subjected to a decompression treatment. Decompression treatment apparatuses as described in, for example, JP-A2006-201759, FIGS. 9 and 10 can be used. Details of the decompression treatment apparatus are described in JP-A2004-169975.

Regarding the condition of the decompression treatment, the pressure in the system in which the coated film is present is preferably $2\times10^4$ Pa or less, further preferably $1\times10^4$ Pa or less and particularly preferably $1\times10^3$ Pa or less. It is preferably 1 Pa or more and further preferably $1\times10^1$ Pa or more. Usually, it is preferable that the pressure finally reached in the system is as described above. When the pressure is above the upper limit, drying is impossible, thereby possibly causing disruption of alignment, and when below the lower limit, drying is too rapid, thereby possibly generating defects.

The decompression treatment time is preferably 5 seconds or more and within 180 seconds. When the decompression treatment time is above the upper limit, it is impossible to quickly dry the coated film before relaxation of alignment, thereby possibly causing disruption of alignment, and when below the lower limit, drying is impossible, thereby possibly causing disruption of alignment.

The temperature in the system in performing the decompression treatment is preferably 10° C. or higher and 60° C. or lower. When the temperature is above the upper limit, convection occurs in drying, thereby possibly generating ununiformity in the coated film, and when below the lower limit, drying is impossible, thereby possibly causing disruption of alignment.

When the coated film is dried to align the dichroic dye composition, heating may be applied for facilitating alignment. Temperature is preferably from 50° C. or higher to 200° C. or lower, and in particular preferably from 70° C. or higher to 180° C. or lower. Additive agents such as a plasticizer may be used concurrently with the dichroic dye composition to lower the alignment temperature.

For example, if the above-described dichroic dye composition is coated on the surface of the above-described optically alignment film, then, the molecule of at least one dichroic dye is aligned at the tilt angle of the alignment film at the boundary with the alignment film and aligned at the tilt angle of air boundary at the boundary with air. For producing a polarizing layer showing a high degree of polarization, it is preferable that the azo dye is horizontally aligned at all boundaries and the alignment is fixed.

In the present specification, "tilt angle" means an angle made by the long axis direction of the azo dye molecule and the boundary (alignment film boundary or air boundary). From the standpoint of polarization performance, the tilt angle at the alignment film side is preferably 0° to 10°, further preferably 0° to 5°, particularly preferably 0° to 2° and more further preferably 0° to 1°. The tilt angle at the air boundary side is preferably 0° to 10°, further preferably 0 to 5° and particularly preferably 0 to 2°.

In order to decrease an air interface-side tilt angle of molecules of the dichroic dye to the above range, it is preferable that the above-described composition comprises (1) a fluoroaliphatic group-containing compound; or (2) a fluoroaliphatic group-containing copolymer which comprises at least one type of polymerization unit selected from a group comprised of polymerization unit of fluoroaliphatic group-containing monomers and polymerization unit of amide group-containing monomers. In the presence of at least one type of polymerization unit, molecules of the dichroic dye are aligned, thus making it possible to decrease the air interface-side tilt angle to the above range.

It is noted that the alignment film-side tilt angle tends to be decreased by actions of the alignment film as compared with the air interface-side tilt angle. However, an alignment film tilt controlling agent is added to the above-described composition to decrease the alignment film-side tilt angle to a greater extent, thus making it possible to keep the molecules of the azo dye stably in a horizontally aligned state.

In an embodiment in which the above-described dichroic dye composition contains the above-described non-liquid crystalline radical polymerizable polyfunctional monomer, and a curing component such as the above-described polymerization initiator, it is preferable, after making the azo dye molecule into the desired alignment, to promote polymerization and curing by light irradiation (preferably, ultraviolet irradiation) or heating, or a combination of them.

The value of light irradiation energy for polymerization and the like can refer to descriptions in JP-A2001-91741, paragraphs [0050] to [0051].

The light absorption anisotropic film can be formed as described above. The light absorption anisotropic film is preferably from 0.01 to 2 μm in thickness and more preferably from 0.05 to 2 μm.

(1)-3 Alignment Film

For production of the light absorption anisotropic film of the present invention, it is preferable to use an alignment film. Any alignment film may be used in the present invention as long as molecules of the liquid crystalline azo dye can be rendered into a desired alignment state on the alignment film. The alignment film can be provided by means of rubbing treatment of an organic compound (preferably a polymer) on the surface of the layer, oblique deposition of an inorganic compound, formation of a layer having micro-grooves or accumulation of an organic compound (for example, ω-trichosantic acid, dioctadecylmethyl ammonium chloride or methyl stearate) according to the Langmuir Blodgett technique (LB film). Also known are alignment films which yield alignment functions by imparting an electric field and a magnetic field or through irradiation of light. Among other things, in the present invention, an alignment film formed by rubbing treatment is preferable in terms of ease in controlling a pre-tilt angle of the alignment film, and a photo alignment film formed by irradiation of light is preferable in terms of uniformity of alignment.

Rubbing Treated-Alignment Film

Polymer materials used in an alignment film formed by rubbing treatment are described in many documents and a wide variety of them are now commercially available. Polyvinyl alcohol, polyimide and their derivatives are favorably used in the alignment film of the present invention. As to the alignment film, reference can be made to a description appearing from line 24 on page 43 to line 8 on page 49 in the Gazette of WO 01/88574A1.

The alignment film is preferably from 0.01 to 10 μm in thickness and more preferably from 0.01 to 1 μm.

In general, rubbing treatment can be carried out by rubbing several times the surface of a polymer layer with paper or cloth in a given direction. In the present invention, in particular, the treatment is preferably carried out according to methods described in "Handbook of Liquid Crystals" (issued on Oct. 30, 2000 by Maruzen Publishing Co., Ltd.).

A method for changing rubbing density includes methods described in "Handbook of Liquid Crystals" (issued by Maruzen Publishing Co., Ltd.). The rubbing density (L) has been quantified by the following formula (A).

$$L = Nl(1+2\pi rm/60v) \quad \text{Formula (A)}$$

In the above formula, N is the number of rubbing times; 1, the contact length of a rubbing roller; r, the radius of the roller; n, the number of rotations of the roller (rpm) and v, the stage movement speed (speed per second).

In order to increase rubbing density, the number of rubbing times is increased, the rubbing roller is increased in contact length, the roller is increased in radius, the roller is increased in the number of rotations and the stage moving speed is decreased. In contrast, in order to decrease rubbing density, reverse procedures to the above are carried out.

There is such a relationship between the rubbing density and a pre-tilt angle of the alignment film that an increase in rubbing density results in a decrease in pre-tilt angle and a decrease in rubbing density results in an increase in pre-tilt angle.

Photo Alignment Film

Many documents, etc., have described optical alignment materials used in an alignment film formed by irradiation of light. As materials used in the alignment film of the present invention, the following are favorable, for example, azo compounds described in JP-A2006-285197, JP-A2007-76839, JP-A2007-138138, JP-A2007-94071, JP-A2007-121721, JP-A2007-140465, JP-A2007-156439, JP-A2007-133184, JP-A2009-109831 and JP No 3883848, JP No. 4151746; aromatic ester compounds described in JP-A2002-229039; maleimide and/or alkenyl-substituted nadimide compounds having light alignment units described in JP-A2002-265541 and JP-A2002-317013; photo-crosslinking silane derivatives described in JP No. 4205195 and JP No. 4205198; and photo-crosslinking polyimides, polyamides and esters described in Japanese Translation of International Application (Kohyo) No. 2003-520878, Japanese Translation of International Application (Kohyo) No. 2004-529220 and JP No. 4162850. Particularly favorable examples are azo compounds, photo-crosslinking polyimides, polyamides and esters.

A photo alignment film formed with any of the above materials is subjected to irradiation of linear polarized light or non-polarized light, thereby producing the photo alignment film.

In this specification, "irradiation of linear polarized light" is operation for allowing photoreactions to be generated on the above-described optical alignment materials. A wavelength of light to be used varies depending on an optical alignment material to be used and is not in particular restricted as long as the wavelength is necessary for photoreactions of the material. Preferable is ultraviolet light whose peak wavelength of light used in irradiation is from 200 nm to 700 nm, and more preferable is ultraviolet light whose peak wavelength of light is 400 nm or less.

A light source used in irradiation of light includes any light source to be usually used, for example, a lamp such as a tungsten lamp, halogen lamp, xenon lamp, xenon flash lamp, mercury lamp, mercury xenon lamp and carbon arc lamp, various types of lasers (such as semiconductor laser, helium neon laser, argon ion laser, helium-cadmium laser and YAG laser), a light emitting diode and a cathode-ray tube.

Means for obtaining linear polarized light includes a method using a polarizing plate (for example, an iodine polarizing plate, dichroic dye polarizing plate and wire grid polarizing plate), a method using a reflection type polarizer which utilizes a prism element (for example, Glan-Thompson prism), a method utilizing Brewster's angle and a method utilizing light emitted from a laser light source which has polarization. Further, a filter, a wavelength conversion element, etc., may be used to selectively irradiate only light in necessary wavelengths.

In the case of linear polarized light, there is adopted a method in which light is irradiated vertically or obliquely to the surface of an alignment film from the upper face or the back face of the alignment film. An incident angle of the light varies depending on the above-described optical alignment materials. The angle is, for example, from 0 to 90° (vertical) and preferably from 40 to 90°.

Where non-polarized light is used, the non-polarized light is irradiated from obliquely. An incident angle thereof is from 10 to 80°, preferably from 20 to 60°, and in particular preferably from 30 to 50°.

Irradiation time is preferably from 1 to 60 minutes and more preferably from 1 to 10 minutes.

Where patterning is needed, there are adopted a method for carrying out irradiation of light using a photo mask in the number of times necessary for making a pattern and a method for writing a pattern by laser light scanning.

The light absorption anisotropic film of the present invention which is formed from the dichroic dye composition is preferably from 0.01 to 2 μm in thickness and more preferably from 0.05 to 2 μm.

2. Polarizing Film and Display Device (1) Polarizing Film

The present invention also relates to a polarizing film which has a substrate and the light absorption anisotropic film of the present invention on the substrate.

Substrate:

Substrates usable in the present invention will be selected depending on uses of the polarizing film. They include, for example, non-alkali glass, soda glass, Pyrex (registered trade name) glass, and quartz glass used in liquid crystal display elements, OLED elements and others; a photoelectric conversion element substrate used in solid-state image sensing devices and others; a silicon substrate; a plastic substrate; and these substrates on which functional layers such as a transparent conductive film, color filter film, electrode, TFT (thin film transistor), etc., are formed. On these substrates, there may be formed a black matrix for isolating individual pixels and there may be provided a transparent resin layer for facilitating adhesion. It is also preferable that the plastic substrate is provided with a gas barrier layer and/or an anti-solvent layer on the surface thereof.

The substrate used in the present invention is preferably at 80% or more in light transmittance. Further, it is preferable that an optically isotropic polymer film is used as the plastic substrate. As to a specific example and a favorable mode of the polymer, reference can be made to a description appearing in Paragraph [0013] of JP-A2002-22942. Still further, even conventionally known polymers such as polycarbonate and polysulfone which easily develop birefringence can be used decreased in the development of birefringence by modifying molecules as described in International Publication WO00/26705.

Other Functional Layers:

The polarizing film of the present invention may be provided with an alignment film between a substrate and the light absorption anisotropic film. An example of the alignment film, a material used in formation and a formation method are as described above.

Further, it is preferable that the polarizing film of the present invention has a color filter layer between the substrate and the light absorption anisotropic film. In addition to the color filter layer, the polarizing film may be provided with other functional layers such as a transparent conductive film, color filter film, electrode and TFT. Further, there may be formed a black matrix for isolating individual pixels.

Still further, the polarizing film of the present invention may be provided with a transparent resin cured layer on a light absorption anisotropic film.

A process for producing the polarizing film of the present invention is shown as one example, and the method includes at least the following in the order shown below;

[1] rubbing or irradiating light directly on a substrate or an alignment film formed on the substrate,

[2] coating a dichroic dye composition dissolved in an organic solvent on the substrate or the alignment film, and

[3] heating a coated film of the dichroic dye composition at temperatures of 50° C. or more and 250° C. or less and aligning to form a light absorption anisotropic film.

[1] step of forming the alignment film and [2] and [3] steps of forming the light absorption anisotropic film are as described above.

(2) Display Device

The display device of the present invention is provided with at least one of the light absorption anisotropic film and the polarizer of the present invention. The display device is not in particular restricted in constitution and others. To be more specific, the display device includes transparent, reflection and semi-transparent types of liquid crystal display devices available in various modes such as TN, STN, VA, ECB, IPS, OCB and blue phase as well as OLEDs. In particular preferable is a display device in which the light absorption anisotropic film or the polarizer of the present invention is installed on the in-plane side of a substrate (a so-called in-cell polarizer). More preferable is a display device laminated on a color filter substrate. The above structure makes it possible to mitigate a decrease in contrast due to scattering light as a result of depolarization by the color filter film.

EXAMPLE

The present invention will be described further in detail based on examples and referring to comparative examples below. Materials, use amounts, proportions, treatment contents, treatment procedures and the like shown in the following examples can be appropriately changed providing that they do not deviate from the essence of the present invention. Therefore, the scope of the present invention should not be interpreted in a limited way by specific examples shown below.

Measurements regarding the optical properties of a light absorption anisotropic film in the following examples were carried out as described below.

<Dichroic Ratio of Light Absorption Anisotropic Film>

A dichroic ratio was calculated according to the following formula after the light absorption anisotropic film was measured for its absorbance by a spectrophotometer having an iodine-comprising polarizing device in an incident optical system.

$$\text{Dichroic ratio}(D) = Ax/Ay,$$

where Az is absorbance with respect to polarization in the absorption axis direction of the light absorption anisotropic film and Ay is absorbance with respect to polarization in the polarization axis direction of the light absorption anisotropic film.

<Depolarization Index of Polarizing Film>

A liquid crystal television was disassembled, and a backlight module was prepared and used as a light source. A luminance meter BM-5 manufactured by TOPCON Corporation was placed at a position distant by 70 cm from the light source along the perpendicular direction so that the luminance could be measured with a view field of 1°.

Measurement of the degree of polarization of the iodine-based polarizing device for measurement was conducted as described below. A polarizing device for measurement 1 and a polarizing device for measurement 2 were laminated in this order on the light source, each in a closely adhered manner. The luminance was measured in a case in which the relative orientation of the transmission axis of the polarizing device for measurement 1 and the transmission axis of the polarizing device for measurement 2 was 0°, that is, a case of parallel arrangement, and in a case in which the relative orientation was 90°, that is, a case of crossed arrangement, and the degree of polarization P was calculated according to the following formula.

$$Cont = \frac{\text{luminance of parallel arrangement}}{\text{luminance of crossed arrangement}}$$

$$P = \sqrt{\frac{Cont - 1}{Cont + 1}}$$

Measurement of the degree of polarization P' of the polarizing film of the present invention was carried out in the same manner as for measurement of the degree of polarization of the polarizing device for measurement.

Measurement of the depolarization index DI' of the polarizing film of the present invention was carried out as described below. A polarizing device for measurement 1, a polarizing film and a polarizing device for measurement 2 were laminated in this order on the light source, each in closely adhered manner. The luminance was measured in a case in which the relative orientation of the transmission axis of the polarizing film and the polarizing device for measurement 2 was 0° with respect to the polarizing device for measurement 1, that is, a case of parallel arrangement, and in a case in which the relative orientation was 90°, that is, a case of crossed arrangement, and the depolarization index DI' was calculated according to the following formula. Here, P represents the degree of polarization of the polarizing device for measurement and P' represents the degree of polarization of the polarizing film.

$$X = \frac{\text{luminance of parallel arrangement}}{\text{luminance of crossed arrangement}}$$

$$DI' = \frac{1 + 2PP' + P^2 + X(P^2 - 1)}{P^2(1 + X)}$$

<Periodic Structure of Light Absorption Anisotropic Film>

The period and the half-value width of a light absorption anisotropic film were determined by inplane measurement profiles and φ scan profiles using an X-ray diffractometer for thin film evaluation (manufactured by Rigaku Corporation, trade name: "ATX-G" inplane optical system). Both measurements were carried out at an incident angle of 0.18° using CuKα.

The relationship between diffraction angle and distance was obtained by the following formula $$d = \lambda/(2 * \sin \theta)$$

(where d is distance and λ is incident X-ray wavelength (CuKα; 1.54 Å).

Example 1

To 99 parts by mass of chloroform, 0.15 parts by mass of yellow azo dye A2-3 in a structure shown below (a compound expressed by the formula (II)), 0.30 parts by mass of magenta azo dye A-46 in a structure shown below (a compound expressed by the formula (I)), 0.15 parts by mass of cyan azo dye A3-1 in a structure shown below (a compound expressed by the formula (III)) and 0.40 parts by mass of cyan azo dye A4-120 in a structure shown below (a compound expressed by the formula (IV)) were added, the resultant thereof was dissolved by agitation and, thereafter, filtered to obtain a dichroic dye composition coating solution. Next, the coating solution was coated on an alignment film which was formed on a glass substrate and subjected to rubbing treatment, heated at 180° C. for 30 seconds and, thereafter cooled to room temperature to prepare a polarizing film. As the alignment film, a polyvinyl alcohol alignment film (made by Nissan Chemical Industries Ltd., trade name: PVA-103) was used. Table 1 shows a dichroic ratio, a degree of polarization, a depolarization index and a periodic structure (period and half-value width) of the thus obtained polarizing film. The alignment film was 300 nm in thickness and the light absorption anisotropic film was 170 nm in thickness. A diffraction peak obtained by in-plane measurement of a period in a direction vertical to the alignment axis was subjected to pole figure measurement, and intensity distribution was checked in the range of ±70° of the film normal line direction in a plane vertical to the alignment axis. Thereby, it was confirmed that no clear maximum value was found in the intensity distribution and the period in the direction vertical to the alignment axis was devoid of anisotropy.

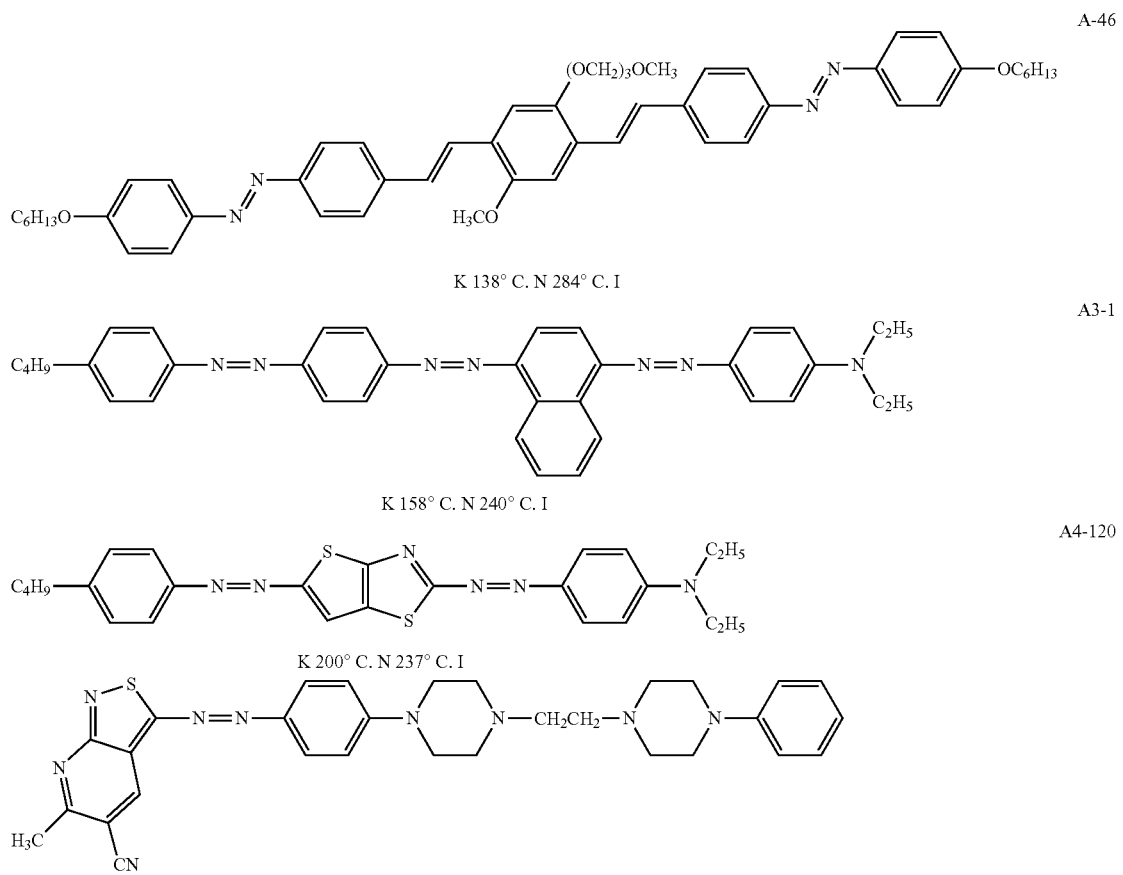

TABLE 1

| No. | Vertical to alignment axis | | Parallel to alignment axis | | Dichroic ratio | Degree of polarization | Depolarization index |
| --- | --- | --- | --- | --- | --- | --- | --- |
| | Period | Half-value width | Period | Half-value width | | | |
| Example 1 | 4.39 Å | 0.65 Å | 30.87 Å<br>15.38 Å | 5.03 Å<br>1.31 Å | 26 | 96.1 | $1.75 \times 10^{-4}$ |

Comparative Example 1

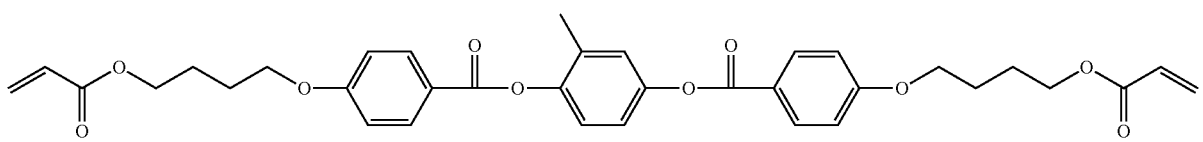 [SMILES: C=CC(=O)OCCCCOc1ccc(C(=O)Oc2ccc(OC(=O)c3ccc(OCCCCOC(=O)C=C)cc3)c(C)c2)cc1]

Rod-Shaped Liquid Crystal (B)

Twenty parts by mass of the above rod-shaped liquid crystal (B) was agitated and dissolved in 80 parts by mass of chloroform to obtain a light absorption anisotropic film solution. The solution was coated by spin coating on a glass substrate having a polyvinyl alcohol alignment film (made by Nissan Chemical Industries Ltd., trade name: PVA-103) to which homogenous alignment treatment was given by rubbing treatment and dried naturally to obtain a light absorption anisotropic film. The thus obtained light absorption anisotropic film was 6 in dichroic ratio and $1.2*10^{-2}$ in depolarization index. FIG. 1 shows an X-ray diffraction pattern obtained from the direction vertical to the alignment axis of the film. There was found no X-ray diffraction pattern in a direction parallel to the alignment axis of the film. Further, one peak was detected in the direction vertical to the alignment axis. Table shown below shows a period and a half-value width determined from the peak.

TABLE 2

|  | Direction vertical to alignment axis Peak 1 |
| --- | --- |
| Period | 4.55 Å |
| Half-value width | 1.46 Å |

Comparative Example 2

To 98 parts by mass of chloroform, added was 2 parts by mass of liquid crystalline dichroic dye LSR-406 (made by Mitsubishi Chemical Corporation) described in Example 1 of JP No. 4404606 (Patent Document 1), the resultant thereof was dissolved by agitation and, thereafter, filtered to obtain a dichroic dye composition coating solution. Next, the coating solution was coated on an alignment film which was formed on a glass substrate and subjected to rubbing treatment. Thereafter, the liquid was heated at 130° C. for two minutes to dry the chloroform, Next, cooled at 10° C. per second to prepare a polarizing film. A polyvinyl alcohol alignment film was used as the alignment film.

The thus obtained polarizing film was 21 in dichroic ratio, 87.7 in degree of polarization and $1.38*10^{-3}$ in depolarization index. The alignment film was 300 nm in thickness and the light absorption anisotropic film was 250 nm in thickness. Further, as with Example 1, a diffraction peak was subjected to pole figure measurement to find two maximum values at the intervals of 60° in terms of peak intensity, suggesting the presence of a periodic structure having anisotropy.

Comparative Example 3

To 91 parts by mass of water, added was 9 parts by mass of sodium salt of a dichroic dye compound described in Example 16 of JP-A2006-79030 as shown in (A) shown below. The resultant thereof was dissolved by agitation and filtered to obtain a dichroic dye composition coating solution. Next, the coating solution was coated on an alignment film which was formed on a glass substrate and subjected to rubbing treatment, and dried naturally to prepare a polarizing film. A polyimide alignment film was used as the alignment film. The dye (A) shown below was a dye without thermotropic liquid crystallinity but with lyotropic liquid crystallinity.

The thus obtained polarizing film was 9 in dichroic ratio, 89 in degree of polarization and $1.1*10^{-3}$ in depolarization index. The alignment film was 300 nm in thickness and the light absorption anisotropic film was 450 nm in thickness. Also, as with Example 1, measurement of X-ray diffraction was carried out to find no clear pattern of X-ray diffraction in a direction parallel to the alignment axis of the light absorption anisotropic film. Irregularities were found in a period of several dozens of nanometers in the direction parallel to the rubbing direction, and the layer was inferior in plane smoothness than the layer of the example.

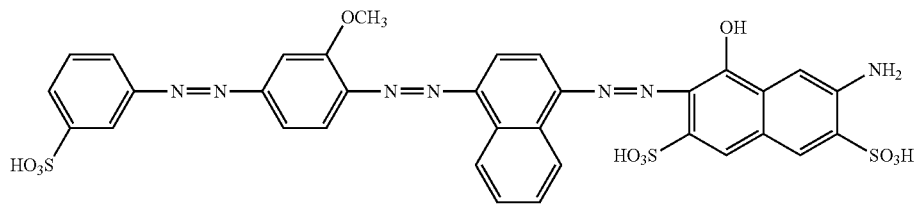 [SMILES: COc1cc(N=Nc2cccc(S(=O)(=O)O)c2)ccc1N=Nc1ccc(N=Nc2c(S(=O)(=O)O)cc3cc(S(=O)(=O)O)c(N)cc3c2O)c2ccccc12]

Dichroic dye compound (A): the compound described in Example 16 of JP-A2006-79030.

The invention claimed is:
1. An optical absorption anisotropic film,
wherein content of a liquid crystalline non-colorable low molecular weight compound is 30% by mass or less; and
which is obtained by fixing the alignment of a dichroic dye composition comprising at least two types of azo-based dichroic dye having nematic liquid crystallinity; and
shows a diffraction peak derived from a periodic structure in a direction parallel to the alignment axis on measurement of X-ray diffraction,
wherein the dichroic dye composition comprises at least one type of compound expressed by the formula (Ia), formula (Ib) or formula (II) shown below and at least one type of compound expressed by the formula (III) or formula (IV) shown below;

Formula (Ia)

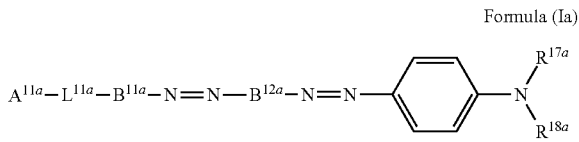

wherein $R^{17a}$ and $R^{18a}$ each represent independently a hydrogen atom, a methyl group or an ethyl group; $L^{11a}$ represents —N=N—, —N=CH—, —O(C=O)— or —CH=CH—; $A^{11a}$ represents a group represented by the following formula (Ia-II) or (Ia-III); $B^{11a}$ and $B^{12a}$ each represent independently a group represented by the following formula (Ia-IV), (Ia-V) or (Ia-VI);

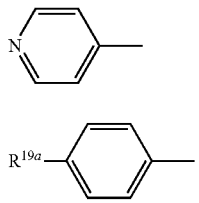

(Ia-II)

(Ia-III)

wherein $R^{19a}$ represents an alkyl group optionally having a substituent, an aryl group optionally having a substituent, an alkoxy group optionally having a substituent, an oxycarbonyl group optionally having a substituent or an acyloxy group optionally having a substituent;

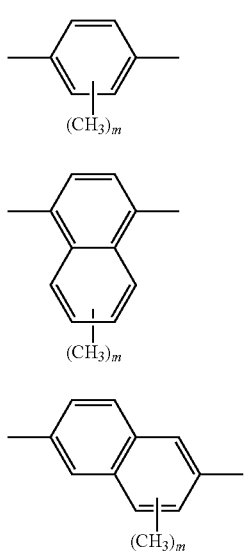

(Ia-IV)

(Ia-V)

(Ia-VI)

wherein m represents an integer of 0 to 2,

Formula (Ib)

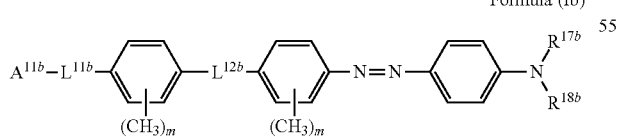

wherein $R^{17b}$ and $R^{18b}$ each represent independently a hydrogen atom, a methyl group or an ethyl group; $L^{11b}$ represents —N=N— or —(C=O)O—; $L^{12b}$ represents —N=CH—, —(C=O)O— or —O(C=O)—; $A^{11b}$ represents a group represented by the following formula (Ib-II) or (Ib-III); m represents an integer of 0 to 2;

(Ib-II)

(Ib-III)

wherein $R^{19b}$ represents an alkyl group optionally having a substituent, an aryl group optionally having a substituent, an alkoxy group optionally having a substituent, an oxycarbonyl group optionally having a substituent or an acyloxy group optionally having a substituent, Formula (II)

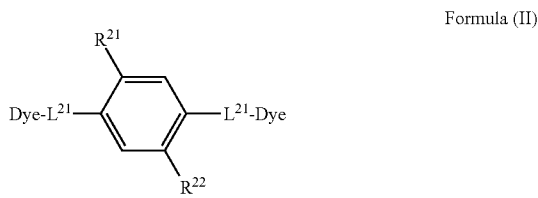

wherein, $R^{21}$ and $R^{22}$ each represent a hydrogen atom, an alkyl group, an alkoxy group or a substituent represented by -$L^{22}$-Y, provided that, at least one of them represents a group other than a hydrogen atom; $L^{22}$ represents an alkylene group, and one $CH_2$ group or non-adjacent two or more $CH_2$ groups present in the alkylene group may each be substituted with —O—, —COO—, —OCO—, —OCOO—, —NRCOO—, —OCONR—, —CO—, —S—, —$SO_2$—, —NR—, —$NRSO_2$— or —$SO_2NR$— wherein R represents a hydrogen atom or an alkyl group having 1 to 4 carbons; Y represents a hydrogen atom, a hydroxy group, an alkoxy group, a carboxyl group, a halogen atom or a polymerizable group; $L^{21}$s each represent a linking group selected from the group consisting of an azo group (—N=N—), a carbonyloxy group (—C(=O)O—), an oxycarbonyl group (—O—C(=O)—), an imino group (—N=CH—) and a vinylene group (—C=C—); dyes each represent an azo dye residue represented by the following formula (IIa);

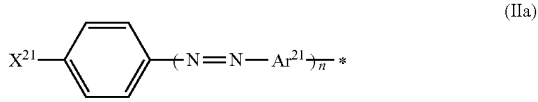

(IIa)

in the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring group optionally having a substituent or aromatic heterocyclic group optionally having a substituent; n represents an integer of 1 to 3, and when n is 2 or more, two $Ar^{21}$s may be mutually the same or different;

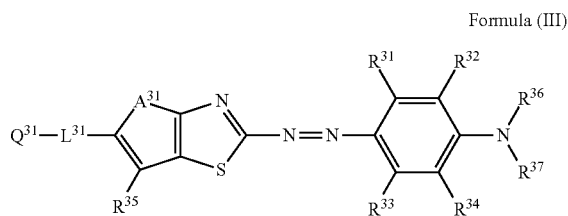

Formula (III)

wherein, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group, aromatic heterocyclic group optionally having a substituent or cyclohexane ring group optionally having a substituent; $L^{31}$ represents a divalent linking group; $A^{31}$ represents an oxygen atom or a sulfur atom;

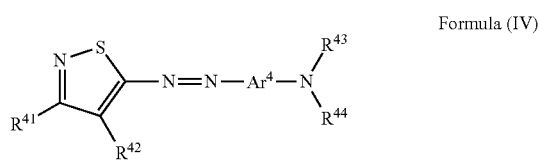

Formula (IV)

wherein, $R^{41}$ and $R^{42}$ each represent a hydrogen atom or a substituent, and may be mutually linked to form a ring; $Ar^4$ represents an optionally substituted divalent aromatic hydrocarbon group or aromatic heterocyclic group; $R^{43}$ and $R^{44}$ each represent a hydrogen atom or an optionally substituted alkyl group, and may be mutually linked to form a hetero ring.

2. The optical absorption anisotropic film according to claim 1, wherein a period shown by at least one of the diffraction peaks is 3.0 to 50 Å.

3. The optical absorption anisotropic film according to claim 1, wherein at least one half-value width of the diffraction peaks is 10.0 Å or less.

4. The optical absorption anisotropic film according to claim 1 which shows diffraction peaks derived from a periodic structure in a direction vertical to the alignment axis and in which the period shown by at least one of the diffraction peaks is 3.0 to 15.0 Å.

5. The optical absorption anisotropic film according to claim 4, wherein at least one of diffraction peaks derived from the periodic structure in the direction vertical to the alignment axis is a diffraction peak derived from a periodic structure in an in-plane direction.

6. The optical absorption anisotropic film according to claim 4, wherein there is one diffraction peak derived from the periodic structure in the direction vertical to the alignment axis.

7. The optical absorption anisotropic film according to claim 4, wherein the intensity of the diffraction peak derived from the periodic structure in the direction vertical to the alignment axis does not show a maximum value in a range of ±70° of layer normal line direction in a plane vertical to the alignment axis.

8. The optical absorption anisotropic film according to claim 4, wherein at least one of half-value widths in the diffraction peak derived from the periodic structure in the direction vertical to the alignment axis is 2.0 Å or less.

9. The optical absorption anisotropic film according to claim 1, wherein a period shown by at least one of the diffraction peaks is 3.0 to 50.0 Å, and at least one half-value width of the diffraction peaks is 10.0 Å or less.

10. The optical absorption anisotropic film according to claim 1, wherein a period shown by at least one of the diffraction peaks derived from a periodic structure in a direction parallel to the alignment axis is 3.0 to 50.0 Å; which shows diffraction peaks derived from a periodic structure in a direction vertical to the alignment axis; and in which the period shown by at least one of the diffraction peaks derived from a periodic structure in a direction vertical to the alignment axis is 3.0 to 15.0 Å.

11. The optical absorption anisotropic film according to claim 1, wherein a period shown by at least one of the diffraction peaks derived from a periodic structure in a direction parallel to the alignment axis is 3.0 to 50.0 Å, at least one half-value width of the diffraction peaks is 10.0 Å or less; which shows diffraction peaks derived from a periodic structure in a direction vertical to the alignment axis; and in which the period shown by at least one of the diffraction peaks is derived from a periodic structure in a direction vertical to the alignment axis 3.0 to 15.0 Å.

12. A polarizing film having a substrate and the optical absorption anisotropic film described in claim 1 on the substrate.

13. The polarizing film according to claim 12 having an alignment film between the substrate and the optical absorption anisotropic film.

14. A display device having the polarizing film according to claim 12.

15. The optical absorption anisotropic film according to claim 1, wherein the dichroic dye composition comprises a compound expressed by the formula (Ia) or the formula (Ib), a compound expressed by the formula (II), a compound expressed by the formula (III), and a compound expressed by the formula (IV).

16. A process for producing the polarizing film according to claim 12 comprising at least the following [1] to [3] in this order;
 [1.] rubbing or irradiating light directly on a substrate or an alignment film formed on the substrate,
 [2.] coating a dichroic dye composition dissolved in an organic solvent on the substrate or the alignment film, and
 [3.] heating a coated film of the dichroic dye composition at temperatures of 50° C. or more and 250° C. or less and aligning to form an optical absorption anisotropic film.

* * * * *